United States Patent
Mashitani et al.

(10) Patent No.: US 7,518,793 B2
(45) Date of Patent: Apr. 14, 2009

(54) STEREOSCOPIC IMAGE DISPLAY DEVICE USING IMAGE SPLITTER, ADJUSTMENT METHOD THEREOF, AND STEREOSCOPIC IMAGE DISPLAY SYSTEM

(75) Inventors: Ken Mashitani, Osaka (JP); Goro Hamagishi, Osaka (JP); Takahisa Andou, Nara (JP); Satoshi Takemoto, Osaka (JP); Masahiro Higashino, Osaka (JP); Nobutake Kawamori, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/400,484

(22) Filed: Mar. 28, 2003

(65) Prior Publication Data

US 2004/0008251 A1  Jan. 15, 2004

(30) Foreign Application Priority Data

| Mar. 29, 2002 | (JP) | 2002-095333 |
| Mar. 29, 2002 | (JP) | 2002-095334 |
| Mar. 27, 2003 | (JP) | 2003-086892 |
| Mar. 27, 2003 | (JP) | 2003-086903 |
| Mar. 27, 2003 | (JP) | 2003-088326 |

(51) Int. Cl.
   *G02B 27/22* (2006.01)
(52) U.S. Cl. ........................ 359/464; 348/54
(58) Field of Classification Search ................ 359/462, 359/464, 476; 348/42, 51, 54–60; 345/7–9
   See application file for complete search history.

(56) References Cited

U.S. PATENT DOCUMENTS

| 4,709,263 | A | * | 11/1987 | Brumage | 348/42 |
| 4,927,238 | A | * | 5/1990 | Green et al. | 359/466 |
| 5,479,270 | A | * | 12/1995 | Taylor | 358/488 |
| 6,215,594 | B1 | * | 4/2001 | Inoguchi et al. | 359/619 |
| 6,801,243 | B1 | * | 10/2004 | Van Berkel | 348/59 |
| 6,867,750 | B2 | * | 3/2005 | Noro | 345/6 |
| 7,215,302 | B2 | * | 5/2007 | Satoh et al. | 345/7 |
| 2001/0012054 | A1 | * | 8/2001 | Sudo | 348/51 |
| 2002/0126202 | A1 | * | 9/2002 | Wood et al. | 348/59 |

FOREIGN PATENT DOCUMENTS

| JP | 02-044995 | | 2/1990 |
| JP | 06-311536 | | 11/1994 |
| JP | 6-311536 | | 11/1994 |
| JP | 7-219057 | | 8/1995 |
| JP | 07219057 | * | 8/1995 |
| JP | 09-304739 | | 11/1997 |
| JP | 10042315 A | * | 2/1998 |
| JP | 10-232626 | | 9/1998 |
| JP | 07-219057 | | 8/2007 |
| WO | WO02099510 A1 | * | 12/2002 |
| WO | WO 02101445 A1 | * | 12/2002 |

* cited by examiner

*Primary Examiner*—Lee Fineman
(74) *Attorney, Agent, or Firm*—McDermott Will & Emery LLP

(57) ABSTRACT

The present invention enables liquid crystal display devices, note-book personal computers, or the like to display stereoscopic images by installing an image splitting means and comprises a display panel displaying images taken from a plurality of viewpoints, image splitting means installed to the display panel removably and including an image splitting panel which splits image light from the display panel into stereo pairs of images. The image splitting means comprises an installing means for installing the image splitting means to the display panel removably and an adjusting means for positioning spatially the image splitting means and the display panel.

24 Claims, 65 Drawing Sheets

FIG.58A  FIG.58B  FIG.58C  FIG.58D
4E
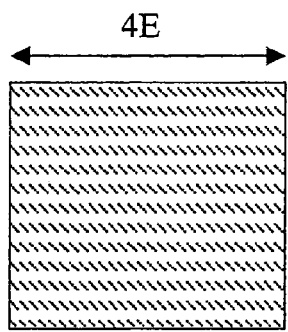 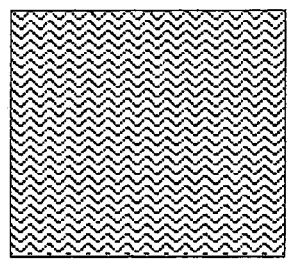 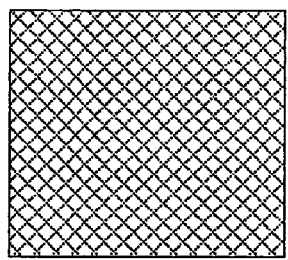 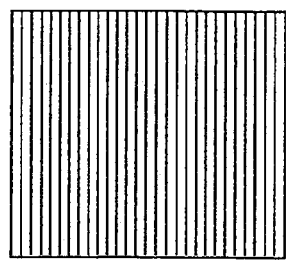
FIG.58E  FIG.58F
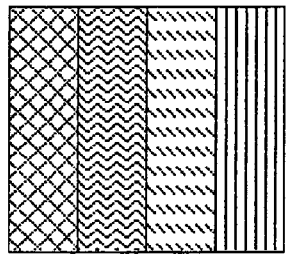 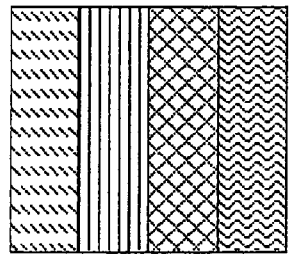

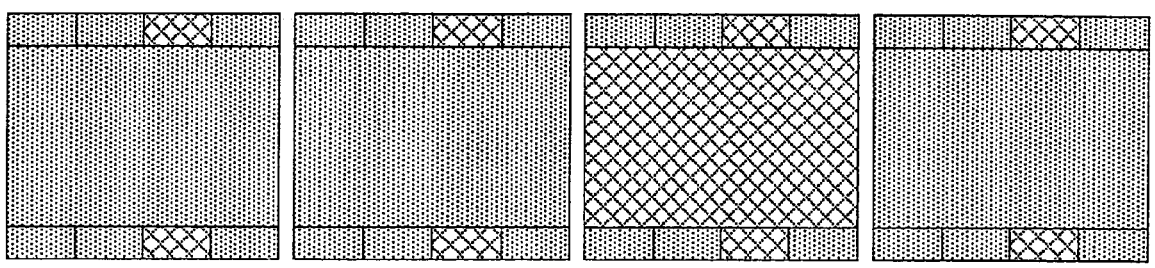
FIG.59A  FIG.59B  FIG.59C  FIG.59D
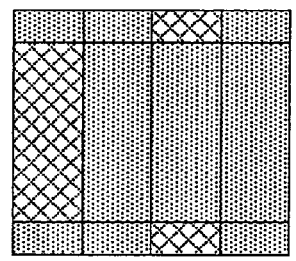 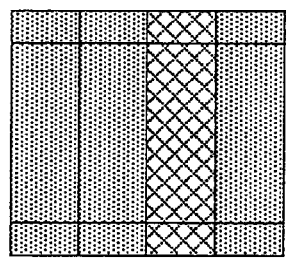
FIG.59E  FIG.59F

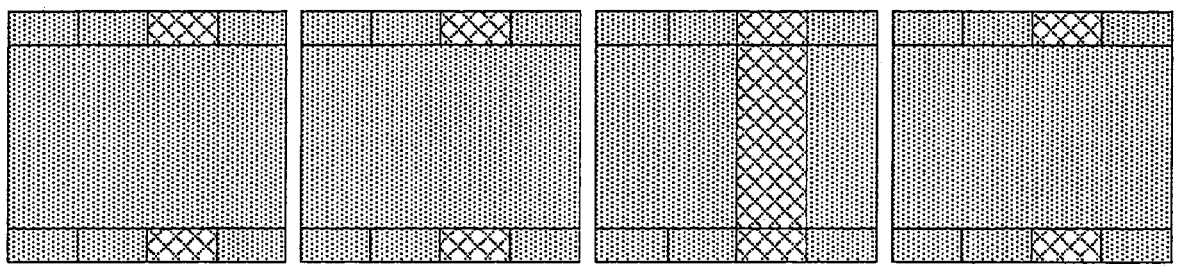
FIG.60A  FIG.60B  FIG.60C  FIG.60D
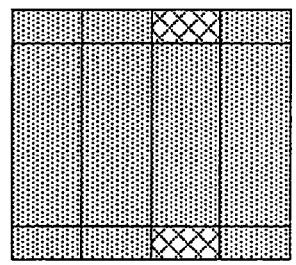 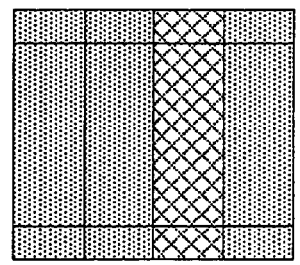
FIG.60E  FIG.60F

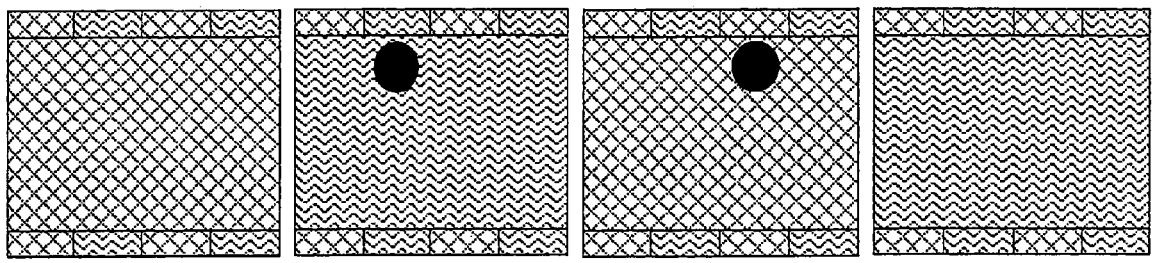
FIG.61A  FIG.61B  FIG.61C  FIG.61D
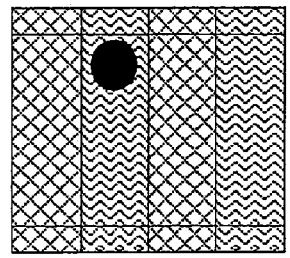 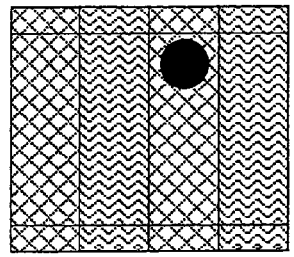
FIG.61E  FIG.61F

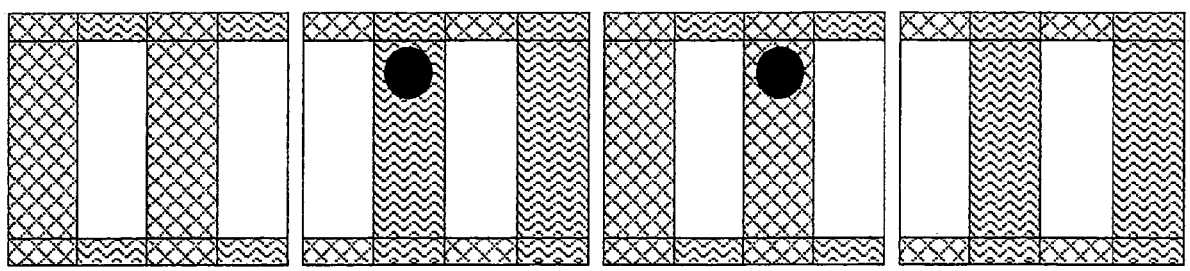
FIG.62A  FIG.62B  FIG.62C  FIG.62D
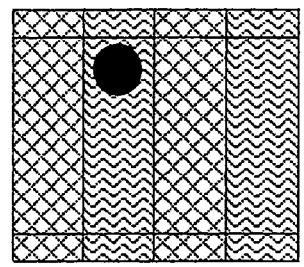 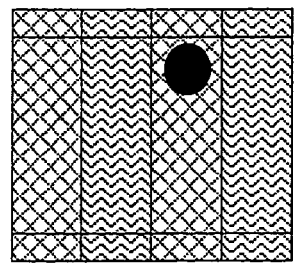
FIG.62E  FIG.62F FIG.63A  FIG.63B  FIG.63C  FIG.63D
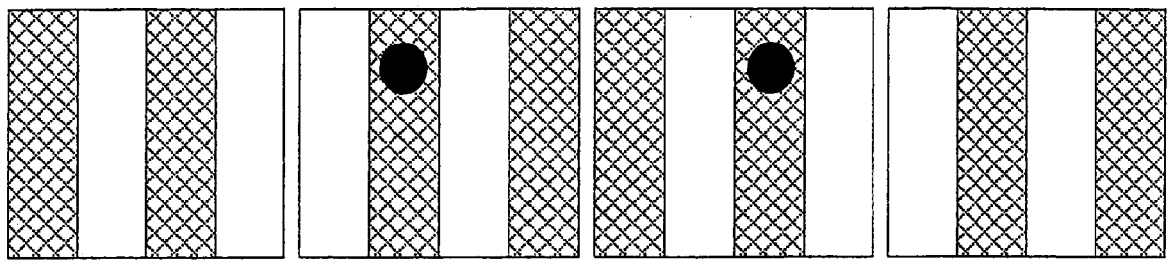
FIG.63E  FIG.63F
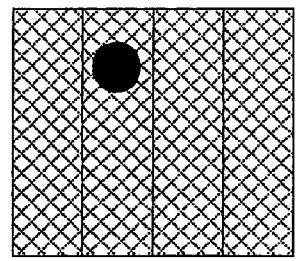 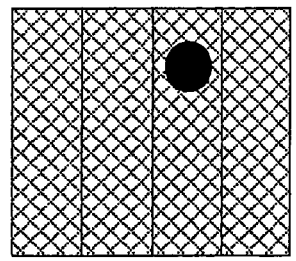

| 2 | 1 | 4 | 3 |
|---|---|---|---|
| 3 | 2 | 1 | 4 |
| 4 | 3 | 2 | 1 |

FIG.74B

| 4 | 3 | 2 | 1 |
|---|---|---|---|
| 1 | 4 | 3 | 2 |
| 2 | 1 | 4 | 3 |

FIG.75A

|  | left |  | right |
|---|---|---|---|
| right |  | left |  |
|  | right |  | left |

FIG.75B

| left |  | right |  |
|---|---|---|---|
|  | left |  | right |
| right |  | left |  |

FIG.75C

|  | right |  | left |
|---|---|---|---|
| left |  | right |  |
|  | left |  | right |

FIG.75D

| right |  | left |  |
|---|---|---|---|
|  | right |  | left |
| left |  | right |  |

Fig.76A

| | Left (blue) | | Right (blue) |
|---|---|---|---|
| Right (red) | | Left (red) | |
| | Right (blue) | | Left (blue) |

Fig.76B

| Left (red) | | Right (red) | |
|---|---|---|---|
| | Left (blue) letter: L | | Right (blue) |
| Right (red) | | Left (red) | |

Fig.76C

| | Right (blue) | | Left (blue) |
|---|---|---|---|
| Left (red) | | Right (red) letter: R | |
| | Left (blue) | | Right (blue) |

Fig.76D

| Right (red) | | Left (red) | |
|---|---|---|---|
| | Right (blue) | | Left (blue) |
| Left (red) | | Right (red) | |

Fig.77A

| 2 (red) | 1 (blue) | 4 (red) | 3 (blue) |
|---|---|---|---|
| 3 (red) | 2 (blue) letter: L | 1 (red) | 4 (blue) |
| 4 (red) | 3 (blue) | 2 (red) | 1 (blue) |

Fig.77B

| 4 (red) | 3 (blue) | 2 (red) | 1 (blue) |
|---|---|---|---|
| 1 (red) | 4 (blue) | 3 (red) letter: R | 2 (blue) |
| 2 (red) | 1 (blue) | 4 (red) | 3 (blue) |

| 8 | 7 | 6 | 5 | 4 | 3 | 2 | 1 |

| 5 | 4 | 3 | 2 |

| 7 | 6 | 5 | 4 |

| 6 | 5 | 4 | 3 |

| 8 | 7 | 6 | 5 |

| 4 | 3 | 2 | 1 |

| 6 | 5 | 4 | 3 |

Barrier in a slanted stripe-shape

STEREOSCOPIC IMAGE DISPLAY DEVICE USING IMAGE SPLITTER, ADJUSTMENT METHOD THEREOF, AND STEREOSCOPIC IMAGE DISPLAY SYSTEM

BACKGROUND OF THE INVENTION

1. Field of the Invention

This invention relates to a stereoscopic image display device using an image splitter allowing a viewer to perceive stereoscopic images, an adjustment method used in the stereoscopic image display device and a stereoscopic image display system, and enables a display panel designed for two-dimensional images to display stereoscopic images.

2. Description of Prior Art

Significant technological advances in a recent electronic display field have permitted upsizing and high definition of display screens. With the increase in size and the improvement in definition, a ratio of an image on the display screen to a human's visual field increases; therefore it became possible to place pixels at high densities beyond a resolution power of human's eyes. This makes images more realistic and natural, and creates much sense of realism on the screen. However, the current electronic displays have a limitation of creating more natural and more realistic images because images are two-dimensional while real-world objects are three-dimensional.

By the way, human beings see objects stereoscopically by a faculty of their left and right eyes. If the objects can be stereoscopically displayed, more realism will be created. This motivates researchers to study actively on the stereoscopic display of objects lately.

In the past, various kinds' of stereoscopic image display devices have been proposed. Among those devices, well known is a stereoscopic image display device without special glasses that comprises optical splitting means such as a lenticular lens and parallax barrier. JP268232/1998A proposes a stereoscopic image display device comprising a backlight, a liquid crystal panel as a display panel, and a parallax barrier arranged on a viewer's side of the liquid crystal panel.

In the conventional stereoscopic image display devices, the optical splitting means such as the parallax barrier is installed to the display panel after adjusting their relative positions. Once they are out of the relative positions, a stereoscopic view cannot be created or interference fringes produced by interlacing left eye images and right eye images are perceived. Therefore the optical splitting means is usually not removed after precisely adjusted and installed at a position relative to the display panel. In other words, the display panel in the conventional stereoscopic image display device is prepared for the exclusive use of a stereoscopic view.

With the remarkable widespread use of liquid crystal display devices and notebook personal computers in recent times, the desire to observe stereoscopic view with these devices easily has been growing.

However, the conventional stereoscopic image display devices are exclusively to see stereoscopic images, so liquid crystal displays of commercial personal computers are unserviceable for stereoscopic images. This problem has been hampering the above desire.

In addition, it is too complicated to adjust the relative positions between the optical splitting means and the display panel for someone with less or no experience under present circumstances.

SUMMARY OF THE INVENTION

The present invention has an objective to provide an image splitter enabling a display panel usually used for displaying two-dimensional images to display stereoscopic images.

When an optical splitting means is installed to the liquid crystal display, notebook personal computer and so on, easy adjustment of positions is required.

Thus the present invention has an objective to provide an adjustment method of the image splitter in the stereoscopic image display device, which realizes easy adjustment of positions of the optical splitting means relative to the display panel.

A stereoscopic image display device of the present invention comprises a display panel displaying images taken from a plurality of viewpoints and an image splitting means which is installed to the display panel removably and includes an image splitting panel to split image light from the display panel into stereo pairs of images corresponding to a viewer's eyes. The image splitting means comprises an installing means for installing the image splitting means to the display panel removably and an adjusting means for adjusting spatial positions between the image splitting means and the display panel.

According to the structure, the image splitting means such as a parallax barrier and a lenticular lens can be installed removably to the display panel. Thus it is possible to use the display panel of the commercially available liquid crystal display as a stereoscopic image display. The image splitting means in this invention can be mounted and demounted easily.

The installing means comprises fastening parts to catch a top of a cabinet housing the display panel. The adjusting means adjusts the height of the fastening parts relative to the top of the cabinet housing the display panel.

According to the structure, the image splitting means can be installed only by being hooked on the display panel. Also adjustment to perceive the stereoscopic images can be performed.

The fastening parts of the invention are structured to make contact with the top of the cabinet around both ends. The image splitting means may be supported by a plurality of the fastening parts.

Supporting the image splitting means at a plurality of points makes it more suitable to various shapes of the liquid crystal display.

The plurality of fastening parts are connected to each other with a connection member. The connecting member comprises a drop preventive member to prevent the image splitting means from dropping from the cabinet and a horizontal position adjustment mechanism to move the image splitting means horizontally with respect to the display panel. Also the connecting member comprises a preventive member to prevent the display panel from closing by mistake.

The horizontal position adjustment mechanism comprises a rotating contact part making contact with a horizontal top of the cabinet housing the display panel. The horizontal position adjustment mechanism moves the image splitting means horizontally as pressing the rotating contact part against the top of the cabinet.

The horizontal position adjustment mechanism comprises a supporting member attached to the connecting member, a screw hole bored through the supporting member slantwise, and a bolt. The bolt is inserted into the screw hole and comprises a knob on one end and a contact part on another end which is formed in hemispherical shape and makes contact with the top of the cabinet. The knob, bolt and contact part are installed slantwise with respect to the top of the cabinet.

According to the structure, the position of the image splitting means, which was installed to the display panel, can be adjusted easily with a use of the adjusting means. Therefore the position of the image splitting means can be easily adjusted even after the installation of the image splitting means to the liquid crystal display. This makes it easy to handle as well as to adjust the image splitting means.

The image splitting means comprises shading parts formed in a stripe pattern vertically or slantwise The image splitting means comprises a barrier substrate with the shading parts formed in a stripe pattern vertically or slantwise and a supporting frame holding the barrier substrate. The barrier substrate is held further back than the front surface of the supporting frame.

The image splitting means may be a liquid crystal substrate with shading parts in the shape of stripe capable of being turned on and off as required.

The image splitting means is attached to a supporting frame, at least one part of the frame is made of translucent materials.

According to the structure, the supporting frame prevents damages to the image splitting means. Besides, the supporting frame is made of translucent materials, which eliminates a risk of hiding a perimeter of the display surface of the display panel. It is acceptable in this invention if a viewer manages to recognize images on the display through the translucent material, so the translucent materials are unnecessary to be colorless and transparent.

A stereoscopic image display device of the present invention comprises a display panel displaying images taken from a plurality of viewpoints and an image splitting means which is installed to the display panel removably and includes an image splitting panel to split image light from the display panel into stereo pairs of images corresponding to a viewer's eyes. The image splitting means comprises a first member which is fixed at least horizontally with respect to the display panel, a second member, which the image splitting panel is attached to, movably fitted into the first member, and an adjusting means for adjusting the spatial positions between the image splitting panel and the display panel by moving the second member with respect to the first member. The image splitting means is installed after its position is adjusted so that a viewer observes stereo pairs of images, corresponding to the left and right eyes, into which the image splitting panel splits image light from the display panel.

According to the structure, the image splitting means can be installed removably. Thus display panels of the commercially available liquid crystal display device can be used as a stereoscopic image display device.

The adjusting means comprises a cover covering the adjusting members for the operation of the adjusting means.

According to the structure, the cover prevents the adjustment mechanism from being touched by a third party and operated in a wrong way while the invention is on exhibit or other occasions.

The first member may be designed to change its width corresponding to the width of a hollow of the cabinet housing the display panel.

According to the structure, the first member can be installed to the display device even if the cabinet of the display device has a somewhat different width.

The adjusting means includes height and angle adjusting members and a horizontal adjusting member.

The horizontal adjusting member comprises a first moving member moving upward and downward by rotation, a second moving member moving leftward and rightward with the movement of the first moving member, a knob provided with the first moving member, and a connecting member connecting the second moving member and the second member. The second member is moved horizontally interlocking with the vertical movement, via the second moving member and the connecting member, of the first moving member by rotation of the knob.

According to the structure, adjustment in a horizontal direction can be performed with reliability and ease.

The display panel is designed to open and close freely. The image splitting means may be provided with a preventive member to prevent the display panel from closing by mistake.

According to the structure, the preventive member can prevent the display panel from closing by mistake, thereby keeping damages from happening to the device.

A stereoscopic image display system of the present invention comprises an image display means for displaying images taken from a plurality of viewpoints, an optical splitting means for splitting image light from the image display means into stereo pairs of images corresponding to a viewer's eyes, a control means for controlling the image display means to display predetermined images, and a means for judging instructions from the viewer. The control means causes the image display means to display predetermined images for adjustment in order to help the viewer who is out of an optimal viewing position recognizing a condition of the optical splitting means from the relationship between the predetermined image and interference fringes generated by the image display means and the optical splitting means and adjusting the position of the optical splitting means.

The predetermined images include arrows each indicating positions of knobs for adjustment and images each indicating an appearance at the completion of adjustment.

According to the structure, the stereoscopic image display system with easy adjustment can be provided.

An adjustment method of a stereoscopic image display device which comprises image display means for displaying images taken from a plurality of viewpoints and optical splitting means for splitting image light from the image display means into stereo pairs of images corresponding to a viewer's eyes, comprising: displaying predetermined images on the image display means; recognizing a condition of the optical splitting means by which a viewer who is out of an optimal viewing position sees a relationship between the predetermined images and interference fringes generated by the image display means and the optical splitting means, and adjusting the position of the optical splitting means.

The viewer is positioned in front of the stereoscopic image display device and at an integral submultiple of an optimal viewing distance or at half the optimal viewing distance.

According to the structure, the positions of light and shade of the interference fringes observed by the right eye perfectly agree with that observed by the left eye, which eliminates the sense of incompatibility. Therefore the viewer can adjust the image splitting means as observing images.

The predetermined image may be composed of either strips of images or even images, or combinations of both. The strips of images are created in a cycle of an integral multiple of a cycle of interference fringes generated in front of the viewer. Also the width of the strips of images is equivalent to a space between the interference fringes generated in front of the viewer.

According to the structure, the viewer can draw a distinction between images for adjustment, thereby performing adjustment easily.

An image to check a state of the interference fringes may be added to the predetermined images. Also the image to check the state of the interference fringes may be an image indicating an appearance of the interference fringe at the completion of adjustment.

According to the structure, the viewer can clearly grasp the state of the misalignment, thereby performing adjustment easily.

Also the predetermined images may include regions of low brightness with a bound of which the viewer can recognize the viewer's position reflected on the stereoscopic image display.

According to the structure, the viewer can easily recognize where the viewer should be.

The predetermined images may include letters, arrows or figures, or combinations of them.

The arrows are invisible at the completion of adjustment, but indicates directions to which the optical splitting means is moved in other stages.

The arrows are invisible at the completion of adjustment, but indicates directions to which the moiré is moved in other stages.

The letters and figures will be meaningful letters or words, or understandable figures by seen with a left and right eyes at the completion of adjustment. Also images indicating an appearance of the letters, words, arrows and figures at the completion of adjustment may be added to the predetermined images.

An image to check the state of the interference fringes may be added to a region where images taken from a plurality of viewpoints are seen at the completion of adjustment.

According to the structure, the viewer can draw a distinction between images for adjustment, thereby performing adjustment easily.

BRIEF DESCRIPTION OF THE DRAWINGS

FIGS. 58A to 58F show images displayed in the horizontal four-view stereoscopic image display device;

FIGS. 59A to 59F show an example of images for adjustment with the horizontal four-view stereoscopic image display device according to the invention;

FIGS. 60A to 60F show another example of images for adjustment with the horizontal four-view stereoscopic image display device according to the invention;

FIGS. 61A to 61F show other example of images for adjustment with the horizontal four-view stereoscopic image display device according to the invention;

FIGS. 62A to 62F show other additional example of images for adjustment with the horizontal four-view stereoscopic image display device according to the invention;

FIGS. 63A to 63F show other additional example of images for adjustment with the horizontal four-view stereoscopic image display device according to the invention;

FIGS. 64A, 64B, 64C and 64D show images taken from the viewpoints 1, 2, 3 and 4 respectively;

FIGS. 65A, 65B, 65C and 65D show images taken from the viewpoints 1, 2, 3 and 4 respectively;

FIGS. 66A, 66B, 66C and 66D show images taken from the viewpoints 1, 2, 3 and 4 respectively;

FIG. 67A is an image observed with the left eye, FIG. 67B is an image observed with the right eye;

FIGS. 74A to 74B are diagrams roughly showing which viewpoint the image the left eye and the right eye see is taken from, FIG. 74A shows images which the left eye sees and FIG. 74B shows images which the right eye sees;

FIGS. 75A to 75D are diagrams each showing regions which the left and right eyes actually see when the viewer sees each image, FIG. 75A shows regions which the left and right eyes actually see when the viewer sees the image taken from the viewpoint 1, FIG. 75B shows regions which the left and right eyes actually see when the viewer sees the image taken from the viewpoint 2, FIG. 75C shows regions which the left and right eyes actually see when the viewer sees the image taken from the viewpoint 3, FIG. 75D shows regions which the left and right eyes actually see when the viewer sees the image taken from the viewpoint 4;

FIGS. 76A to 76D are diagrams of one example of images for adjustment, FIG. 76A shows regions which the left and right eyes see when the viewer sees the image taken from the viewpoint 1, FIG. 76B shows regions which the left and right eyes see when the viewer sees the image taken from the viewpoint 2, FIG. 76C shows regions which the left and right eyes see when the viewer sees the image taken from the viewpoint 3, FIG. 76D shows regions which the left and right eyes see when the viewer sees the image taken from the viewpoint 4;

FIGS. 77A and 77B are diagrammatic images when the viewer sees the images for adjustment shown in FIGS. 76A to 76D, FIG. 77A shows images which the left eye sees while FIG. 77B shows images which the right eye sees.

FIGS. 78A, 78B, 78C, 78D are images taken from the viewpoints 1, 2, 3, 4 respectively;

FIGS. 80A, 80B, 80C, 80D are images taken from the viewpoints 1, 2, 3, 4 respectively;

FIG. 81A shows an image which the left eye sees, FIG. 81B shows and image which the right eye sees;

FIGS. 82A, 82B, 820C, 82D are images taken from the viewpoints 1, 2, 3, 4 respectively;

FIG. 85A shows an image which the left eye sees, FIG. 85B shows an image which the right eye sees;

FIG. 86A shows an image which the left eye sees, and FIG. 86B shows an image which the right eye sees;

FIG. 87A shows an image which the left eye sees, and FIG. 87B shows an image which the right eye sees;

FIGS. 88A, 88B, 88C, 88D, 88E, 88F, 88G, 88H are images taken from viewpoints 1, 2, 3, 4, 5, 6, 7, 8 respectively;

FIG. 90A shows an image which the left eye sees, and FIG. 90B shows an image which the right eye sees;

FIG. 91A shows an image which the left eye sees, and FIG. 91B shows an image which the right eye sees;

FIGS. 92A, 92B, 92C, 92D, 92E, 92F, 92G, 92H are images taken from viewpoints 1, 2, 3, 4, 5, 6, 7, 8 respectively;

The foregoing and other objects, features, aspects and advantages of the present invention will become more apparent from the following detailed description of the present invention when reviewed in conjunction with the accompanying drawings.

DETAILED DESCRIPTION OF PREFERRED EMBODIMENTS

Figure 1:
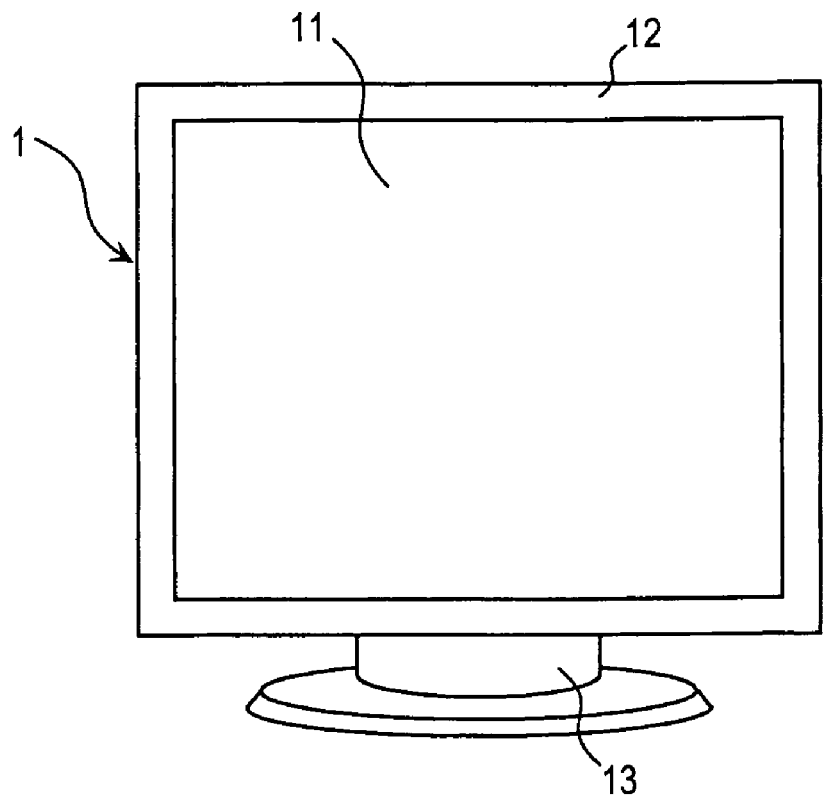
FIG. 1 is a front view of a liquid crystal display device applied to the present invention.
Figure 2:
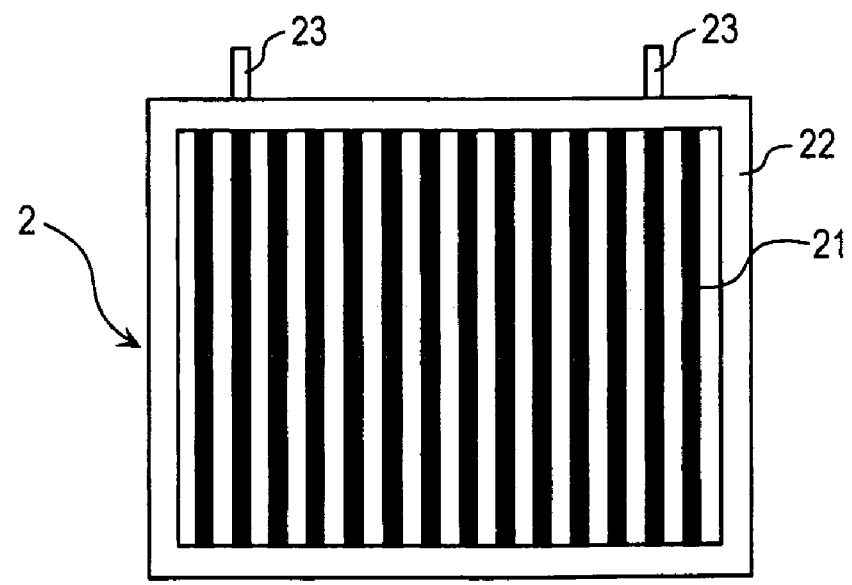
FIG. 2 is a front view of an image splitter applied to a first embodiment of the invention.
Figure 3:
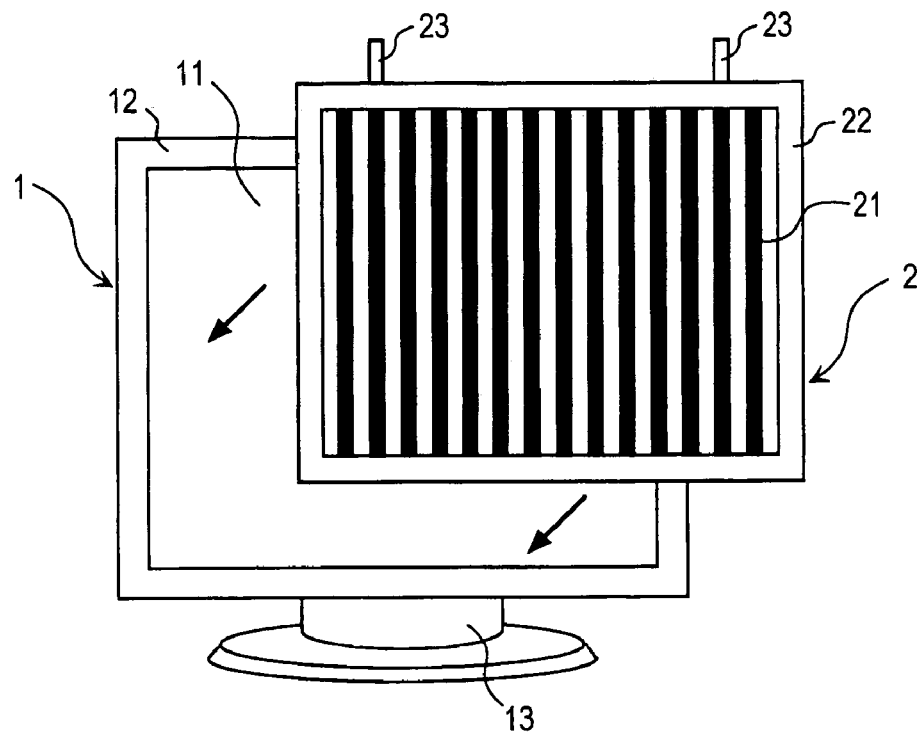
FIG. 3 is a front view showing a state in which the image splitter in the first embodiment of the invention is being installed on the liquid crystal display device.
Figure 4:
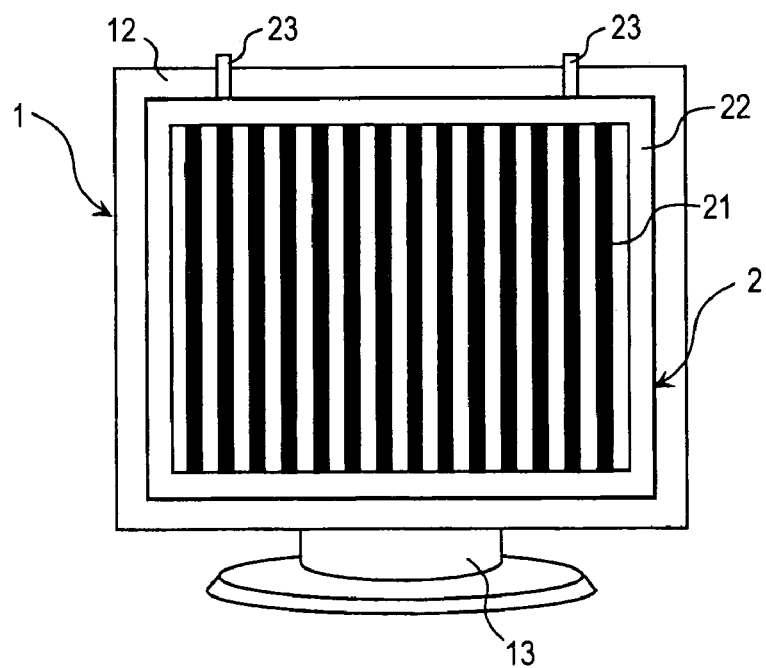
FIG. 4 is a front view showing a state in which the image splitter in the first embodiment of the invention is installed on the liquid crystal display device.
Figure 5:
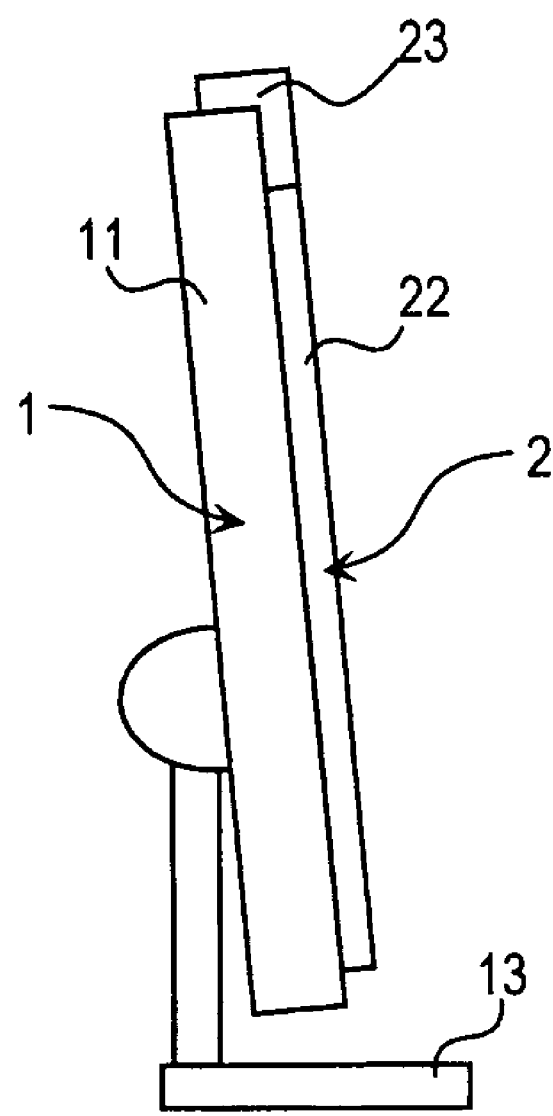
FIG. 5 is a side view showing a state in which the image splitter in the first embodiment of the invention is installed on the liquid crystal display device.

The following are descriptions on embodiments of the present invention with reference to drawings. FIG. 1 is a front view of a liquid crystal display device applied to the present invention. FIG. 2 is a front view of an image splitter applied to a first embodiment of the invention. FIG. 3 is a front view showing a state in which the image splitter in the first embodiment of the invention is being installed on the liquid crystal display device. FIG. 4 is a front view showing a state in which the image splitter in the first embodiment of the invention has been installed on the liquid crystal display device. FIG. 5 is a side view showing a state in which the image splitter in the first embodiment of the invention is installed on the liquid crystal display device.

A liquid crystal display 1 shown in FIG. 1 comprises a liquid crystal monitor or the like and is used as a display device of personal computers etc. A cabinet 12 houses a liquid crystal panel 11 and comprises a leg 13 which supports the display 1 on a desk or the like.

When the liquid crystal display 1 is fed an image signal from a personal computer (not shown), the liquid crystal panel 11 displays given images. To display a stereoscopic image, the liquid crystal panel 11 displays same number of images as viewpoints. In a case of a two-view stereoscopic display displaying two images taken from two viewpoints, for example, an image for the right eye and an image for the left eye are alternately displayed to create stereoscopic images. This liquid crystal display 1 can display stereoscopic images by mounting an image splitter 2.

The image splitter 2 in FIG. 2, for example, adopts a parallax barrier. A plurality of shading thin films corresponding to a pitch of the liquid crystal panel is formed in a stripe pattern on a substrate such as a glass or a transparent resin to make a parallax barrier substrate 21 which is held by a supporting frame 22. Fastening parts 23 each having a 90-degree bend are provided on both right and left sides of a top of the supporting frame 22.

After the parallax barrier substrate 21 of the image splitter 2 is aligned with the liquid crystal panel 11 of the liquid crystal display 1, as shown in FIG. 3, the fastening parts 23 are hanged on a top of the liquid crystal display 1 to fasten the image splitter 2 to the liquid crystal display 1.

When using the image splitter 2, as shown in FIGS. 4 and 5, the image splitter 2 is installed so as to cover the liquid crystal panel 11 of the liquid crystal display 1. Thus viewers see images displayed on the liquid crystal panel 11 of the liquid crystal display 1 through the image splitter 2.

The two-view stereoscopic image display device, for example, displays a right eye image and a left eye image alternately by a column on the liquid crystal panel 11. Images passed through light from a backlight are separated by the parallax barrier substrate 21. When a viewer sees the liquid crystal display 1, the viewer perceives stereoscopic images by observing left eye images with his/her left eye and right eye images with his/her right eye.

As shown in the side view of FIG. 5, the image splitter 2 is installed along a display surface of the liquid crystal display 1 so as to keep the constant distance between the image splitter 2 and the display surface of the liquid crystal panel 11 of the liquid crystal display 1. The way that the image splitter 2 is held with the fastening parts 23 hanged on the top of the cabinet 12 of the liquid crystal display 1 makes the image splitter 2 easier to install to and remove from the liquid crystal display 1.

Figure 6:
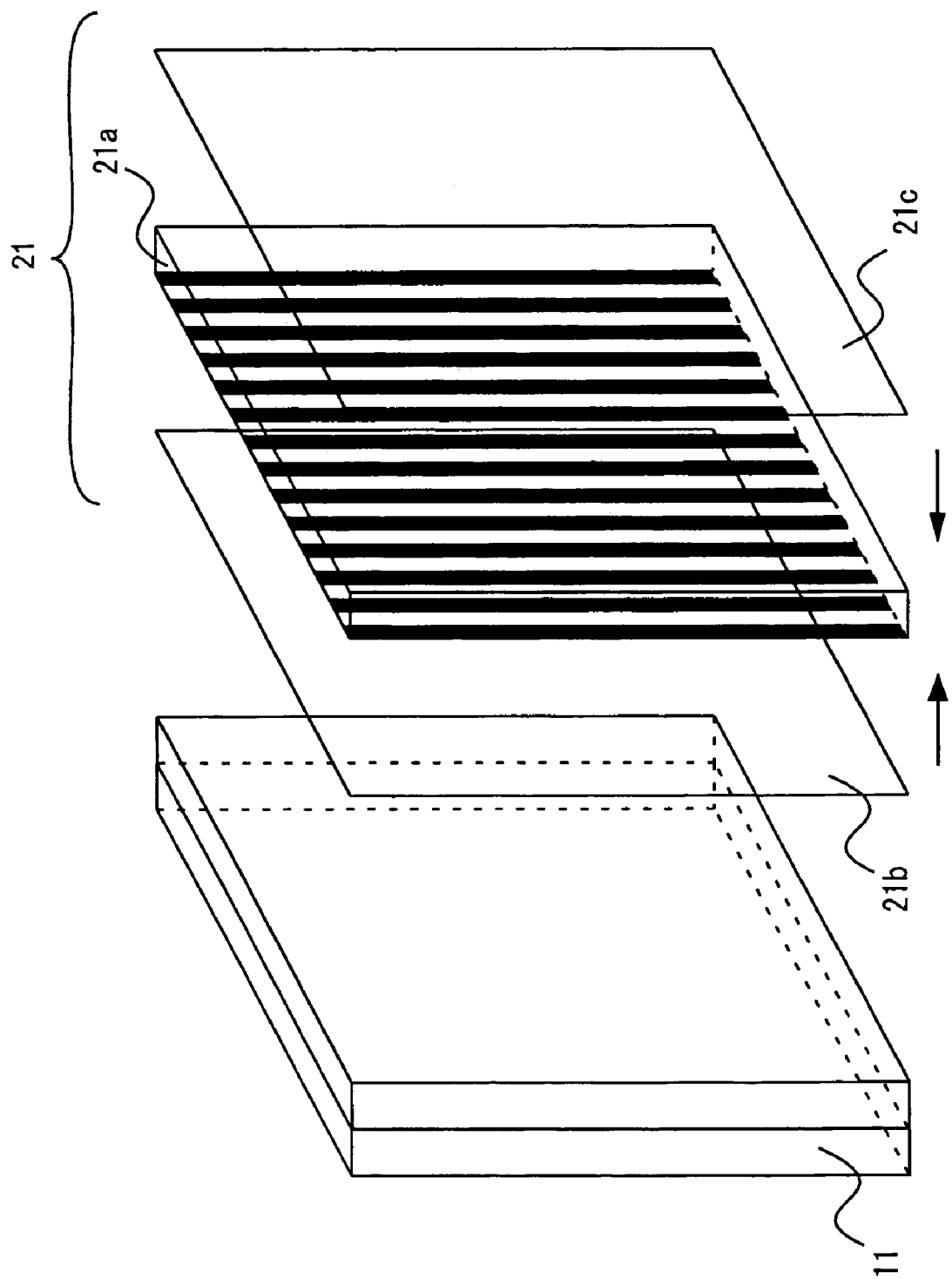
FIG. 6 is an exploded view showing one example of structure of the parallax barrier substrate, which splits images into left eye images and right eye images, of the image splitter.

FIG. 6 is an exploded view showing one example of structure of the parallax barrier substrate 21, which splits images into left eye images and right eye images, of the image splitter 2. The parallax barrier substrate 21 is formed by laminating a resin film 21b; a parallax barrier 21a in which a plurality of shading thin films corresponding to a pitch of the liquid crystal panel is formed in a stripe-pattern on a thin tempered glass plate; a film 21c subjected to an antireflection treatment. The liquid crystal display 1 comprises the liquid crystal panel 11 as a displaying member.

In such a structure, the resin film 21b protects the display surface of the liquid crystal panel 11. The parallax barrier 21a splits light transmitted from the liquid crystal panel 11 into two, left and right, by groups of pixels. The film 21c attached to the parallax barrier 21a is subjected to an antireflection treatment to prevent reflection of light from the parallax barrier substrate 21.

The image splitter 2 installed on the liquid crystal display 1 cannot create stereoscopic images unless pixels of the liquid crystal panel 11 are in a proper alignment with the shading thin films formed in a stripe pattern on the image splitter 2 since the image splitter 2 cannot split images into left and right. Hence, the position of the image splitter 2 is adjusted after the image splitter 2 is installed on the liquid crystal display 1 with the fastening parts 23. In a case of the two-view stereoscopic image display device, for example, a viewer shifts the image splitter 2 slightly leftward or rightward so that two images taken from two viewpoints are placed on the liquid crystal display 1 right in front of the viewing position of the viewer. The viewer holds the image splitter 2 in the position where stereoscopic images are perceived. In this way the shading thin films of the image splitter 2 formed in a stripe pattern is adjusted to align with the position of the pixels on the liquid crystal panel 11, thereby observing stereoscopic images. Likewise, in a case of the multi-view stereoscopic image display device, the viewer finely adjusts the position of the image splitter 2 so that any stereo pair of images is placed on the liquid crystal display 1 right in front of the viewer.

There are some ways to make the fine adjustment easier. For example, the liquid crystal display is set to display images in a two-view system. Large letters such as "right" or "R" and "left" or "L" are displayed on the liquid crystal panel 11 as a right eye image and a left eye image respectively. The viewer shifts the image splitter 2 slightly leftward or rightward until observing the letter "right" or "R" only with right eye, and the viewer holds the image splitter 2 at the position where the letter is observed. Subsequently the viewer sees the display with only left eye. The position adjustment reaches completion when the viewer observes the letter "left" or "L".

Figure 7:
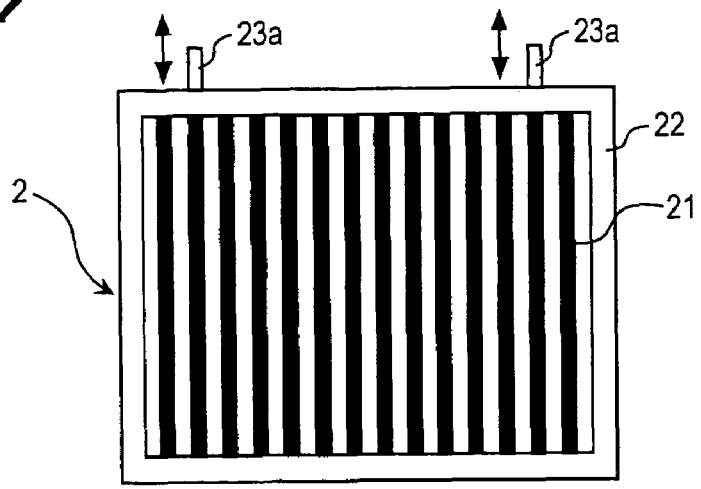
FIG. 7 is a front view of the image splitter in a second embodiment of the invention.
Figure 8:
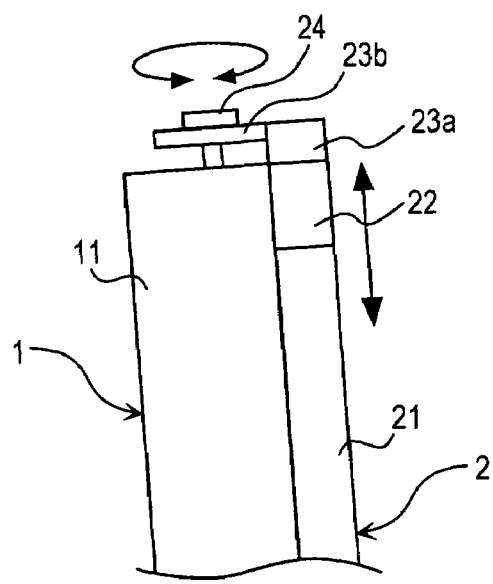
FIG. 8 is a side view showing a main part of the image splitter in the second embodiment of the invention.

Although the position adjustment in a horizontal direction can be made by shifting the image splitter 2 leftward and rightward, the horizontal position adjustment is not enough to create stereoscopic image with the image splitter 2 installed at a slant. With such a slanted image splitter 2, pixels may align with the shading thin films in a center part of the liquid crystal panel 11, but misalignment occurs in a vertical direction, thereby making it impossible for the viewer to perceive good stereoscopic images. Preferably the position adjustment in the slanting direction should be made easily. A second embodiment of the present invention teaches a way of adjusting finely and easily the image splitter 2 in the slanting direction. FIG. 7 is a front view of the image splitter in a second embodiment of the invention. FIG. 8 is a side view showing the main part of the image splitter.

In the second embodiment, as shown in FIG. 7, fastening parts 23a, each having a 90-degree bend, are also provided on both right and left sides of the top of the supporting frame 22 of the image splitter 2. The fastening parts 23a are designed, as described below, so as to move the image splitter 2 relative to the liquid crystal display 1 upward and downward when the fastening parts 23 are hooked on the top of the cabinet 12 of the liquid crystal display 1. At the upper part of the fastening part 23a of the second embodiment, provided is a protrusion 23b protruding over the cabinet 12 of the liquid crystal display 1 and having a screw hole thereon. When a screw 24 is inserted into the screw hole, the tip of the screw 24 abuts against the top of the cabinet 12 of the liquid crystal display 1, thereby fastening the image splitter 2 to the liquid crystal display 1.

The rotation of the screw 24 varies an amount of protrusion of the screw 24, consequently adjusts the position of the image splitter 2 in the vertical direction. Also an angle of the image splitter 2 to the liquid crystal display 1 can vary with the rotation of the screw 24. In this embodiment described above, the fine adjustment in a slanting direction can be made easily only by rotating the screw 24.

Although two fastening parts 23a on both sides are designed so as to move upward and downward in the embodiment shown in FIG. 7, the embodiment may be carried out by making either of these fastening parts 23a movable.

Figures 9A, 9B:
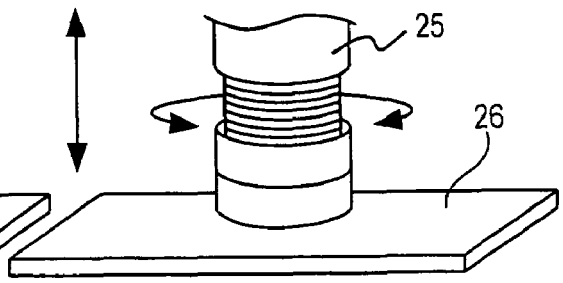
FIGS. 9A and 9B are perspective views showing a main part of the image splitter having another structure in the second embodiment of the invention.

FIGS. 9A and 9B illustrate another embodiment for height adjustment. The fastening part 23 of this embodiment has a leg 25. At an end of the leg 25, a fastening board 26 is provided so as to sit atop the cabinet 12 of the liquid crystal display 1. A screw is incorporated in the leg 25 and the turn of the leg 25 changes its height. The image splitter 2 can be installed to the liquid crystal display 1 by mounting the leg 25 having the fastening board 26 on the top of the cabinet 12 of the liquid crystal display 1.

When a middle part of the screw incorporated in the leg 25 is turned as shown in FIG. 9A, for example, the leg 25 changes its height as shown in FIG. 9B. Thus, the turn of the screw can adjust the position of the image splitter 2 not only in the vertical direction but also in a slanting direction easily and finely.

Figure 10:
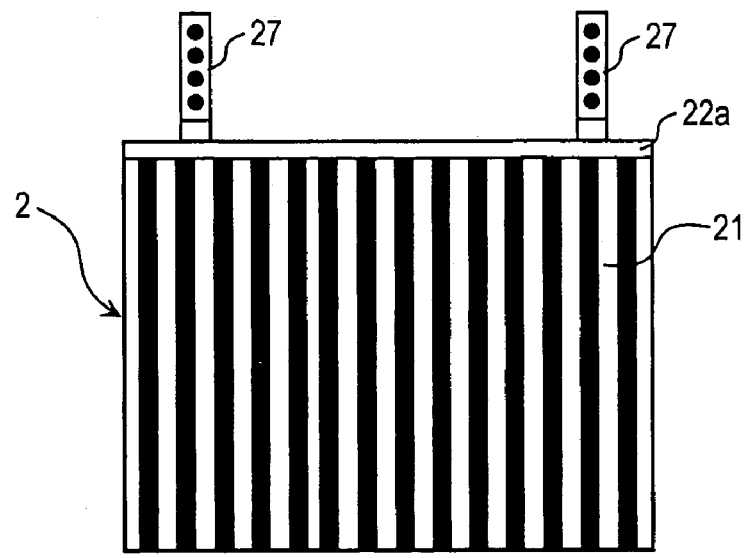
FIG. 10 is a front view showing a structure of an image splitter in a third embodiment of the invention.
Figure 11:
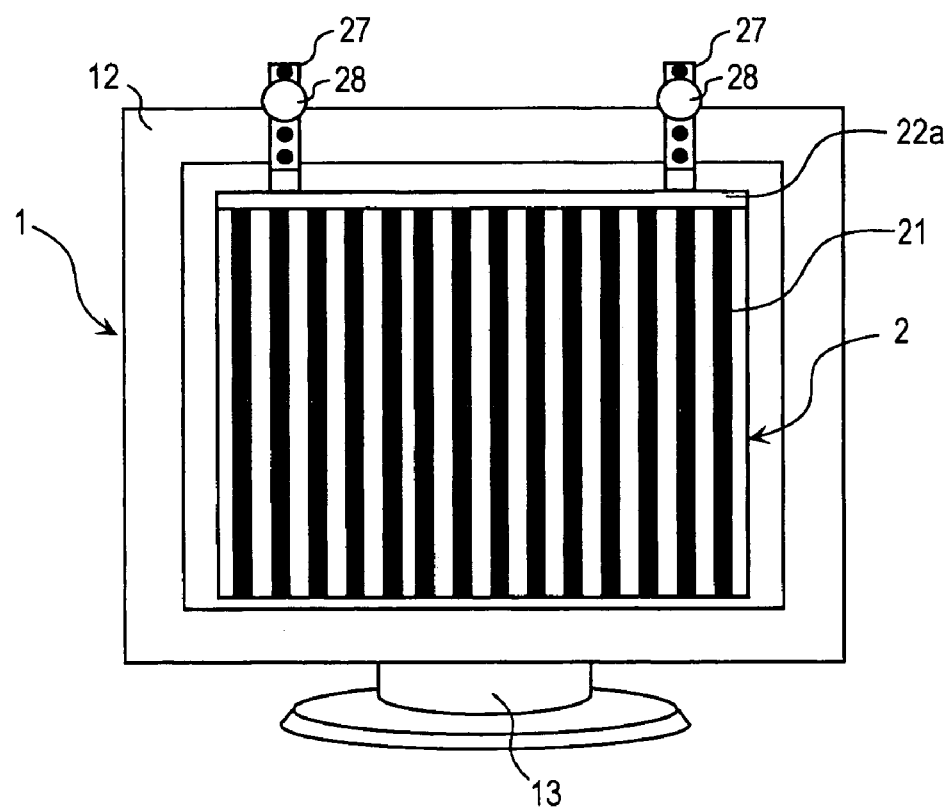
FIG. 11 is a front view of a liquid crystal display device with the image splitter installed thereon in the third embodiment of the invention.

Referring to FIGS. 10 to 13, a third embodiment of the image splitter of the present invention will be described. FIG. 10 is a front view showing a structure of an image splitter in the third embodiment. FIG. 11 is a front view of a liquid crystal display with the image splitter installed thereon.

Figure 12:
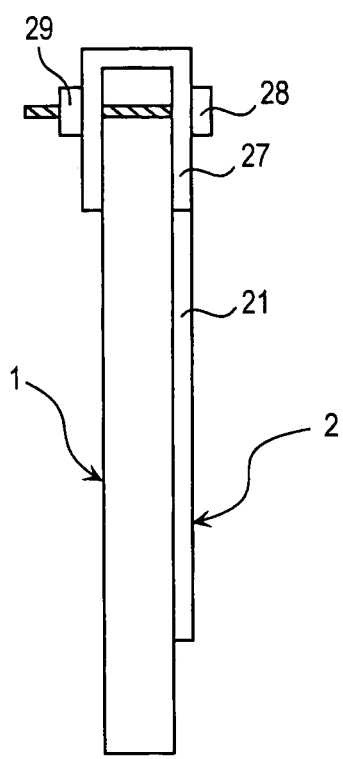
FIG. 12 is a side view of a liquid crystal display with the image splitter installed thereon in the third embodiment of the invention.

In this image splitter 2, a supporting frame 22a holds an upper part of a parallax barrier substrate 21. On the both sides of the supporting frame 22a, provided are fastening pieces 27 with a plurality of holes. As shown in FIG. 12, the fastening piece 27 is bent along a width of the top of the cabinet 12 of the liquid crystal display 1. A screw 28 is inserted from a hole to an opposite hole provided on the bent fastening piece 27 and is fixed with a nut 29 so that the fastening piece 27 sandwiches the cabinet 12 of the liquid crystal display 1. In this way the image splitter 2 is installed to the liquid crystal display 1 as shown in FIG. 11.

Figure 13A:
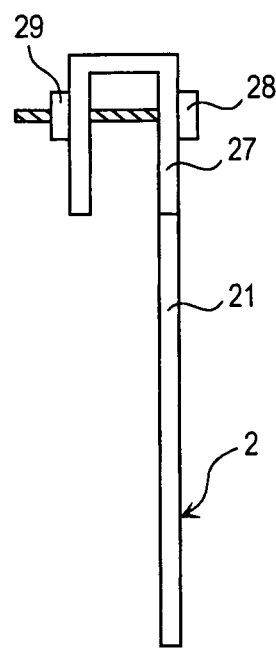
FIGS. 13A to 13C are side views each showing a state where the image splitter is installed in a different manner in the third embodiment of the invention.
Figure 13B:
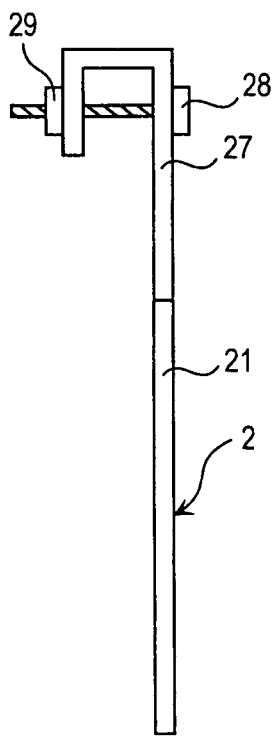
Figure 13C:
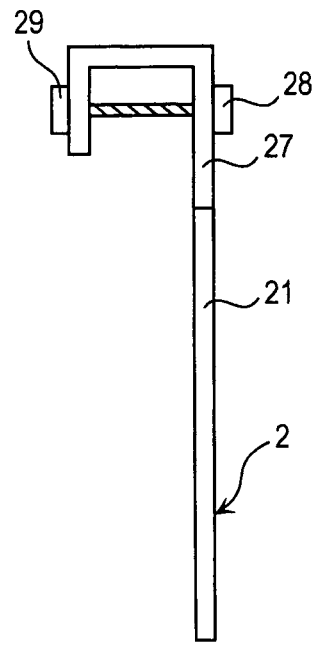

The fastening piece 27 has a plurality of holes to fix the image splitter 2 at some levels. In other words, the position of the image splitter 2 varies in the vertical direction by changing the hole into which the screw is inserted. Specifically, as shown in FIGS. 13A and 13B, when the screw is inserted into different holes, a part of the image splitter 2 in contact with the liquid crystal display 1 is shifted, thereby adjusting the position of the image splitter. FIG. 13C indicates that the fastening piece 27 is adaptable to the wider cabinet 12 of the liquid crystal display 1 by inserting the screw into other hole.

Figure 14A:
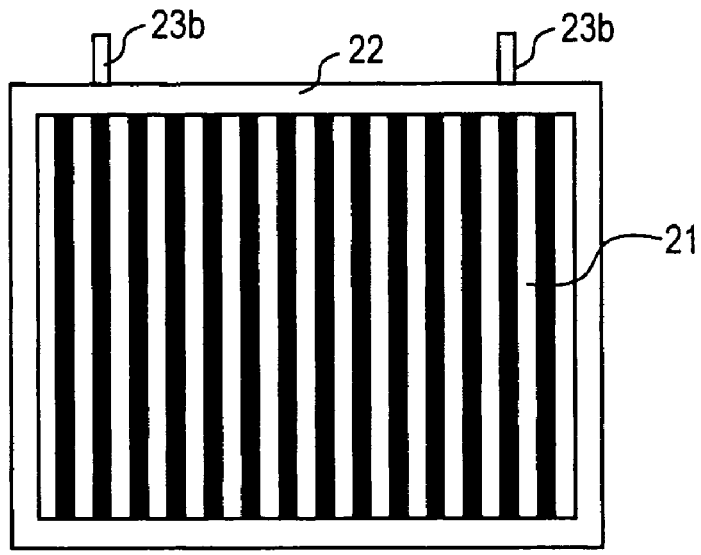
FIG. 14A is a front view and FIG. 14B is a cross-sectional side view, each showing an image splitter in a fourth embodiment of the invention, particularly a parallax barrier which is held with its four sides by a supporting frame.
Figure 14B:
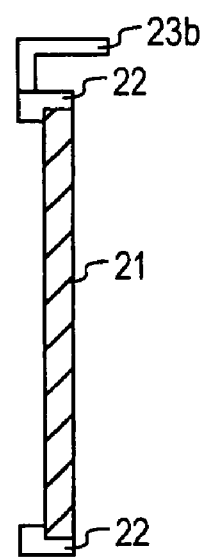
Figure 15A:
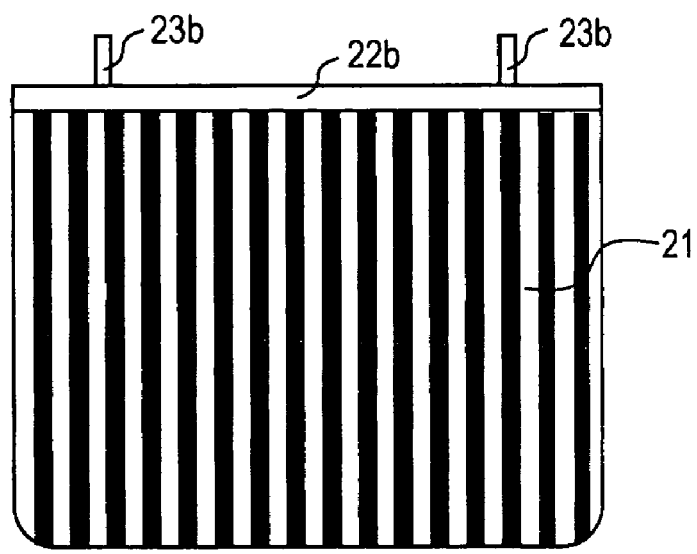
FIG. 15A is a front view and FIG. 15B is a cross-sectional side view, each showing the image splitter in the fourth embodiment of the invention, particularly a parallax barrier which is held with its upper side by the supporting frame.
Figure 15B:
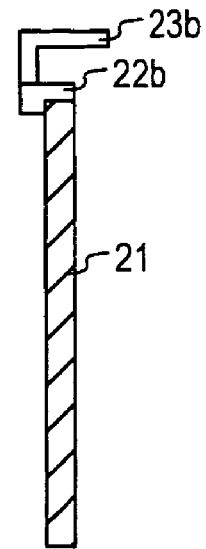

FIGS. 14A, 14B and 15A, 15B show image splitters in a fourth embodiment of the invention. The fastening member 23b is hooked on a top of a cabinet of a liquid crystal display so that the image splitter 2 of the fourth embodiment is hanged facing the liquid crystal panel 11. FIGS. 14A and 14B show a structure of the image splitter in which a supporting frame 22 holds four sides of a parallax barrier substrate 21. FIGS. 15A and 15B show a structure of the image splitter in which the supporting frame 22b holds an upper part of the parallax barrier substrate 21.

The fastening members 23b are joined to the upper part of these supporting frames 22 and 22b. Also protrusions are formed at one side of the supporting frames 22 and 22b. A parallax barrier substrate 21 is fitted into the inside of the protrusion of the frame 22 or into the bottom of the protrusion of the frame 22b so that a surface of the protrusion and the parallax barrier substrate 21 on the side of the liquid crystal panel 11 form one plane, without creating steps.

As shown in FIGS. 14B and 15B, the parallax barrier substrate 21 is held further back than the front surface of the supporting frames 22 and 22b.

Figure 16:
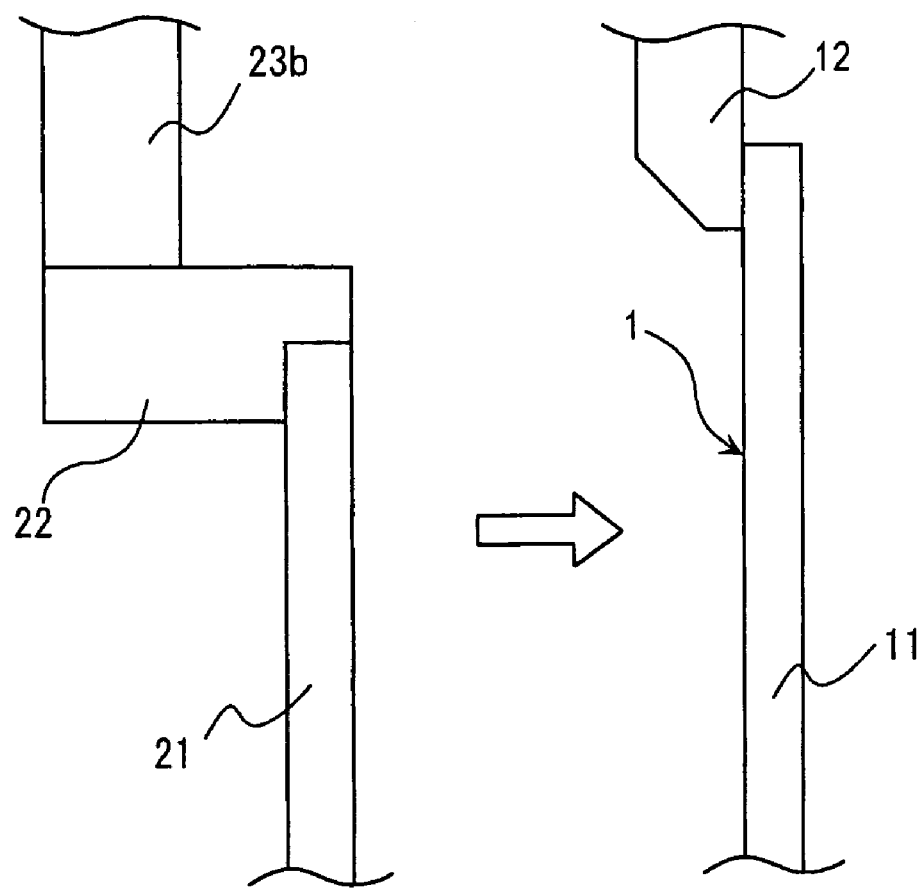
FIG. 16 is a side view showing a state where the image splitter in the fourth embodiment of the invention is being installed to the liquid crystal display.

According to above-mentioned structure, the parallax barrier substrate 21 can be held in the vicinity of the liquid crystal panel 11 even if a part of the cabinet 12 juts out of the liquid crystal panel 11 as shown in FIG. 16. Also the image splitter 2 does not scratch the surface of the liquid crystal panel 11 since there is no protruding part formed on the side of liquid crystal panel 11.

These supporting frames have a role of preventing damage to the image splitter, but a risk of hiding a perimeter of the display surface of the liquid crystal display. To solve this problem the supporting frames may be made of translucent materials. It is acceptable if a viewer manages to recognize images on the display through the translucent material, so the translucent materials are unnecessary to be colorless and transparent.

Figure 17:
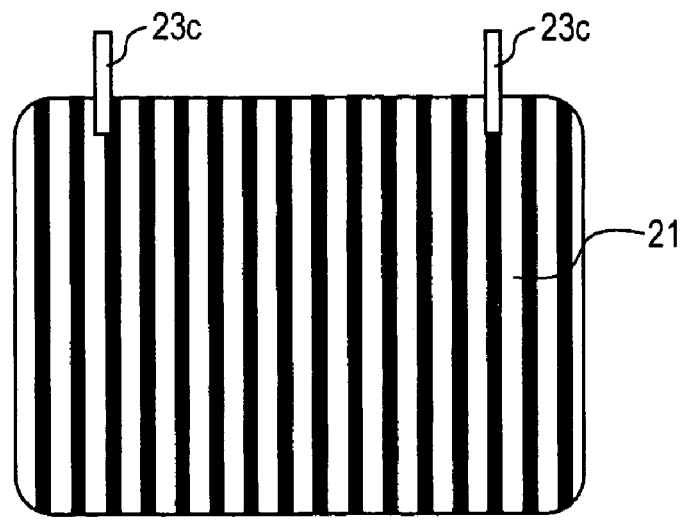
FIG. 17 is a front view of an image splitter in a fifth embodiment of the invention.
Figure 18:
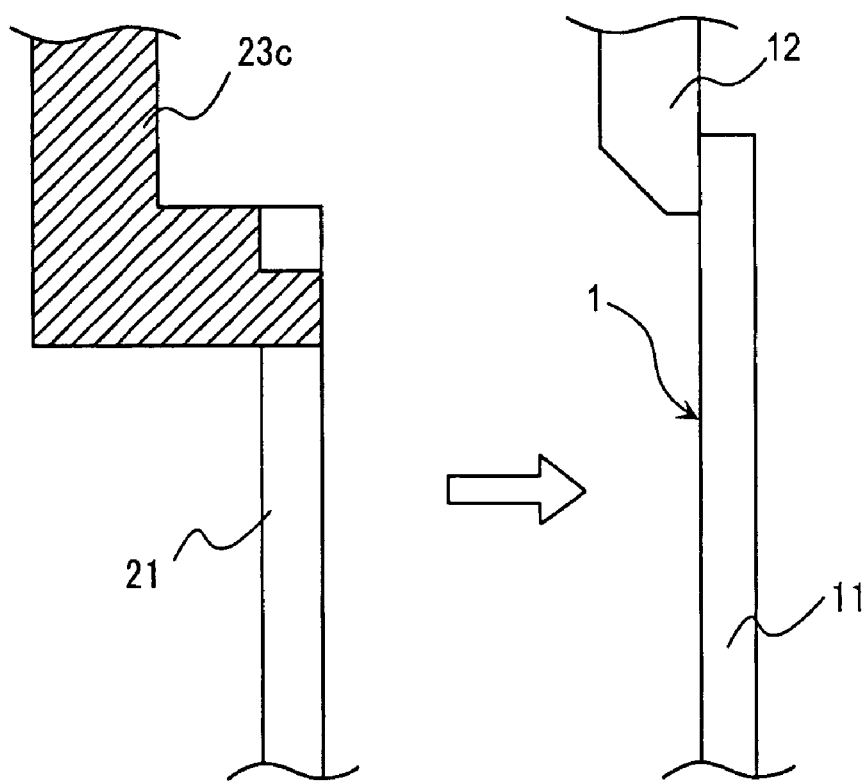
FIG. 18 is a side view showing a state where the image splitter in the fifth embodiment of the invention is being installed to the liquid crystal display.

FIGS. 17 and 18 show an image splitter of a fifth embodiment of the invention.

An image splitter 2 is hanged from the liquid crystal display 1 by fastening members 23c, facing the liquid crystal panel 11. A protruding section is formed on the fastening member 23c to join the parallax barrier substrate 21. The protruding section is inserted into a hole provided on the parallax barrier substrate 21 to join the fastening member 23 and the parallax barrier substrate 21. An end of the protruding section and the parallax barrier substrate 21 are joined to make one plane, without creating steps, on a side of the liquid crystal panel 11. If the parallax barrier substrate 21 and the fastening members 23c may be joined together with an adhesive agent, there is no worry that steps are created on the image splitter 2 on the side of the liquid crystal panel 11.

After being joined with the fastening member 23c, the image splitter 2 is held in the vicinity of the liquid crystal panel 11 as shown in FIG. 18. The image splitter 2 hardly causes damage to the surface of the liquid crystal panel 11 because any protruding part is not formed on the side of the liquid crystal panel 11.

Referring to FIGS. 19 to 23, the image splitter in a sixth embodiment of the invention will be described.

Figure 19:
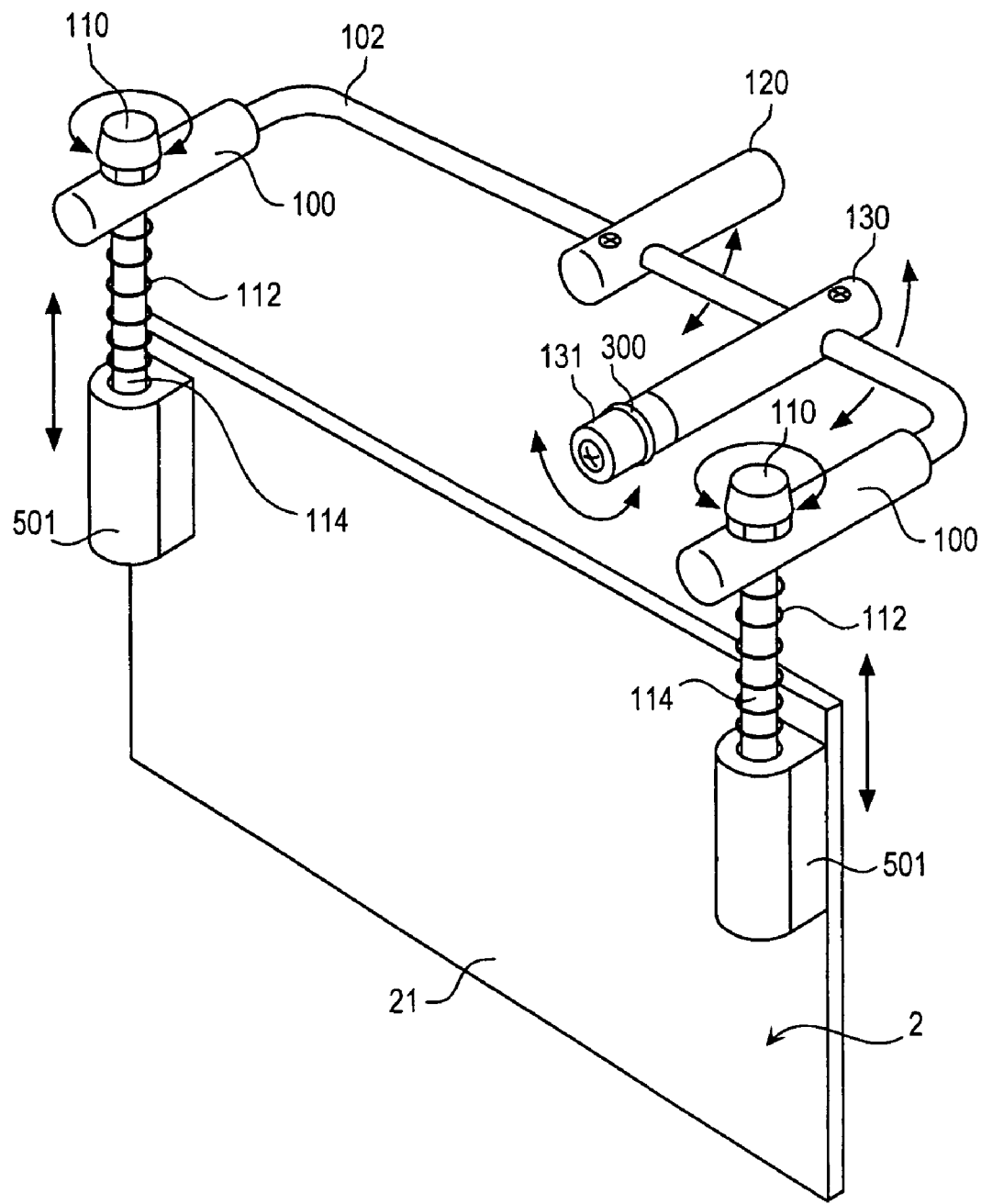
FIG. 19 is a perspective view of an image splitter in a sixth embodiment of the invention.
Figure 20:
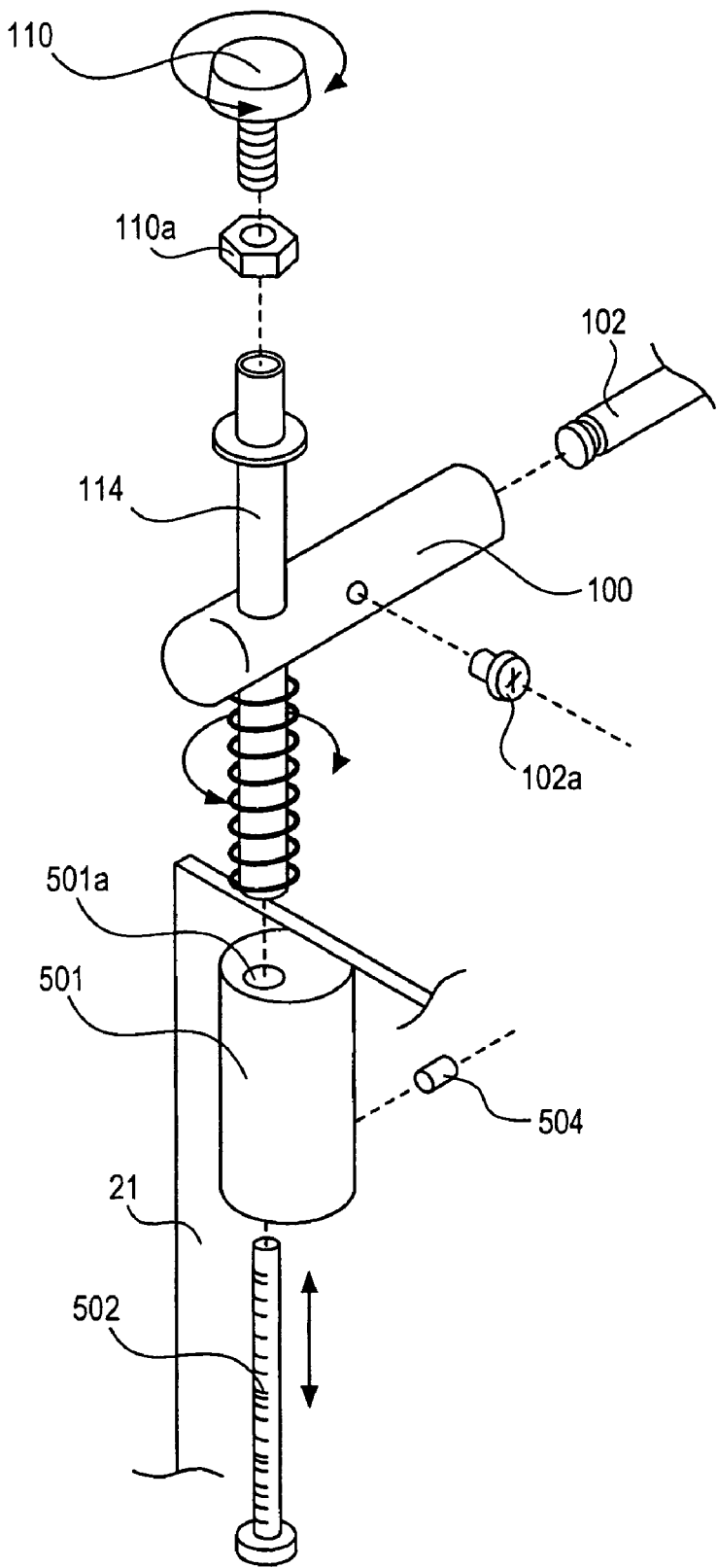
FIG. 20 is an exploded perspective view showing a structure of mounting members to install the image splitter to the liquid crystal display.

FIG. 19 is a perspective view of the image splitter in the sixth embodiment. FIG. 20 is an exploded perspective view showing a structure of mounting members to install the image splitter to the liquid crystal display.

As shown in FIG. 19, mounting bases 501 are fixed on both right and left ends of the parallax barrier substrate 21 of the image splitter 2 in the sixth embodiment to mount the mounting members. Mounted to these mounting bases 501 are mounting members that are supported on a top of a cabinet of the liquid crystal display 1.

Figure 21:
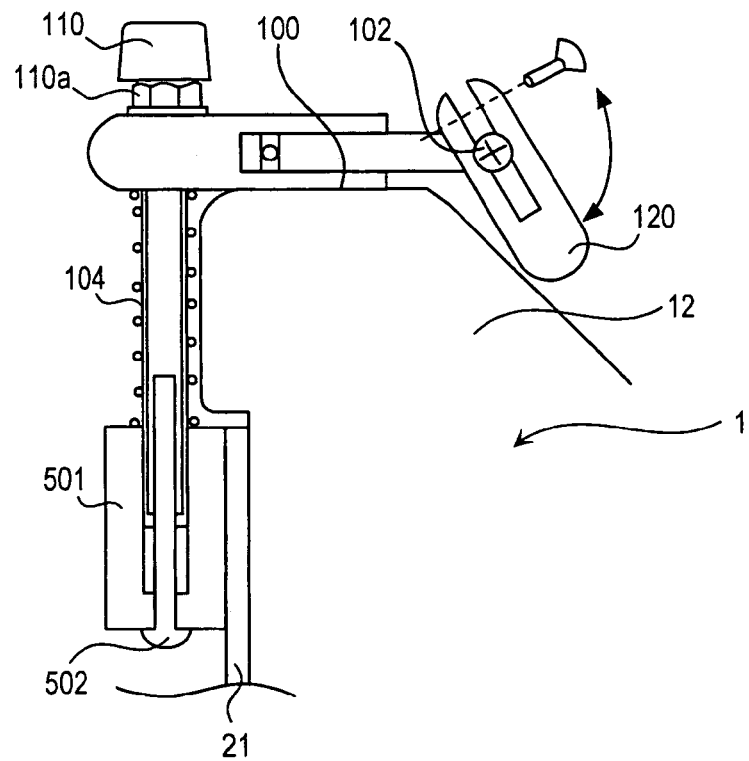
FIG. 21 is a side view showing a state where the image splitter in the sixth embodiment of the invention is installed to the liquid crystal display.

As mentioned above, fastening parts are hooked on the top of the cabinet 12 of the liquid crystal display 1 and supports the image splitter 2. In a structure that the fastening part supports the image splitter at the top of the cabinet 12 of the liquid crystal display 1, supporting the image splitter 2 with a plurality of points makes it more suitable to various shapes of the liquid crystal display 1. In the sixth embodiment, therefore, cylindrical fastening parts 100 are designed so as to contact with the top of the cabinet 12 of the liquid crystal display 1 at the both ends, namely two points. Specifically, the two fastening parts 100 in the vicinity of the right and left ends shown in FIG. 19 contact with the top of the cabinet 12 of the liquid crystal display 1 and are supported as shown in FIG. 21. According to this way, the image splitter can be installed regardless of the shape of the top of the liquid crystal display 1. Even if the cabinet 12 has an even top but a protrusion in its center, the installation of the image splitter is possible in a same mechanism. Applying pressure to the fastening parts with its own weight allows the fastening parts not only to move smoothly in a horizontal direction to adjust the position of the image splitter 2 but also to fix the image splitter 2 firmly after the adjustment, thereby hardly causing displacement by vibration etc. Also the fastening parts can be easily mounted and demounted; in other words the fastening part has a great reproducibility.

Referring to FIG. 20, a description will be made on a structure of attaching the fastening part 100 to the mounting base 501.

A cylindrical pipe 114 is inserted into the cylindrical fastening part 100. The pipe 114 has screw holes on both ends. A knob 110 is fixed to one end of the pipe 114 with a nut 110a so that the pipe 114 and the knob 110 rotate together.

The mounting base 501 has a hole 501a with a bigger diameter than that of the pipe 114 and is fixed to a frame which holds the parallax barrier substrate 21 or a parallax barrier plate.

A screw 502 is inserted from the bottom of the mounting base 501 to connect with the screw hole provided at the lower end of the pipe 114 and is fixed immovably with a small screw 504 at a lower position of the mounting base 501.

The fastening part 100 is mounted to the mounting base 501 by slipping a coil spring 112 on the pipe 114 and inserting the pipe 114 into the hole 501a of the mounting base 501 so as to engage with a screw 502. The coil spring 112, which is slipped on the pipe 114, works to set the fastening part 100 at a predetermined height from the mounting base 501.

When the knob 110 is turned, the screw mechanism constituting of the pipe 114 and the screw 502 performs its function, moving the pipe 114 and the knob 110 upward and downward together. According to this, the length of the pipe 114 can be adjusted corresponding to the length of the cabinet of the display. The rotation adjustment is also possible.

The left fastening part 100 and the right fastening part 100 are coupled and fixed to a coupling pipe 102 in U-shape. Specifically each end of the coupling pipe 102 is inserted into each fastening part 100 and fixed with a screw 102a. Due to such an integrated structure in which left and right fastening parts 100 are coupled, the left and right mounting bases 501 move together during horizontal adjustment, thereby enhancing stability with a removal of distortion during and after adjustment. Thus the coupling member may be preferably selected from materials having high-strength and low elasticity. In FIG. 19, the fastening parts are coupled with a metal pipe 102. The metal pipe 102 and the fastening parts 100 can be made in one piece. Also the metal pipe 102 is designed to be bent and placed in a rearward position of the liquid crystal display 1. According to such a design of the coupling pipe, the image splitter can be hanged from the top on a side of a personal computer to be stored when the image splitter is removed from the liquid crystal display and out of use.

Parts, which adjust the height and the angle (θ), of the fastening parts 100 on both sides are usually secured under condition that a force is applied downward. However the fastening part 100 preferably should not move easily even when the force is applied upward. An impact made by installation and removal of the image splitter spoils the adjustment, resulting in deterioration of reproducibility. To solve this problem, the pipe 114 is designed to move through the hole provided forward of the fastening part 100 but not to move downward by means of the knob 110. The coil spring 112, which slips on the pipe 114, works to prevent the pipe 114 from moving upward easily and maintains it in the adjusted state. Another method of preventing the movement of the pipe 114 is providing a rubber ring immediately underneath the hole formed forward of the fastening part 100.

The image splitter 2 can be installed at a required position of the liquid crystal display 1 by which the fastening parts 100 of the image splitter 2 contact with and are supported by the top of the cabinet 12 of the liquid crystal display 1.

Figure 22:
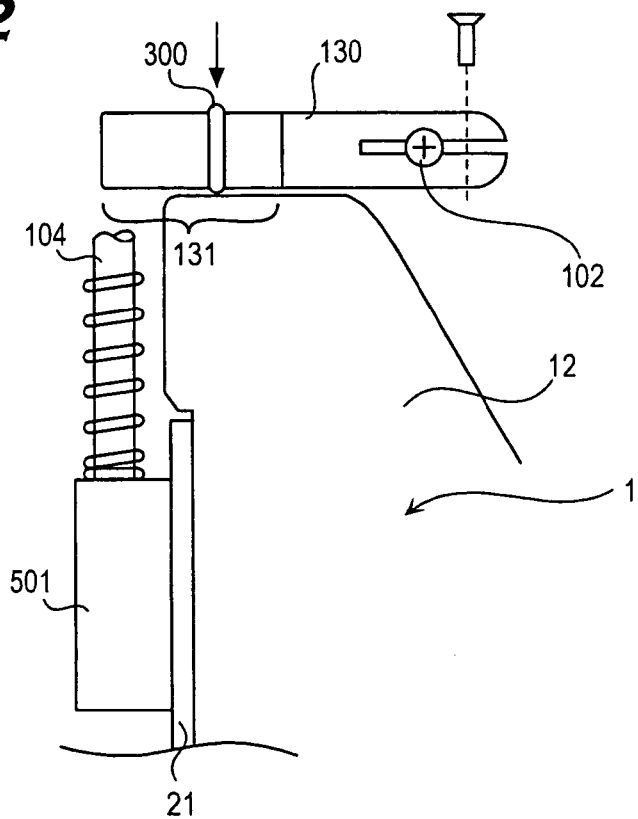
FIG. 22 is a side view showing a state where the image splitter in the sixth embodiment of the invention is installed to the liquid crystal display and adjusted in a horizontal direction.
Figure 23:
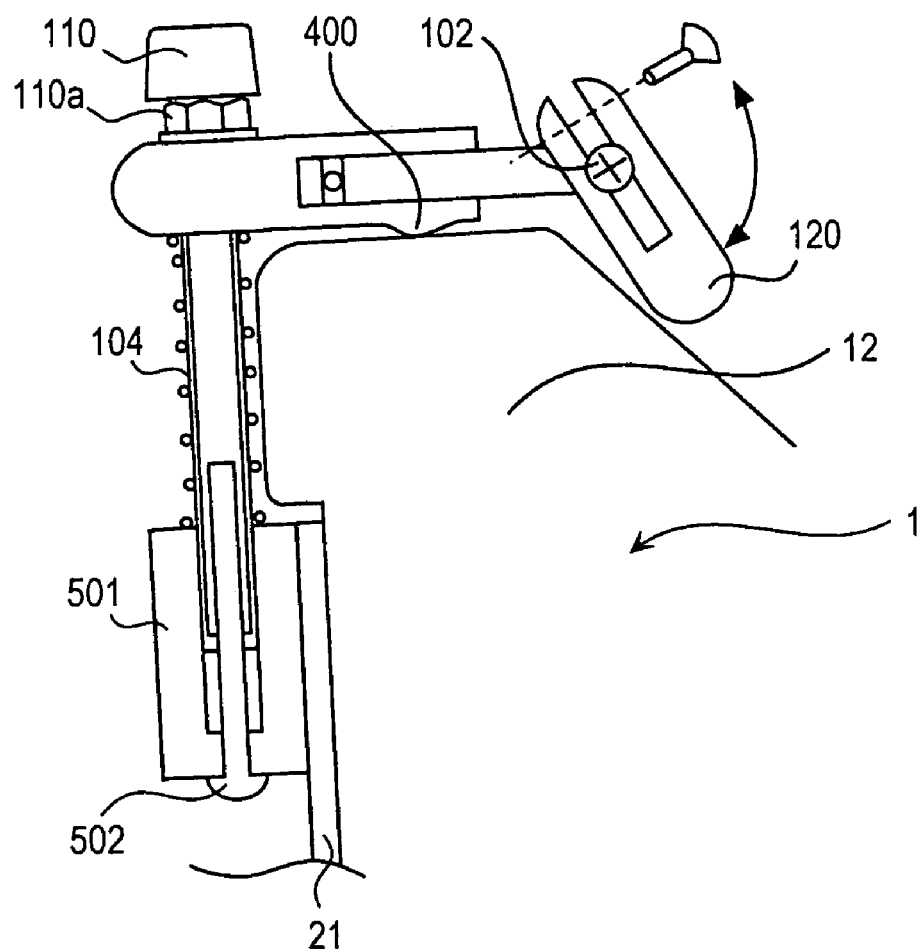
FIG. 23 is a side view showing a state where another image splitter in the sixth embodiment of the invention is installed to the liquid crystal display.

In the sixth embodiment, as shown in FIG. 19, the metal pipe 102 is provided with a drop preventer 120. As shown in FIGS. 21, 22, the drop preventer 120 is tilted to the back of the liquid crystal display 1. Usually liquid crystal displays are used with the screen straightened up or tilted slightly backward. The drop preventer 120 prevents the image splitter from falling when the liquid crystal display is tilted forward by mistake or when a force is applied in unexpected situations.

Also the drop preventer 120 is designed to rotate around the metal pipe 102 by applying forces, thereby moving the drop preventer 120 out of the way when mounting and demounting this present invention. In addition the drop preventer 120 is available to the various shape of the display and dose not necessarily to contact with the back surface of the display.

The coupling metal pipe 102 in the sixth embodiment is provided with a horizontal position adjuster 130. The adjuster 130, as shown in FIGS. 19 and 22, includes a contact part 131 that contacts with the liquid crystal display 1 and rotates on the display 1. The contact part 131 rotates as being pushed against the top of the cabinet 12 of the liquid crystal display 1 in the direction indicated by the arrow in FIG. 22, which making the image splitter possible to move in the horizontal direction with respect to the liquid crystal display 1. Although the adjuster 130 keeps the contact with the top of the cabinet 12 of the liquid crystal display 1 even if the user takes off his/her hands, the adjuster 103 dose not counteract the effect of the left and right fastening parts 100 substantially since the adjuster 103 is designed to rotate around the metal pipe 102. Also the adjuster 130 comprises a rubber ring 300 that increases friction to prevent slipping during rotation.

If the image splitter is structured so that some forces are exerted on the image splitter to press against the display surface of the liquid crystal display during vertical, rotation and horizontal adjustments, the image splitter may misalign from the display due to the forces released after the completion of the adjustments. According to the above-mentioned structure, such forces are not exerted on the image splitter, thereby stabilizing the adjustment.

Also the image splitter may be structured so as to press the parallax barrier substrate 21 against the screen by applying the principle of leverage. If a contact part 400 in FIG. 23, for example, is formed further back than the screen surface, the image splitter 2 can be installed even to the liquid crystal display 1 which is tilted forward, thereby improving safety.

Additionally the image splitter can be designed to be installed to a liquid crystal display 1 of a notebook personal computer. The liquid crystal display 1 of the notebook personal computer opens and closes freely. If the liquid crystal display 1 is closed with the image splitter stayed as it is installed, damage may result. Many people hold an upper part of the display to close it, so the metal pipe 102 is provided to the upper part of the display where people hold. An existence of the metal pipe 102 makes a user aware of that the image splitter is installed to the liquid crystal display and prevents the user from closing the liquid crystal display by accident.

Figure 24:
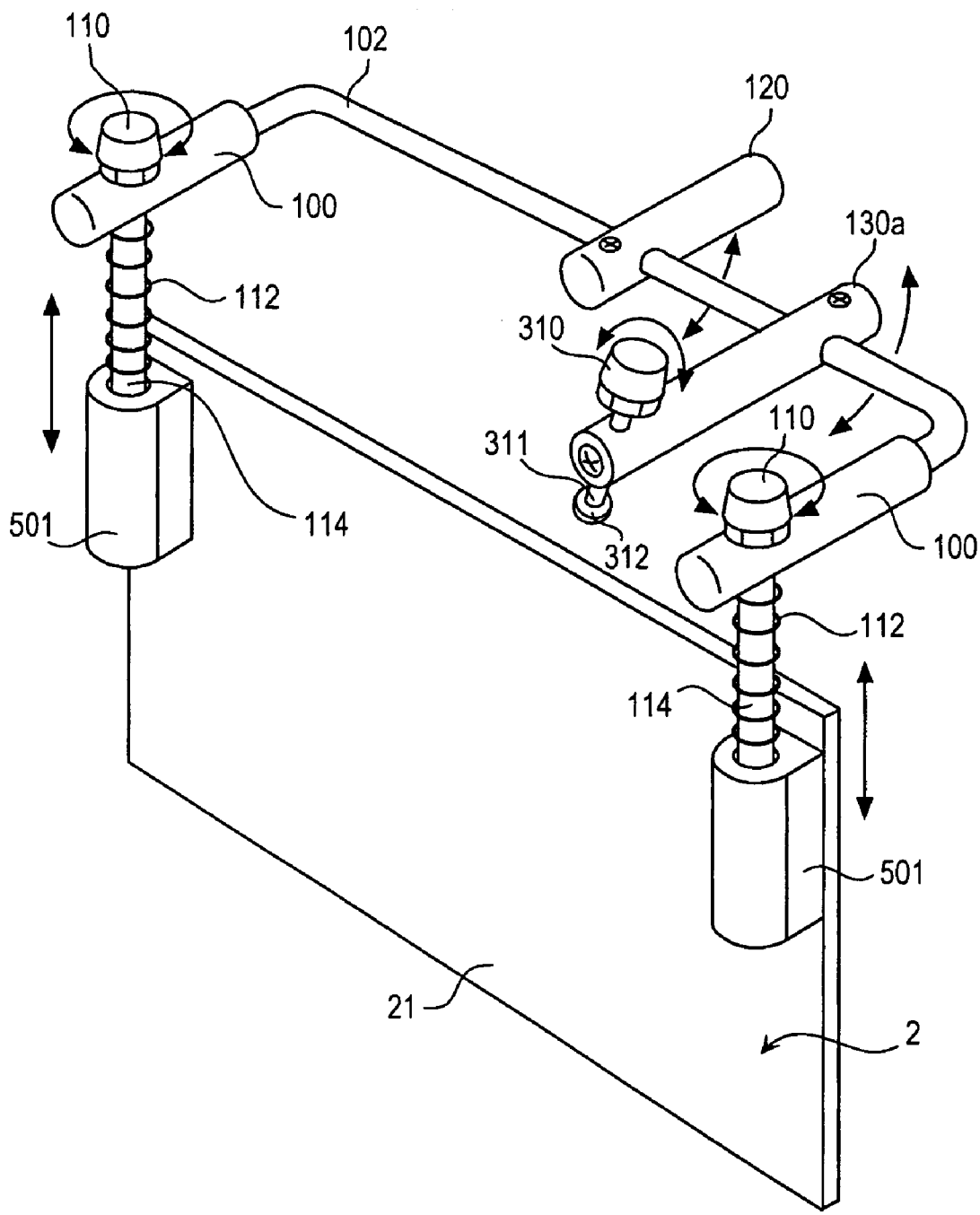
FIG. 24 is a perspective view of an image splitter in a seventh embodiment of the invention.
Figure 25:
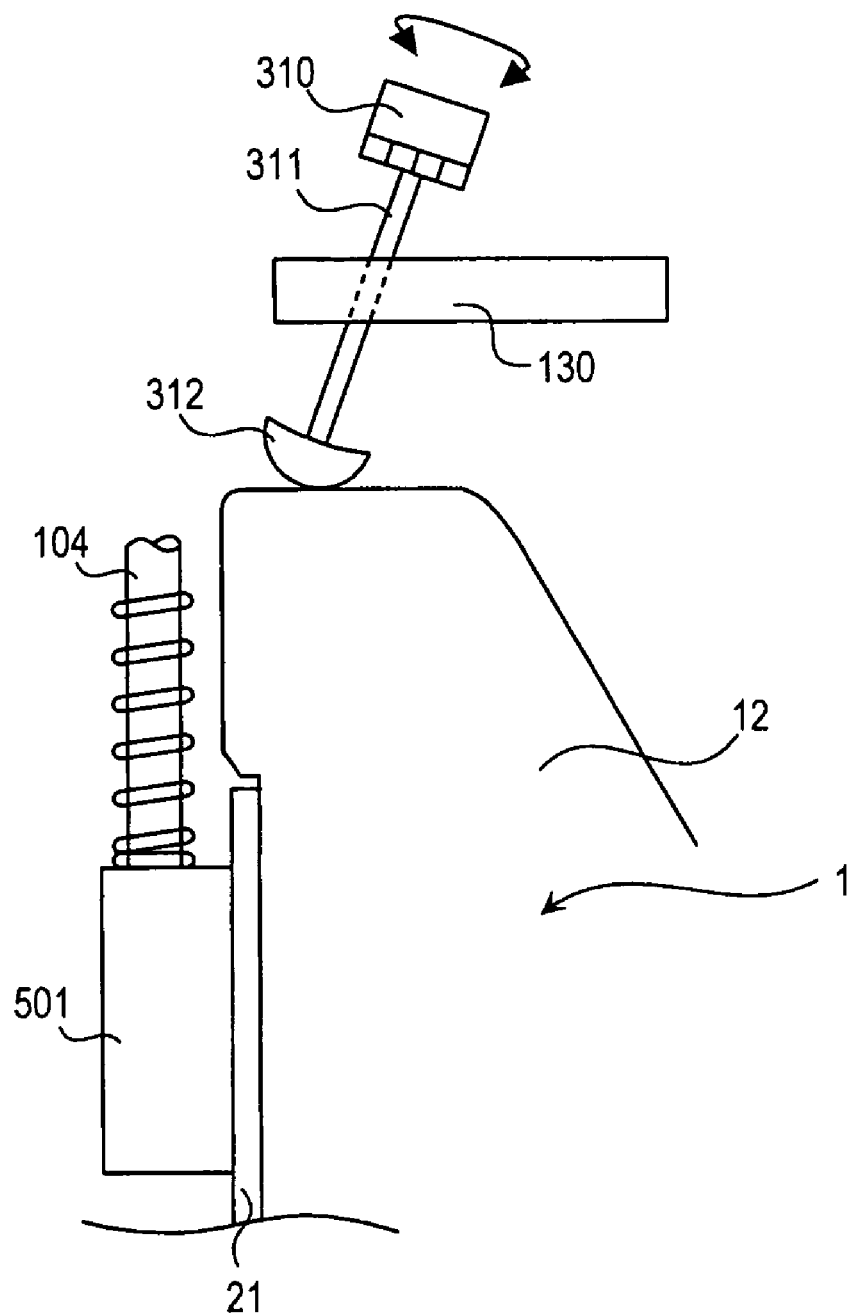
FIG. 25 is a schematic side view showing a structure of a horizontal position adjuster of the image splitter in the seventh embodiment of the invention.

FIGS. 24 and 25 each show an image splitter in a seventh embodiment of the invention, particularly a modification of horizontal position adjuster of the image splitter in the sixth embodiment. FIG. 24 is a perspective view of the image splitter of the seventh embodiment and FIG. 25 is a schematic side view of the structure of the horizontal position adjuster. Components same as that in the sixth embodiment are given same reference numbers and omitted their explanation to avoid overlaps.

In the sixth embodiment, the horizontal position adjuster moves the image splitter horizontally by turning the contact part 131 as pushing it against the top of the cabinet 12 of the liquid crystal display 1 in the direction indicated by the arrow in FIG. 22. On the other hand, a horizontal position adjuster 130a in the seventh embodiment comprises a horizontal adjustment knob 310 around one end of the adjuster 130a. At an end of the adjustment knob 310, provided is a bolt 311 including a hemispherical rubber contact part 312 that makes contact with the top of the cabinet 12 of the liquid crystal display 1. The adjuster 130a has a screw hole in which the bolt 311 is screwed.

The screw hole of the adjuster 130a, as shown in FIGS. 24 and 25, is formed at a slant instead of being formed at right angle to the adjuster 130a. When the bolt 311 is inserted into the screw hole, the horizontal adjustment knob 310, bolt 311 and the rubber contact part 312 are set at a slant with respect to the top of the cabinet 12 of the liquid crystal display 1.

When the horizontal adjustment knob 310 rotates in the direction indicated by the double-headed arrow in FIG. 25, the rubber contact part 312 exerts forces on the cabinet 12 of the liquid crystal display 1 in a horizontal direction, thereby moving the image splitter horizontally with respect to the liquid crystal display 1.

In this embodiment, the horizontal position of the image splitter can be adjusted by turning the adjustment knob 310, which makes the adjustment easier than that in the sixth embodiment which the adjuster 130 is rotated as being pushed from above. The smaller a turning radius of the contact part 312 becomes than that of the adjustment knob 310, the more finely an adjustment can be made.

With reference to FIGS. 26 to 29 descriptions will be made on an image splitter in an eighth embodiment of the invention. In the eighth embodiment, the invention is applied to a notebook personal computer.

Figure 26:
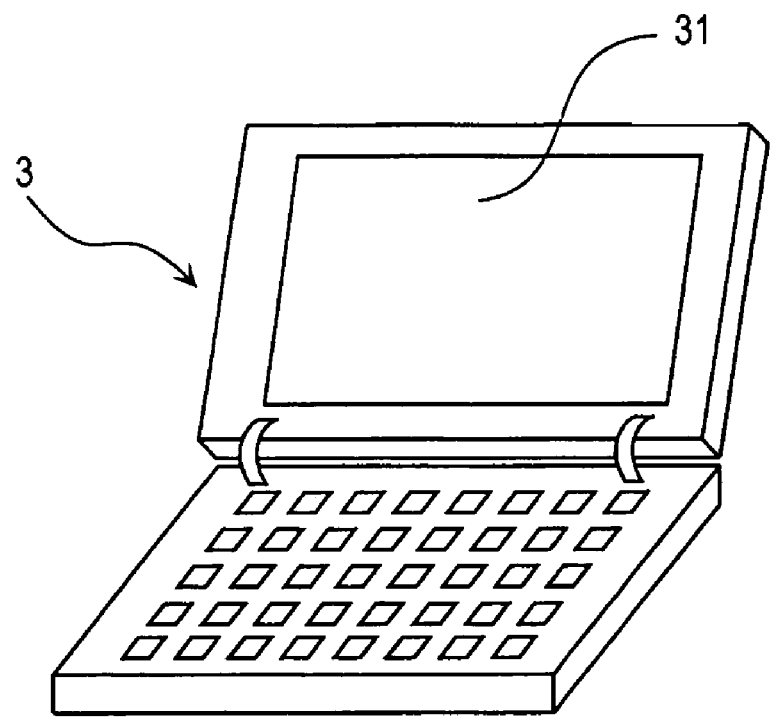
FIG. 26 is a perspective view of a notebook personal computer to which an image splitter in an eighth embodiment of the invention is applied.
Figure 27:
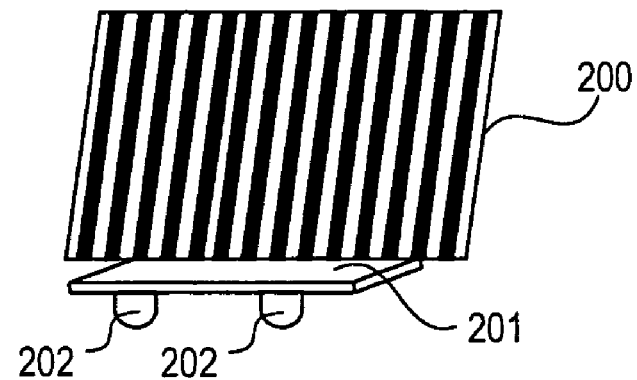
FIG. 27 is a perspective view showing a structure of the image splitter in the eighth embodiment of the invention.

In the eighth embodiment of the present invention, an image splitter 200 in FIG. 27 is installed on a display screen 31 of a notebook personal computer 3 in FIG. 26. The notebook personal-computer 3 in FIG. 26 can be used as a stereoscopic image display device by installing the image splitter 200 on the display surface 31. A mounting member 201 is provided at the bottom of the image splitter 200. The mounting member 201 comprises legs 202 each having a feed-screw that is rotated to adjust the position of the image splitter 200 in a vertical direction.

Figure 28:
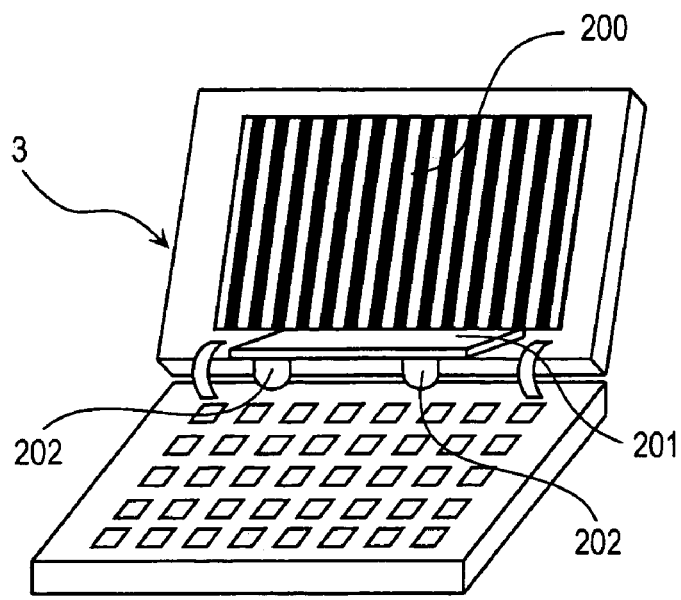
FIG. 28 is a perspective view showing a state where the image splitter in the eighth embodiment of the invention is installed to the notebook personal computer.
Figures 29A, 29B:
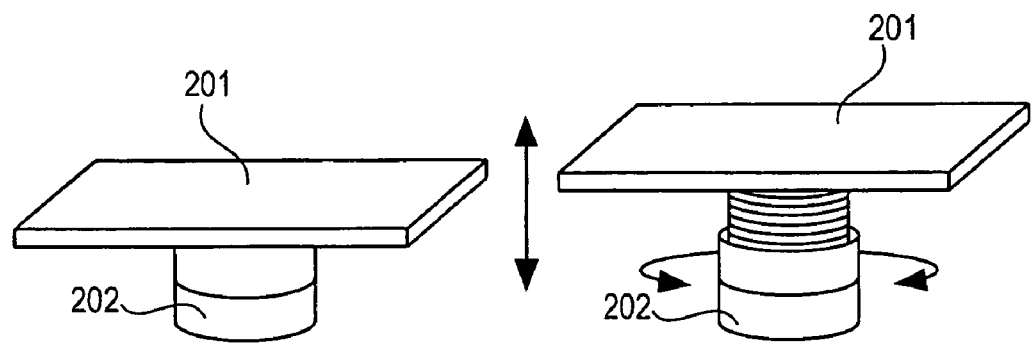
FIGS. 29A and 29B are perspective views, each showing parts which adjust the height of the image splitter in the eighth embodiment of the invention.

To adjust the vertical position of the image splitter 200 of FIG. 27, which is mounted on the display screen 31 of the notebook personal computer 3 of FIG. 26, with the use of the mounting member 201, for example, the feed-screws inside the legs 202 of the mounting member 201 provided at the bottom of the image splitter 200 are turned to adjust the position of the image splitter in the vertical direction as leaving the image splitter 200 on the notebook personal computer 3 as shown in FIG. 28. FIGS. 29A and 29B show a process that the top of the mounting member 201 is moved upward and downward to push the bottom of the image splitter 200 by turning the feed-screw, thereby adjusting the position of the image splitter 200 in a vertical direction.

Next, descriptions will be made on an image splitter in a ninth embodiment of the present invention with reference to FIGS. 30 to 36.

Figure 30:
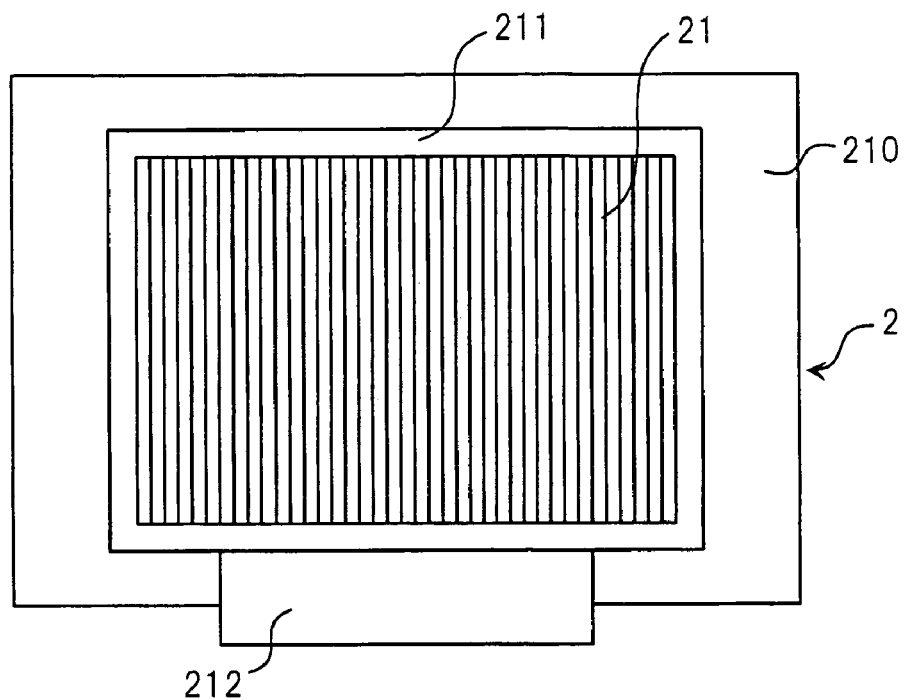
FIG. 30 is a front view of an image splitter in a ninth embodiment of the present invention.
Figure 31:
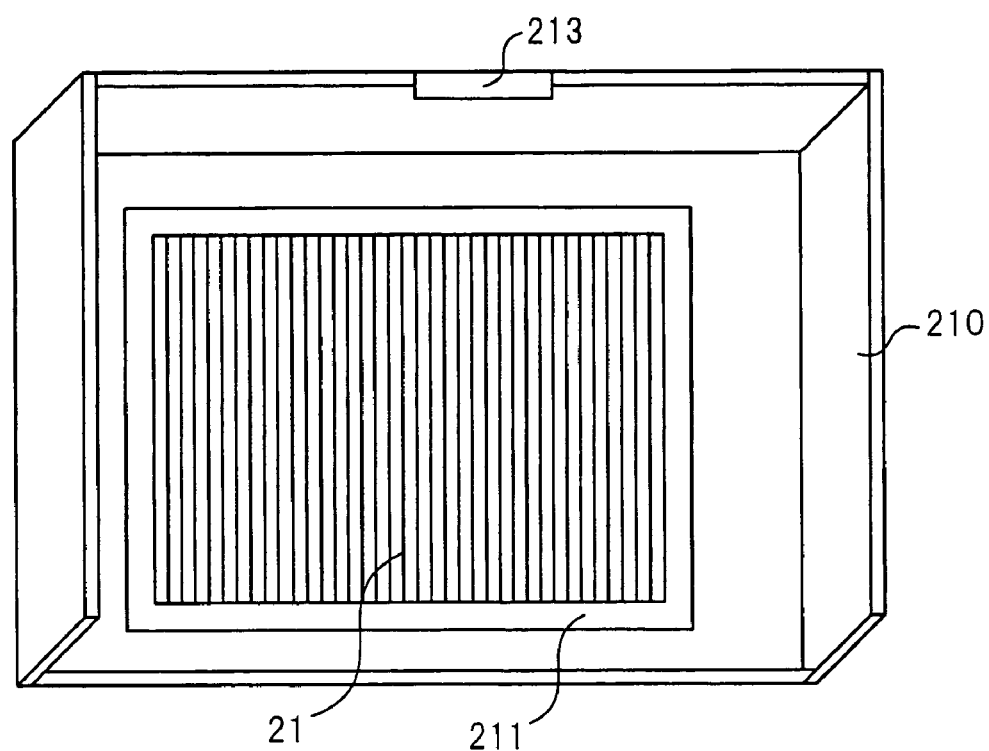
FIG. 31 is a perspective view of the image splitter in the ninth embodiment of the invention, as seen from the back.
Figure 32:
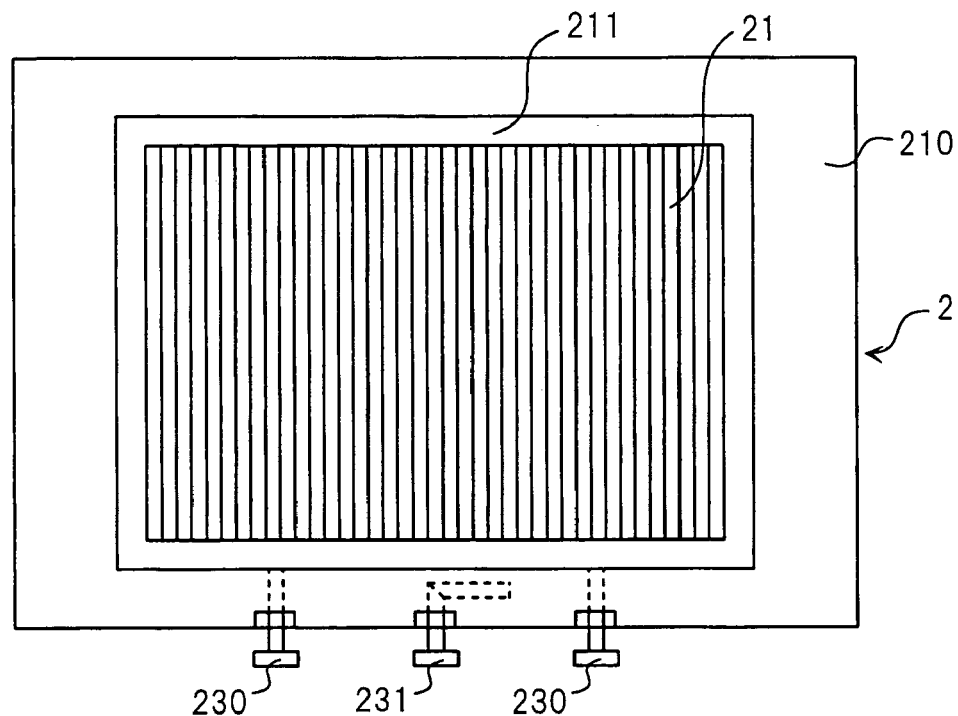
FIG. 32 is a front view of the image splitter in the ninth embodiment of the invention.
Figure 33:
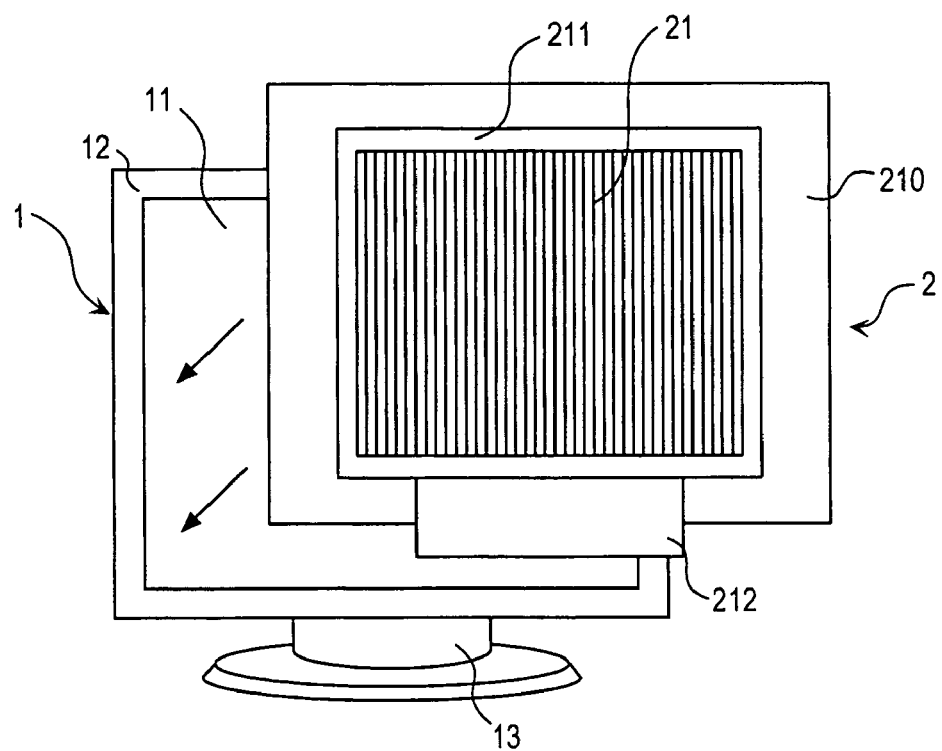
FIG. 33 is a front view showing a state where the image splitter in the ninth embodiment of the invention is being installed to the liquid crystal display.
Figure 34:
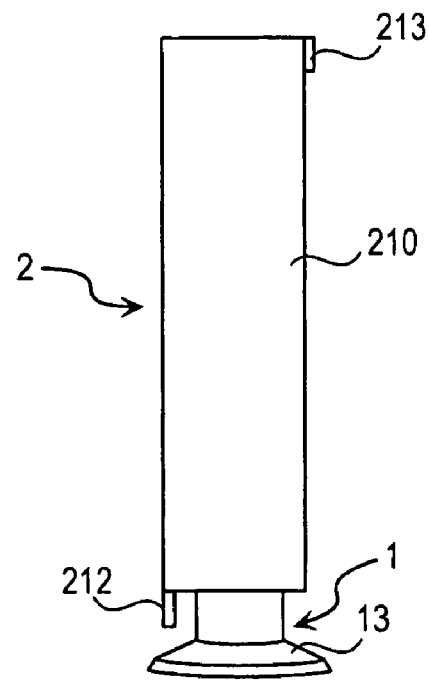
FIG. 34 is a side view showing a state where the image splitter in the ninth embodiment of the invention is installed on the liquid crystal display.
Figure 35:
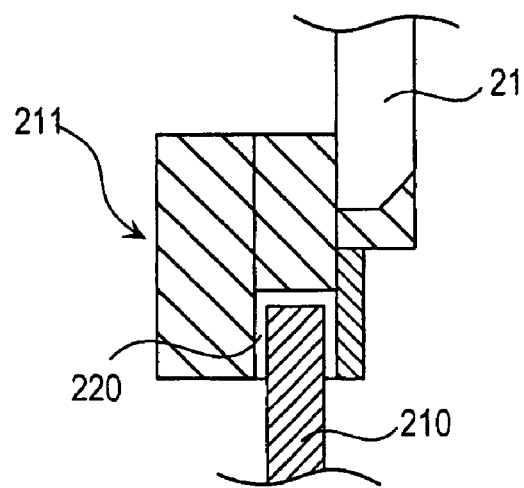
FIG. 35 is a cross-sectional view showing a main part of the image splitter in the ninth embodiment of the invention.
Figure 36:
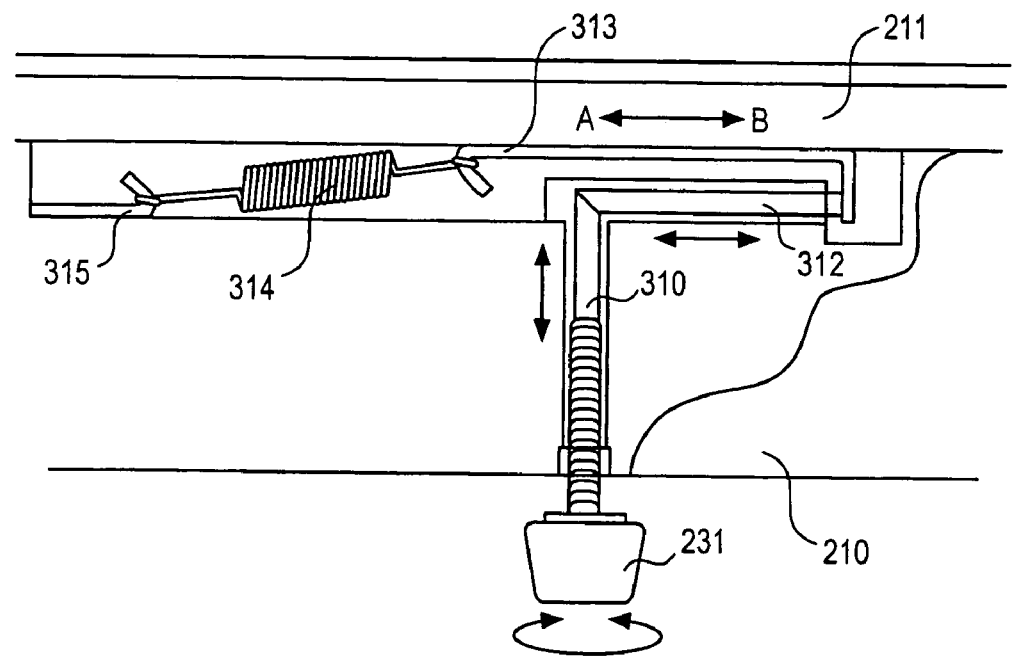
FIG. 36 is a front view, partly cut away, of a horizontal adjustment mechanism of the image splitter of the invention.

FIG. 30 is a front view of an image splitter in the ninth embodiment of the invention. FIG. 31 is a perspective view of the image splitter in the ninth embodiment of the invention, as seen from the back. FIG. 32 is a front view of the image splitter in the ninth embodiment of the invention. FIG. 33 is a front view showing a state where the image splitter in the ninth embodiment of the invention is being installed to the liquid crystal display. FIG. 34 is a side view showing a state where the image splitter in the ninth embodiment of the invention is installed on the liquid crystal display. FIG. 35 is a cross-sectional view showing a main part of the image splitter in the ninth embodiment of the invention. FIG. 36 is a front view, partly cut away, of a horizontal adjustment mechanism of the image splitter of the invention.

The image splitter 2 in FIG. 30 comprises, for example, a parallax barrier. A plurality of shading thin films corresponding to a pitch of the liquid crystal panel is formed in a stripe pattern on a substrate such as a glass or a transparent resin to complete a parallax barrier substrate 21. The parallax barrier substrate 21 is held by a resinous supporting frame 211. The supporting frame 211 is movably installed to a covering member 210 which is fixed to cover a cabinet 12 of the liquid crystal display 1. The covering member 210 corresponds to a first member and the supporting frame 211 corresponds to a second member here.

The supporting frame 211 includes grooves 220, as shown in a cross-sectional view of FIG. 35, and edges of an opening of the covering member 210 are fitted into the grooves 220 to connect the covering member 210 and the supporting frame 211. The grooves 220 and the edges of the opening of the covering member 210 are designed in such sizes so that a predetermined space exists between the grooves 220 and the covering member 210. Therefore the supporting frame 211 can move vertically and horizontally corresponding to the space.

At the front of the covering member 210, provided is a cover 212 to cover adjustment mechanism, as will be described later, which prevents the adjustment mechanism from being touched by a third party and operated in a wrong way while the invention is on exhibit or other occasions. The covering member 210, as shown in FIG. 31, takes the form without a bottom and back so as to cover the liquid crystal display 1. The covering member 210, which is put over the liquid crystal display 1, is secured by pressing a fixing claw 213 against the back surface of the cabinet 12 of the liquid crystal display 1. FIG. 34 illustrates the image splitter 2 combined with the liquid crystal display 1. Once the image splitter 2 is installed to the liquid crystal display 1, the covering member 210 does not move under normal usage.

After the image splitter 2 is installed to the liquid crystal display 1, the supporting frame 211 including the parallax barrier substrate 21 is shifted vertically and horizontally with respect to the covering member 210 in order to adjust a relative position between the liquid crystal panel 11 and the parallax barrier substrate 2.

The adjustment mechanism, as shown in FIG. 32, appears by removing the cover 212. The adjustment mechanism comprises adjustment knobs 230 for adjusting the height and angle and a horizontal adjustment knob 231. Each adjustment knob 230, 231 comprises a shaft having a threaded part which is screwed into a screw hole provided at a lower part of the covering member 210. The ends of the shafts of the adjustment knobs 230 for adjusting the height and angle abut against the supporting frame 211. The turn of the adjustment knobs 230 for adjusting the height and angle moves the shaft upward and downward and consequently the supporting frame 211 is lifted with the ascent of the shaft, while the supporting frame 211 goes down with the descent of the shaft. Therefore, the adjustment in a slanting direction and a vertical direction can be performed by turning the adjustment knobs 230.

The horizontal adjustment mechanism, as shown in FIG. 36, comprises a horizontal adjustment knob 231, a first moving member 310 which moves in a vertical direction with rotation of the horizontal adjustment knob 231, and a second moving member 312 which moves in a horizontal direction along with the movement of the first moving member 310. The first moving member 310 includes the thread part. When the knob 231 is turned, the first moving member 310 moves in the vertical direction through a screw hole provided in the covering member 210 and a hole connected with the screw hole. A tip of the first moving member 310 makes contact with a tip of the second moving member 312 at an angle of 45 degrees. The second moving member 312 is laid through the hole provided in the covering member 210 and can slide though the hole.

When the turn of the knob 231 lifts up the first moving member 310, the second moving member 312 having contact with the first moving member 310 at an angle of 45 degrees shifts leftward and rightward, that is, in a horizontal direction. In the supporting frame 211, provided is an angle 313 whose one end abuts against the second moving member 312 and which functions as a connecting member. A compression spring 314 connects another end of the angle 313 and a hook 315 provided in the covering member 210 and applies a force to the angle 313 in a direction of A in FIG. 36. Also the compression spring 314 has a function of eliminating unsteadiness created between the supporting frame 211 and the covering member 210.

When the knob 231 is turned to lift up the first moving member 310, the second moving member 312 pushes the angle 313 against the spring 314 and moves the angle 313 in a direction of B in FIG. 36. Consequently the supporting frame 211 is shifted horizontally in the direction of B. On the other hand, when the knob 231 is turned to lower the first moving member 310, the supporting frame 211 is shifted in the direction of A by the force applied by the spring 314.

Thus, the turn of the knob 231 allows the parallax barrier substrate 21 attached to the supporting frame 211 to shift horizontally.

Accordingly, the image splitter 2 is installed so as to cover the liquid crystal panel 11 of the liquid display 1 to use it. Therefore a viewer sees images displayed on the liquid crystal panel 11 of the liquid crystal display 1 through the image splitter 2.

The two-view stereoscopic image display device, for example, displays a right eye image and a left eye image alternately by a column on the liquid crystal panel 11. Images passed through light from a backlight are separated by the parallax barrier substrate 21. When a viewer sees the liquid crystal display 1, the viewer perceives stereoscopic images by observing left eye images with his/her left eye and right eye images with his/her right eye.

The image splitter 2 installed to the liquid crystal display 1 cannot create good stereoscopic images unless pixels on the liquid crystal display panel 11 are aligned with the shading thin films formed in a stripe pattern on the image splitter 2. Specifically, the image splitter 2 cannot split images into right and left. To avoid this, the position of the image splitter 2 is adjusted after securing the image splitter 2 to the liquid crystal display 1 with the covering member 210. In a case of a two-view stereoscopic image display, for example, the viewer turns the knob 231 to move the supporting frame 211 together with the parallax barrier substrate 21 slightly rightward or leftward (in a horizontal direction) so that two images taken from two viewpoints are positioned on the liquid crystal display 1 right in front of the viewer. The viewer stops turning the knob 231 when the viewer perceives stereoscopic images. The adjustment of the relative position between pixels on the liquid crystal display panel 11 and the stripe-patterned shading thin film of the image splitter 2 allows the viewer to observe stereoscopic images. Likewise, in a case of a multi-view stereoscopic image display, the image splitter 2 is adjusted finely so that any stereo pair of images is positioned on the liquid crystal display 1 right in front of the viewer.

There are some ways to make the fine adjustment easier. For example, the liquid crystal display is set to display images in a two-view system and large letters such as "right" or "R" and "left" or "L" are displayed on the liquid crystal display panel 11 as a right eye image and a left eye image respectively. The viewer moves the image splitter 2 slightly leftward or rightward until observing the letter "right" or "R" with right eye only, and the viewer holds the image splitter 2 at the position where the letter is observed. Subsequently the viewer sees the display with left eye only. The position adjustment reaches completion when the viewer observes the letter "left" or "L".

Although the horizontal position adjustment can be made by shifting the image splitter 2 leftward and rightward, the horizontal position adjustment alone is not enough to create stereoscopic image with the parallax barrier substrate 21 installed at a slant. With such slanted parallax barrier substrate 21, pixels may align with the shading thin films at the center of the liquid crystal panel 11, but misalignment occurs in a vertical direction, thereby making it impossible for the viewer to perceive good stereoscopic images. Preferably the position adjustment in the slanting direction should be made easily. To realize this, the knobs 230 are turned to adjust the parallax barrier substrate 21 in the vertical and slanting direction in the present embodiment.

The rotation of the knobs 230 varies an amount of protrusion of the knobs 230, consequently adjusts the position of the parallax barrier substrate 21 attached to the supporting frame 211 in the vertical direction. Also an angle of the image splitter 2 to the liquid crystal display 1 can be adjusted with the rotation of the knobs 230. In this embodiment described above, the fine adjustment in a slanting direction can be made easily only by rotating the knobs 230.

Figure 37:
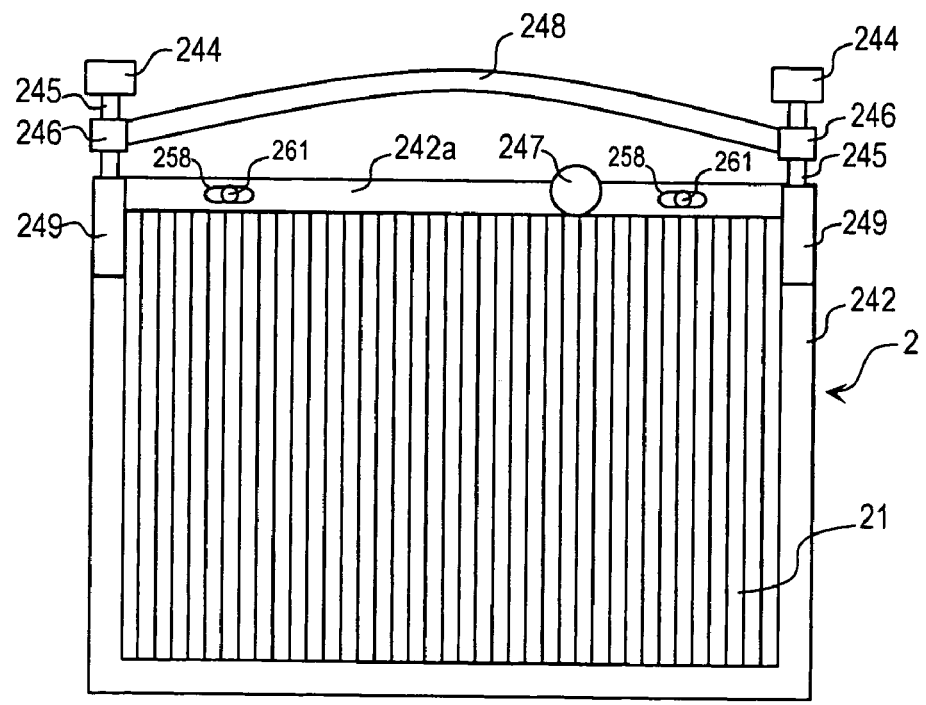
FIG. 37 is a front view showing a structure of an image splitter in a tenth embodiment of the invention.
Figure 38:
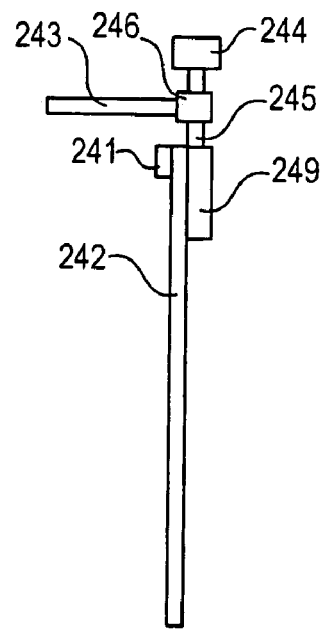
FIG. 38 is a side view showing a structure of the image splitter in the tenth embodiment of the invention.

With reference to FIGS. 37 to 43, descriptions will be made on a stereoscopic image display device in a tenth embodiment of the invention. FIG. 37 is a front view showing a structure of an image splitter in the tenth embodiment of the invention. FIG. 38 is a side view showing a structure of the image splitter in the tenth embodiment of the invention. The tenth embodiment of the present invention includes an image splitter 2 installed to a small display panel of notebook personal computers or the like. The notebook personal computer can be used as a device to display stereoscopic images by installing the image splitter on the display panel.

This image splitter 2 comprises, for example, a parallax barrier. A plurality of shading thin films corresponding to a pitch of the liquid crystal panel is formed in a stripe pattern on a substrate such as a glass or a transparent resin to complete a parallax barrier substrate 21 which is held by a supporting frame 242. On the upper part of the supporting frame 242, as will be described later, provided is a first member 241, which is fitted into a hollow of the cabinet of the display and almost fixed at lease horizontally with respect to the liquid crystal display panel 11, and a second member 242a (a part of the supporting frame 242), which is connected with the first member 241.

In this embodiment, the supporting frame 242 comprises two mounting bases 249 on both sides. A shaft 245 having a knob 244 on its end is inserted into each mounting base 249. A cylindrical fastening part 243, which is hooked on a top of the cabinet 12 of the liquid crystal display 1, is mounted on each shaft 245 with a mounting tool 246. The image splitter 2 is designed so as to make a contact with the top of the cabinet 12 of the liquid crystal display 1 through the fastening parts 243.

Now descriptions will be made on a configuration in which the shafts 245 and fastening parts 243 are mounted to the mounting bases 249.

The cylindrical shaft 245 is inserted into the mounting tool 246 provided with the cylindrical fastening part 243. A screw hole is formed on each end of the shaft 245. A knob 244 is fixed with a screw-on nut on one end of the shaft 245, thereby rotating together with the shaft 245.

The mounting base 249 includes a hole having a bigger diameter than that of the shaft 245 and is fixed to the frame 242 holding the parallax barrier substrate 21.

A screw is inserted from the bottom of the mounting base 249 to join with the screw hole provided on another end of the shaft to immobilize the shaft 245 with the screw.

The shaft 245, the mounting base 249 and the fastening part 243 are assembled as follows; a coil spring (not shown) is inserted into the shaft 245 that penetrates the mounting tool 246 provided on the fastening part 243; and the shaft 245 is inserted into the hole of the mounting base 249 to join to the screw. The fastening part 243 is held at a predetermined height from the mounting base 249 by means of the coil spring inserted into the shaft 245.

When the knob 244 is turned, the screw mechanism constituting of the shaft 245 and the screw performs its function, moving the shaft 245 and the screw upward and downward together. According to this, the adjustments in the vertical and slanting direction can be made.

In this embodiment, an arm 248 is attached between the fastening parts 243. Many people hold an upper part of the display to close it. An existence of the arm 248 makes a user aware of that the image splitter is installed to the liquid crystal display and prevents the user from closing the liquid crystal display by accident.

The following are descriptions on the first member 241 and the second member 242 with reference to FIGS. 39 to 43.

Figure 39:
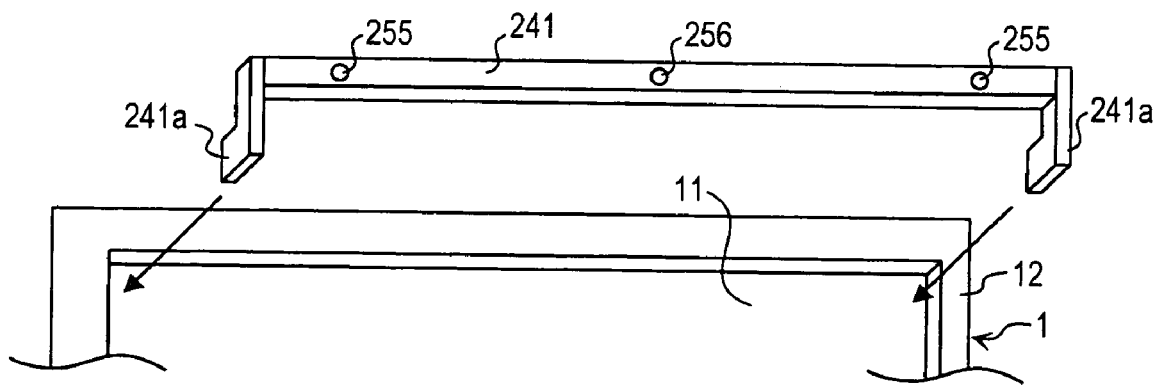
FIG. 39 is a perspective view of a first member of the image splitter and the liquid crystal display in the tenth embodiment of the invention.

As shown in FIG. 39, the first member 241 is formed so as to have a width corresponding to the width of the hollow of the cabinet 12 of the liquid crystal display 1 and comprises L-shaped fixtures 241*a* on both ends. The L-shaped fixtures 241*a* are fitted into the hollow of the cabinet 12 of the liquid crystal display 1 to secure the first member 241 to the liquid crystal display 1. The first member 241 includes holes 255 to install the second member 242 and a hole 256 into which a cam shaft is inserted to move the second member 242 horizontally with respect to the first member 241.

Figure 40:
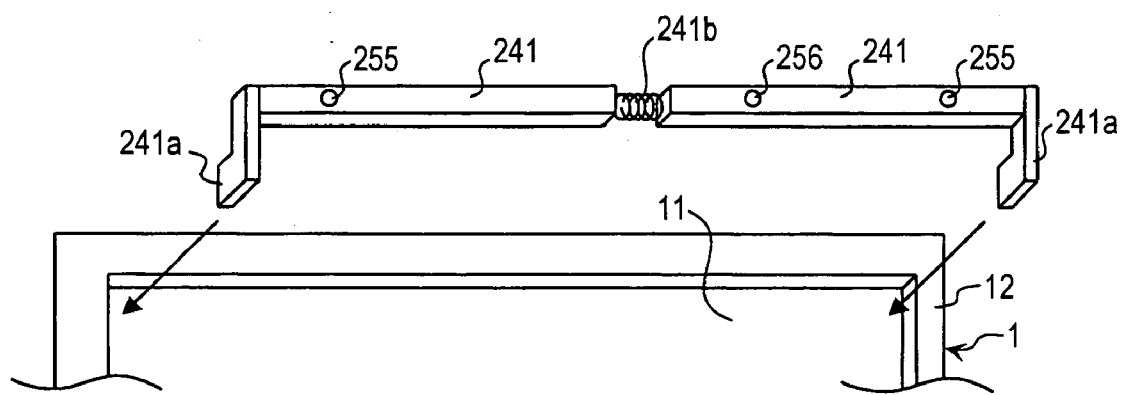
FIG. 40 is a perspective view of another first member of the image splitter and the liquid crystal display in the tenth embodiment of the invention.

FIG. 40 illustrates another embodiment of the first member 241. The first member 241 in FIG. 40 is separated into two parts. These two parts are connected with a compression coil spring 241*b* so as to expand outward. Even though the width of the first member 241 is slightly different from that of the hollow of the cabinet 12, the first member 241 can be installed to the liquid crystal display 1 by means of the compression coil spring 241*b*.

Figure 41:
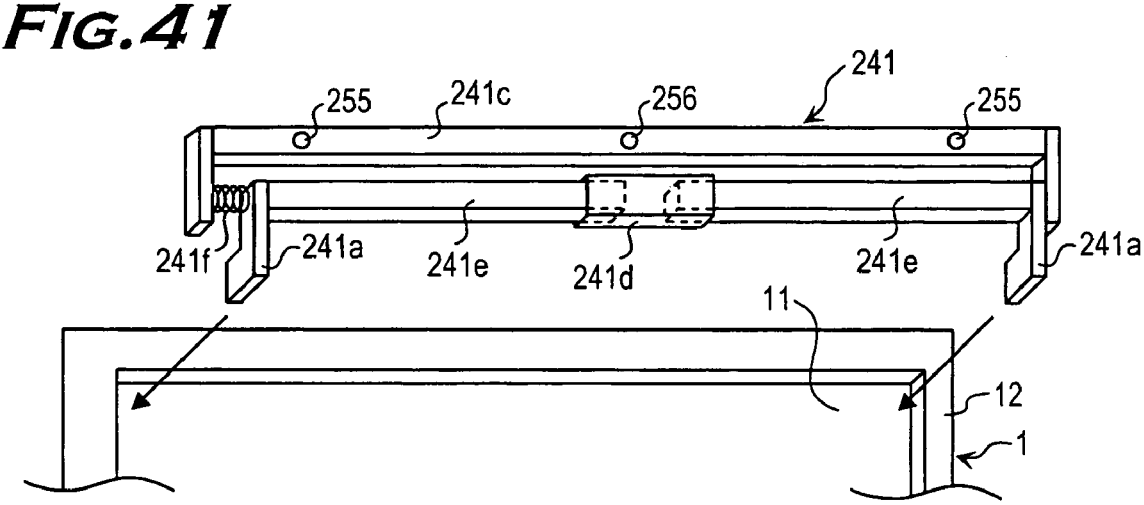
FIG. 41 is a perspective view of other first member of the image splitter and the liquid crystal display in the tenth embodiment of the invention.

FIG. 41 illustrates other embodiment of the first member 241. The first member 241 in FIG. 41 comprises a frame 241*c* having a width almost equivalent to that of the cabinet 12 of the liquid crystal display 1 and members 241*e* capable of changing its width and attached to the frame 241*c*. The members 241*e* are connected with a sleeve 241*d*. One of the members 241*e* comprises a hole, which joins to a protrusion (not shown) formed at the frame 241*c*, to mount the member 241*e* to the frame 241*c* after aligning the position of the hole and protrusion. Another member 241*e* is mounted to the frame 241*c* with an extension spring 241*f* which applies a force toward the frame 241*c*. Although there is no illustration, the frame 241*c* comprises a shaft which the spring 241*f* is inserted into and can slide into the member 241*e*. Also the frame 241*c* comprises holes 255 and a hole 256. Even though the width of the first member 241 is slightly different from that of the hollow of the cabinet 12, as in a case of the first member in FIG. 40, the first member 241 can be installed to the liquid crystal display 1.

Figure 42A:
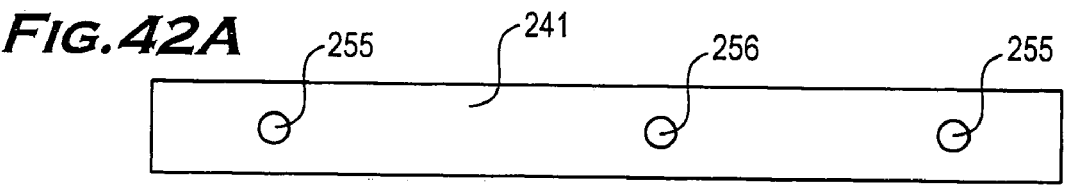
FIG. 42A is a plane view of the first member.
Figure 42B:
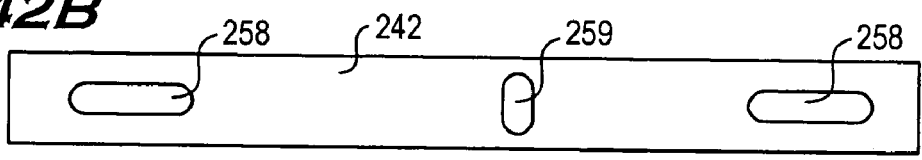
FIG. 42B is a plane view of the second member and FIG. 42C is a plane view of a cam shaft, each showing members causing the second member to move horizontally relative to the first member of the image splitter in the tenth embodiment of the invention.

With reference to FIGS. 42 and 43 descriptions will be made on a mechanism for moving horizontally the second member 242 relative to the first member 241. The first member 241, as shown in FIG. 42A, comprises holes 255 to attach the second member 242 and a hole 256 into which a cam shaft is inserted to move the second member 242 horizontally with respect to the first member 241. The second member 242, as shown in FIG. 42B, comprises long holes 258 extending in a longitudinal direction at points each corresponding to the holes 255 of the first member 241 and a long hole 259 extending in a vertical direction at a point where the cam shaft 260 is inserted into.

Figure 42C:
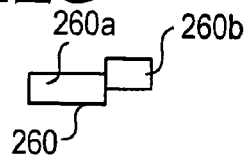

FIG. 42C illustrates the cam shaft 260 constituted of two cylindrical members 260*a* and 260*b* which are out of center with each other. A horizontal adjustment knob 247 is attached to an end of the cylindrical member 260*a*.

Figure 43A:
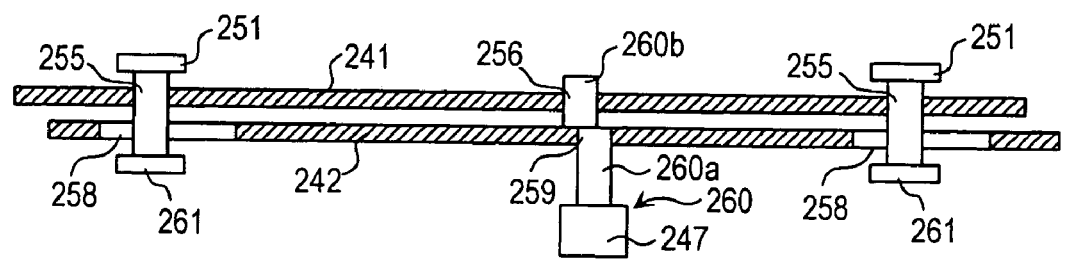
FIGS. 43A to 43C are cross sectional views showing a process that the second member moves horizontally relative to the first member of the image splitter in the tenth embodiment of the invention.
Figure 43B:
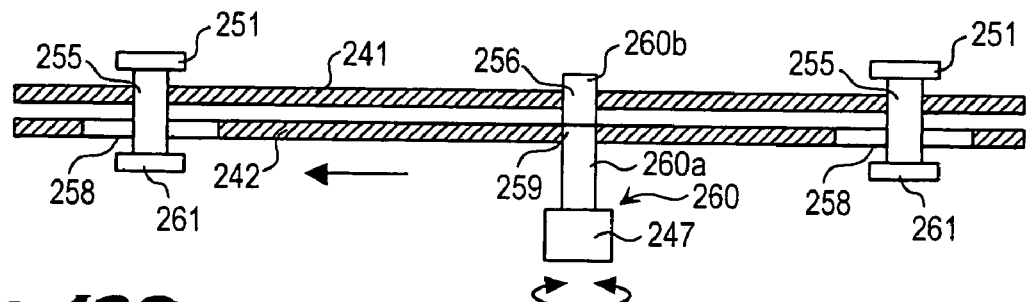
Figure 43C:
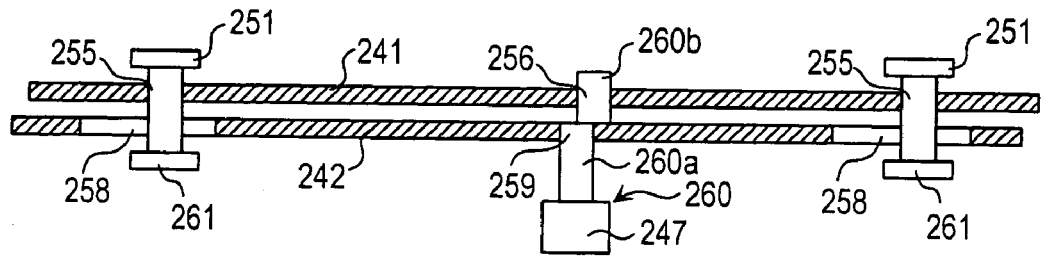

As shown in FIGS. 43A to 43C, the first member 241 and the second member 242 are connected with each other by inserting pins 251 through the holes 255 and long holes 258. The cam shaft 260 is inserted through the hole 256 and the long hole 259.

According to this mechanism, the second member 242 moves horizontally with respect to the first member 241 utilizing the cam shaft 260 and the long holes 258. When the horizontal adjustment knob 247 is turned in a state as illustrated in FIG. 43A, the second member 242 moves leftward as shown in FIG. 43B. When the horizontal adjustment knob 247 is further turned in the same direction, the second member 242 moves leftward as shown in FIG. 43C. If the horizontal adjustment knob 247 is further turned in the same direction, the second member 242 moves back as shown in FIG. 43B. Thus the second member 242 moves in a horizontal direction with respect to the first member 241 in accordance with the rotation of the horizontal adjustment knob 247.

Even the image splitter 2 in the tenth embodiment, which is installed to the liquid crystal display 1, cannot create stereoscopic images unless that the pixels on the liquid crystal display panel 11 are aligned with the shading thin films formed in a stripe pattern on the image splitter 2. Specifically, the image splitter 2 cannot split images into right and left. To avoid this, the position of the image splitter 2 is adjusted after securing the image splitter 2 to the liquid crystal display 1 with the first member 241. In a case of a two-view stereoscopic image display, for example, the viewer turns the knob 247 to shift the supporting frame 242 together with the parallax barrier substrate 21 slightly rightward or leftward (in a horizontal direction) so that two images taken from two viewpoints are positioned on the liquid crystal display 1 right in front of the viewer. The viewer stops turning the knob 247 when the viewer perceives stereoscopic images. The adjustment of the relative position between pixels on the liquid crystal display panel 11 and the stripe patterned shading thin films of the image splitter 2 allows the viewer to observe stereoscopic images. Likewise, in a case of a multi-view stereoscopic image display, the image splitter 2 is adjusted finely so that any stereo pair of images is positioned on the liquid crystal display 1 right in front of the viewer.

There are some ways to make the fine adjustment easier. For example, the liquid crystal display is set to display images in a two-view system and large letters such as "right" or "R" and "left" or "L" are displayed on the liquid crystal display panel 11 as a right eye image and a left eye image respectively. The viewer moves the image splitter 2 slightly leftward or rightward until observing the letter "right" or "R" with right eye only, and the viewer holds the image splitter 2 at the position where the letter is observed. Subsequently the viewer sees the display with left eye only. The position adjustment reaches completion when the viewer observes the letter "left" or "L".

Although the horizontal position adjustment can be made by shifting the image splitter 2 leftward and rightward, the horizontal position adjustment alone is not enough to create stereoscopic image with the parallax barrier substrate 21 installed at a slant. With such slanted parallax barrier substrate 21, pixels may align with the shading thin films at the center of the liquid crystal panel 11, but misalignment occurs in a vertical direction, thereby making it impossible for the viewer to perceive good stereoscopic images. Preferably the position adjustment in the slanting direction should be made easily. To realize this, the knobs 244 are turned to adjust the parallax barrier substrate 21 in the vertical and slanting direction in this embodiment.

Thus the position of the parallax barrier 21 attached to the supporting frame 211 can be adjusted in the vertical direction by turning the knobs 244. Also an angle of the image splitter 2 to the liquid crystal display 1 can be adjusted with the rotation of the knobs 244. In this embodiment described above, also the fine adjustment in a slanting direction can be made easily by turning the knobs 244 alone.

Figures 44, 45:
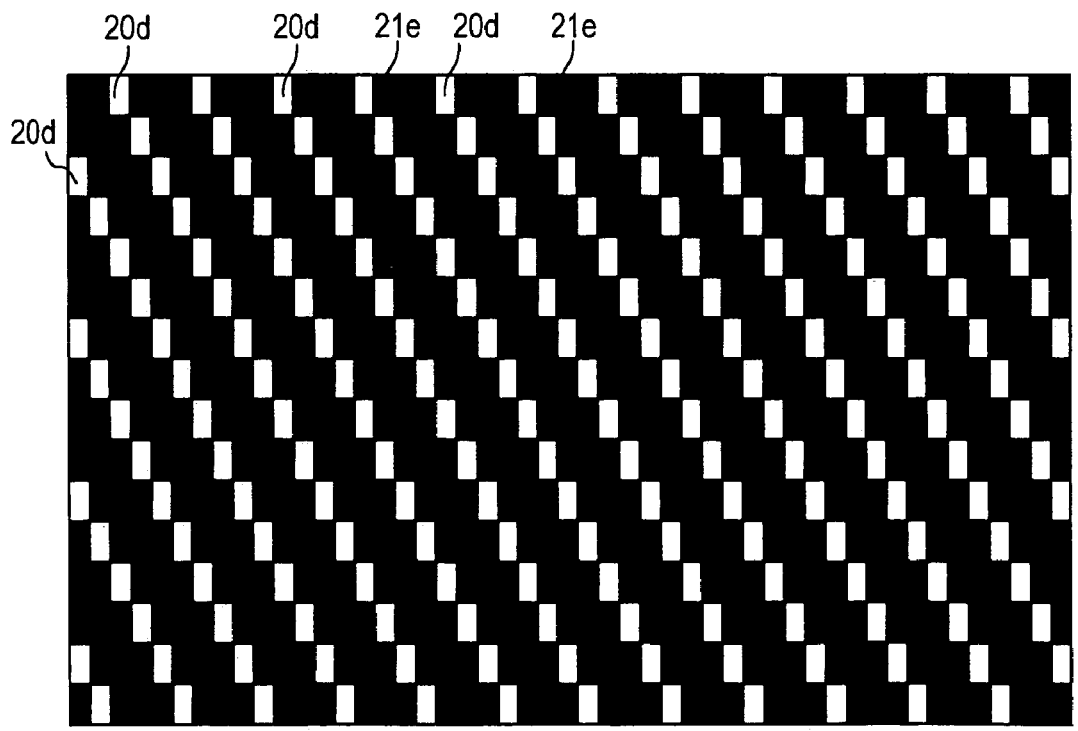
FIG. 44 is a diagram showing a configuration of pixels when images taken from four viewpoints are displayed on the liquid crystal display screen.
FIG. 45 is a diagram of a parallax barrier corresponding to the display screen shown in FIG. 44.

Although the parallax barrier substrate 21 with vertical stripes is used as an image splitter in the above embodiments, the present invention is applicable to a parallax barrier with pinholes disposed slantwise. With reference to FIGS. 44 to 47 descriptions will be made on a parallax barrier with pinholes disposed slantwise for a stereoscopic image display displaying images taken from four viewpoints. FIG. 44 is a diagram showing a configuration of pixels displayed on the liquid crystal display screen. FIG. 45 is a diagram of parallax barrier corresponding to the display, screen.

Figure 46:
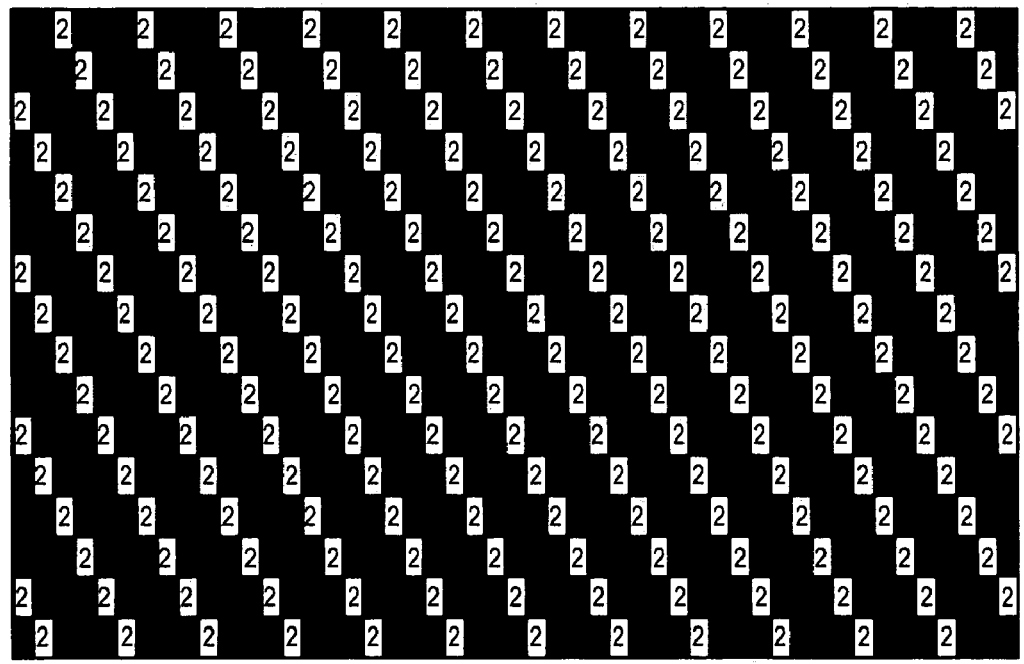
FIG. 46 shows a diagrammatic image when a viewer sees the display screen shown in FIG. 44 with the left eye at a proper viewing distance.
Figure 47:
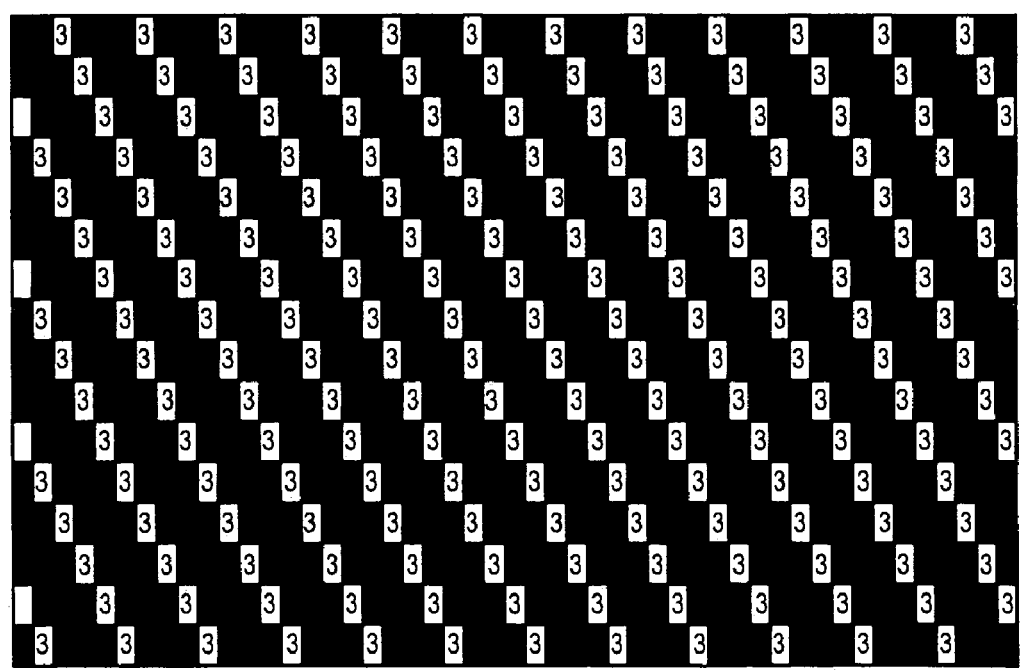
FIG. 47 shows a diagrammatic image when a viewer sees the display screen shown in FIG. 44 with the right eye at a proper viewing distance.

As shown in FIG. 44, images taken from four viewpoints are combined and repeatedly displayed in order of "4", "3", "2", "1" horizontally and vertically. Corresponding to the display screen, as shown in FIG. 45, barrier sections 21e are formed in a slanted stripe pattern with pinholes 20d formed stepwise on the parallax barrier. This parallax barrier, as shown in FIGS. 46 and 47, splits adjacent images and gives the split images to the right eye and the left eye. FIG. 46 shows an image when a viewer at a proper viewing distance sees the display screen shown in FIG. 44 with viewer's left eye. FIG. 47 shows an image when the viewer at the proper viewing distance sees the display screen shown in FIG. 44 with viewer's right eye.

In this example shown in FIGS. 46 and 47, left and right eyes observe images taken from viewpoints 2 and 3 by adjusting the relative position between the display screen and parallax barrier. When using images taken from four viewpoints, for example, the images taken from viewpoints 1 and 3 may represent R and the images taken from viewpoints 2 and 4 may represent L to adjust the position of the parallax barrier.

If the image splitter is misaligned with the display screen in a slanting direction, adjustment in the slanting direction is necessary because the image splitter cannot split images properly. However a horizontal adjustment is not always necessary because the image splitter moves horizontally by moving vertically with respect to the display screen as appreciated from FIGS. 44 to 47. This occurs due to the barrier sections formed slantwise. Therefore the horizontal adjustment mechanism may be omitted by using the image splitter with the barrier sections formed in a slanted stripe pattern.

Although a transparent glass substrate with a plurality of shading thin films formed in a stripe pattern corresponding to a pitch on the liquid crystal display panel is used as a parallax barrier substrate 21 in the above embodiments, a liquid crystal substrate may be used as the parallax barrier substrate 21. The stripes are formed of liquid crystal, thereby switching the stripes between on and off and displaying images taken from various numbers of viewpoints. In this case, power may be taken from, for example, USB terminal of the display device. Also the stripes may be controlled to be on or off by the personal computer through communication means.

A lenticular substrate may be used as the image splitter instead of the parallax barrier.

Although the liquid crystal display is used as an image display panel in the above embodiments, the other type of display devices such as a plasma display, rear projector, display device using organic EL light-emitting elements are also available for the image display panel.

The image splitter 2 installed to the liquid crystal display 1 cannot create good stereoscopic images unless pixels on the liquid crystal display panel 11 are aligned with the shading thin films formed in a stripe pattern on the image splitter 2. Specifically, the image splitter 2 cannot split images into right and left. To avoid this, the position of the image splitter 2 is adjusted after mounting the image splitter 2 on the liquid crystal display 1 with the fastening members 23.

Three kinds of adjustments are made as described below.

First one is rotation adjustment of the image splitter (parallax barrier) 2. In this adjustment, the angle of the image splitter is adjusted so that the shading thin films formed in a stripe pattern on the parallax barrier are aligned with pixels of the liquid crystal panel in a vertical direction. This adjustment is absolutely necessary to perceive stereoscopic images.

Second one is fine adjustment of a horizontal position of the image splitter (parallax barrier) 2. In a case of a two-view display system, the image splitter is finely adjusted so that two images taken from two viewpoints are positioned on the liquid crystal display panel right in front of the viewer. A pseudoscopic view can be converted into an orthoscopic view by reversing the pixels displaying left eye images and right eye images. Even if the adjustment is not made, the viewer can perceive stereoscopic images by shifting viewer's head. In also a case of a multi-view display system, the image splitter is finely adjusted so that any stereo pair of images is positioned on the liquid crystal display panel right in front of the viewer. The proper stereo pair of images can be obtained by changing pixels displaying each image.

Third one is adjustment of a horizontal position (matching viewpoint and image) of the image splitter (parallax barrier) 2 when the pixels displaying left eye images and right eye images are not reversed in the second adjustment. The third adjustment is made precisely including the positioning of the left and right images (pair image). After the third adjustment, the second adjustment is made, however, these adjustments can be made with common operations, thereby reducing user's job.

Figure 48:
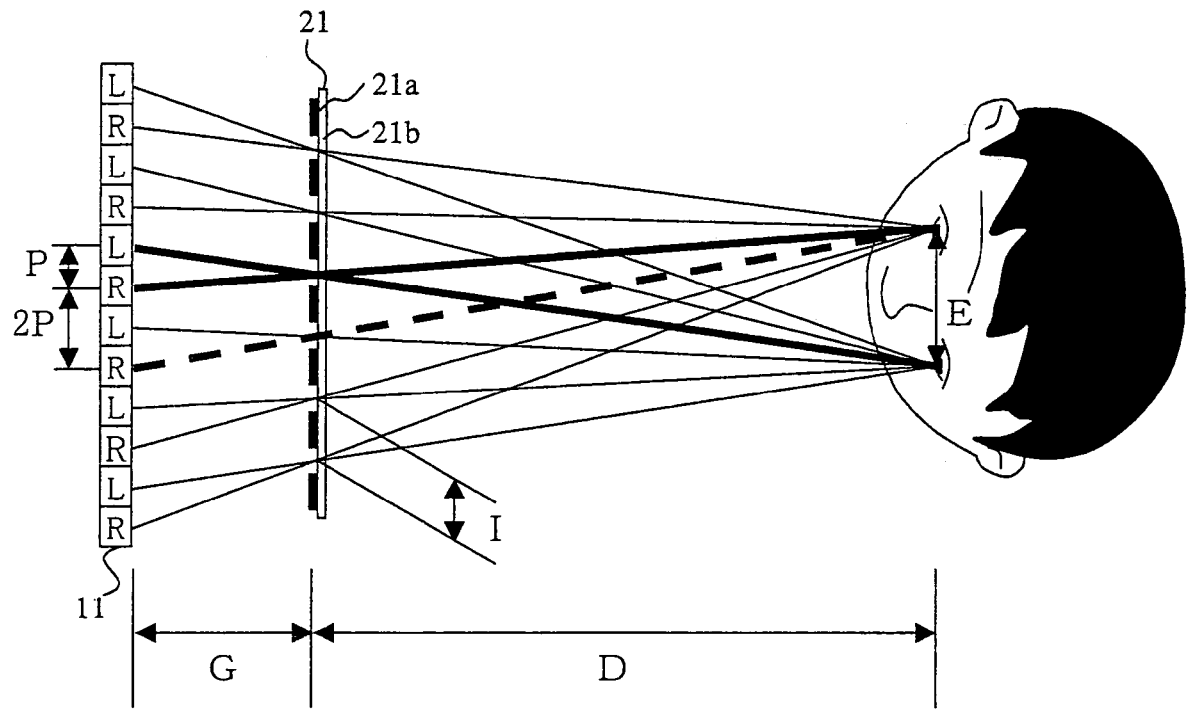
FIG. 48 is a diagram showing a way a viewer sees images at an optimal viewing distance with a two-view stereoscopic image display device.

This invention provides a method to make these adjustments easy. Descriptions will be made about a way a viewer sees images at an optimal viewing distance in a two-view display system with reference to FIG. 48.

Right eye images R and left eye images L are displayed alternately on the liquid crystal display panel 11. A parallax barrier substrate 21 is placed on the viewer's side of the liquid crystal display panel 11 at a distance of G from the panel 11. The parallax barrier substrate 21 comprises shading thin films 21a arranged in a stripe pattern. The viewer observes image light passed through apertures 21b between these shading thin films 21a. At an optimal viewing distance (D) interference fringes are not generated. The following relations are established under the above mentioned circumstance.

$$PD=GE$$

$$I(G+D)=2PD$$

$$I=2PE/(E+P)$$

In these equations, P is a pitch between pixels, D is an optimal viewing distance between the parallax barrier substrate and the viewer, G is a distance between the liquid crystal display panel and the parallax barrier substrate, I is a pitch between apertures of the parallax barrier substrate, and E is a distance between eyes of the viewer.

When the viewer departs forward or backward from the optimal viewing distance (D), the interference fringes (moiré) generally appear. The viewer feels a sense of incompatibility because the interference fringes look different (the position of light and shade) from the right eye to the left eye.

Figure 49:
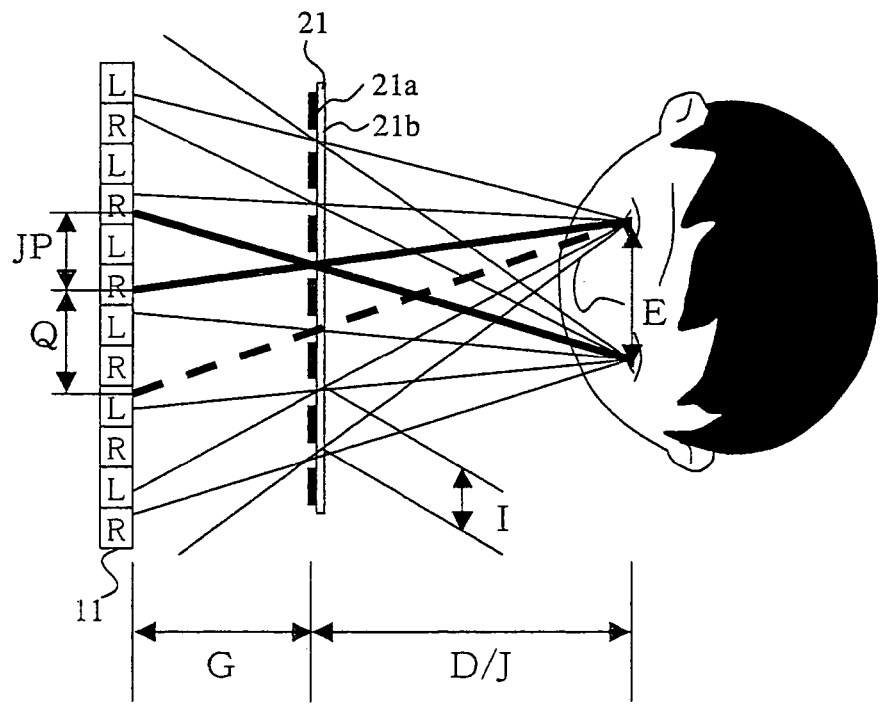
FIG. 49 is a diagram showing a way a viewer sees images at a viewing position during adjustment according to the invention.

Next descriptions will be made on an adjustment method of this invention. FIG. 49 shows a viewing distance during adjustment.

Letting J shown in FIG. 49 be an integer not less than 2, a space between points, which the right eye and left eye of the viewer at 1/J of the optimal viewing distance (D/J) see through the apertures, is an integral multiple of P (JP). In this structure the positions of light and shade of the interference fringes observed by the right eye perfectly agree with that observed by the left eye, which eliminates the sense of incompatibility. Therefore the viewer can adjust the image splitter (parallax barrier) 2 as observing images.

Perfect agreement in color and patterns of the interference fringes can be realized depending on the value of J and displayed images, which totally eliminates the sense of incompatibility.

In this situation, a pitch (period) of the interference fringe is E/(J−1). If J=2, the pitch of the interference fringe is E.

The following relational expressions prove the above.

$$I(G+D/J)=QD/J$$

$$Q=I(JG+D)/D$$

$$=I(JP+E)/E<G/D=P/E>$$

$$=2P(JP+E)/(E+P)<I=2PE(E+P)>$$

$$=2P+2(J-1)PP/(E+P)$$

$$\Delta Q=Q-2P=2(J-1)PP/(E+P)$$

$$N=P/\Delta Q=(E+P)/2(J-1)P$$

N: number of apertures necessary for deviation of 1P (number of I)

$$M=IN=E/(J-1)$$

M: pitch of interference fringe

If the relative position agrees between the image splitter (parallax barrier) 2 and the liquid crystal display panel 11 according to the above relations, color and pattern of interference fringes will be in perfect agreement. The adjustment can be performed easily by finding the agreement of the interference fringes. Use of selected images to be displayed on the liquid crystal display panel 11 makes the adjustment easier. Examples of the selected images will be indicated with descriptions below.

Figure 50A:
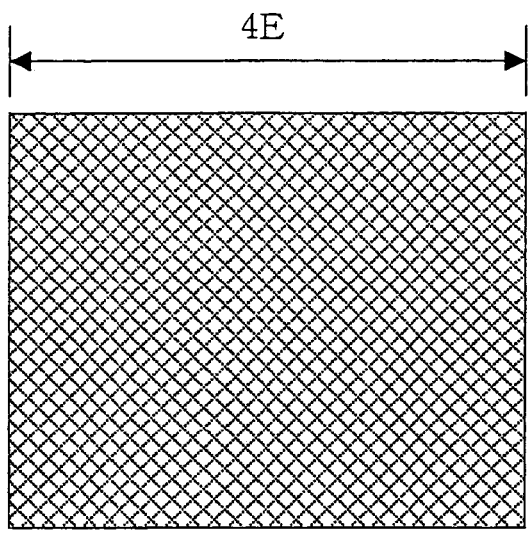
FIGS. 50A to 50C show an example of images for adjustment according to the invention.
Figure 50B:
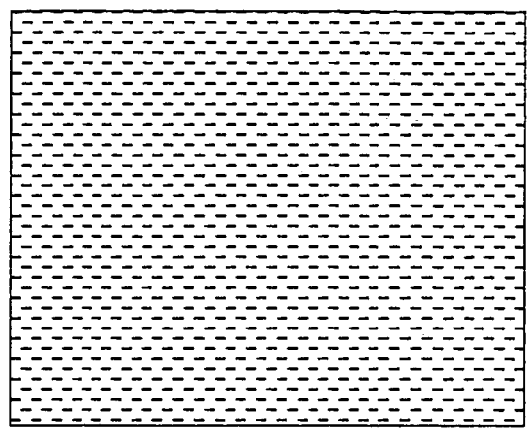
Figure 50C:
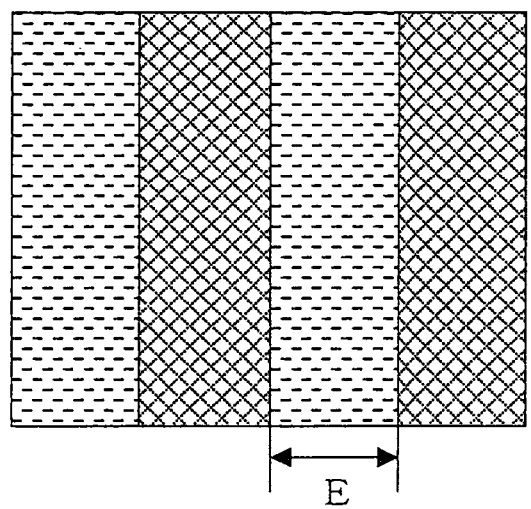

The descriptions of an example of images shown in FIGS. 50A to 50C are made on the supposition that a width of a screen of the liquid crystal display panel 11 is four times of a distance between eyes (E) for the sake of clarity. Also a viewing position is half an optimal viewing distance (D). These suppositions are applied to the other examples.

In the example shown in FIGS. 50A to 50C, different-colored (patterned) even images are prepared and adjustment is made as observing the fringes. For example, FIG. 50A is assumed to be a first image as a right eye image, specifically an even patterned image or an even colored image is displayed in corresponding pixels on the liquid crystal display panel to display the right eye image. The image is a lattice pattern here. Also FIG. 50B is assumed to be a second image as a left eye image, specifically an even patterned image or an even colored image, which are different from the first image, are displayed in corresponding pixels on the liquid crystal display panel to display the left eye image. The image is a dot pattern here.

When observing the first image and second image displayed on the liquid crystal display panel at half the optimal viewing distance (D), the viewer sees interference fringes with his/her eyes and performs adjustment by shifting the image splitter (parallax barrier) 2 as observing the interference fringes. After the completion of the positioning at half the optimal viewing distance (D), as shown in FIG. 50C, interference fringes created by the first image and the second image, each having a width equivalent to the distance between eyes (E), are observed as a result. The viewer can make the adjustment easily in an attempt to obtain the result. This adjustment method becomes even easier if one image is black and the other is white because these colors improve a contrast of the interference fringes.

Figure 51A:
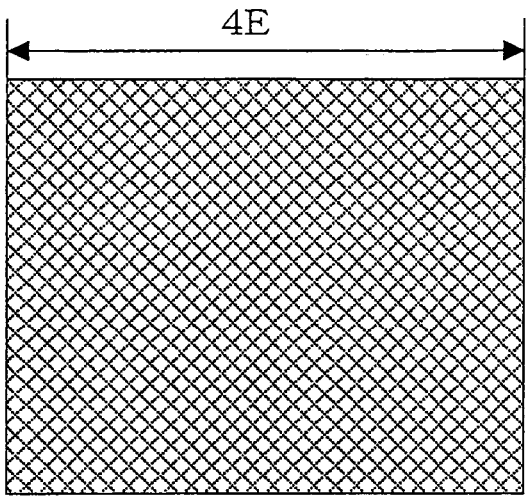
FIGS. 51A to 51F show an example of images for adjustment according to the invention.
Figure 51B:
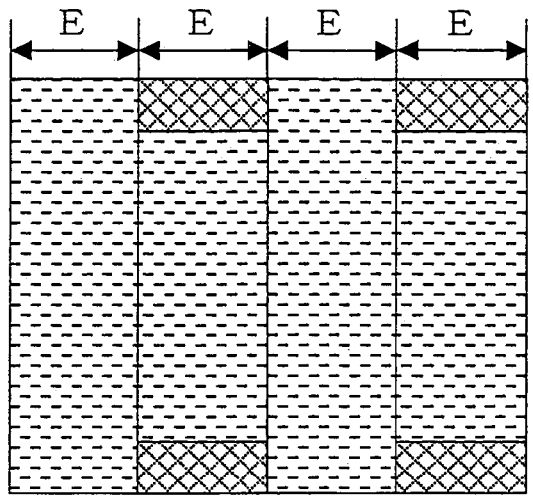

An example shown in FIGS. 51A and 51B shows images to easily find out how misalignment occurs. To find it out easier, images are added to at least one of the left eye images and right eye images in order to enable the viewer to recognize states of fringes. In the example, FIG. 51A is assumed to be a first image as a right eye image and employs a lattice pattern. FIG. 51B is assumed to be a second image and is added with images to recognize the state of fringes. Specifically the lattice patterned image of the first image is added to upper ends and lower ends of the second image at a distance between eyes E away.

Figure 51C:
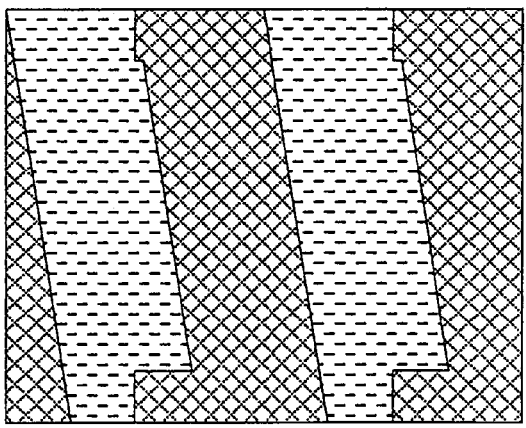

At a time when the viewer observes the first image and the second image displayed on the liquid crystal panel in this manner at half the optimal viewing distance (D), slanting fringes are observed as shown in FIG. 51C if the image splitter (parallax barrier) 2 is misaligned in a rotational direction with respect to the liquid crystal display panel. When observing such images, the viewer performs rotation adjustment to keep the fringes straight up.

Figure 51D:
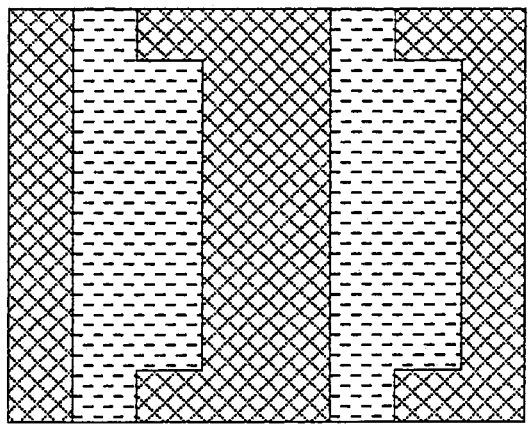

If the image splitter (parallax barrier) 2 is misaligned in a horizontal direction with respect to the liquid crystal display panel, the viewer observes only some parts of images added to the second image as shown in FIG. 51D. When observing such images, the viewer adjusts the image splitter (parallax barrier) 2 until the added images disappear.

Figure 51E:
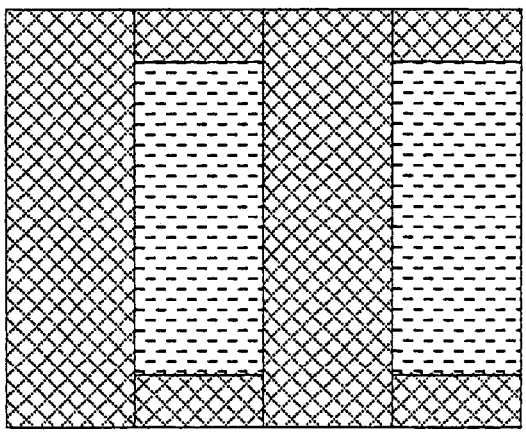
Figure 51F:
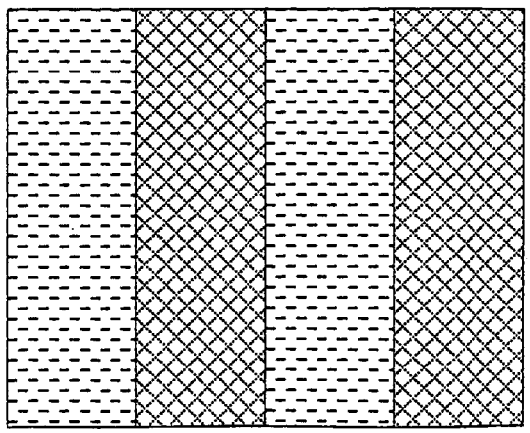

If there is misalignment in a horizontal direction while a pseudoscopic view is being created, the viewer observes all images added to the second image as shown in FIG. 51E. When observing such images, the viewer finds that the viewer at a proper distance observes a pseudoscopic view. In this case, the viewer can swap over the right eye images and left eye images to be displayed on the liquid crystal display panel to handle this situation. Even if the images are not swapped, the adjustment can be performed by shifting the image splitter (parallax barrier) 2 in the horizontal direction until the added images disappear. Thus the user can perform adjustment without swapping images, which reduce the burdens on the user. An image shown in FIG. 51F is observed at the completion of positioning. In other words, observing the image in a state shown in FIG. 51F means that the viewer completed positioning at a proper viewing distance while an orthoscopic view is being created.

Figure 52A:
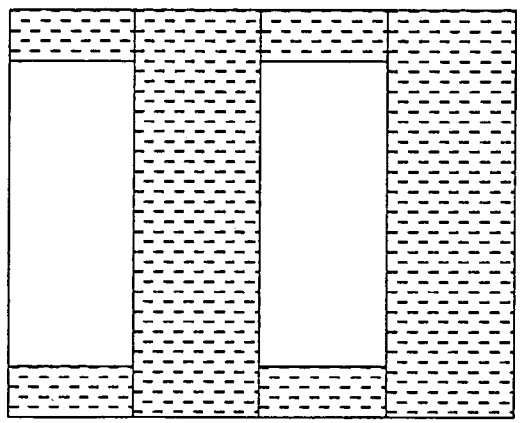
FIGS. 52A to 52C show another example of images for adjustment according to the invention.
Figure 52B:
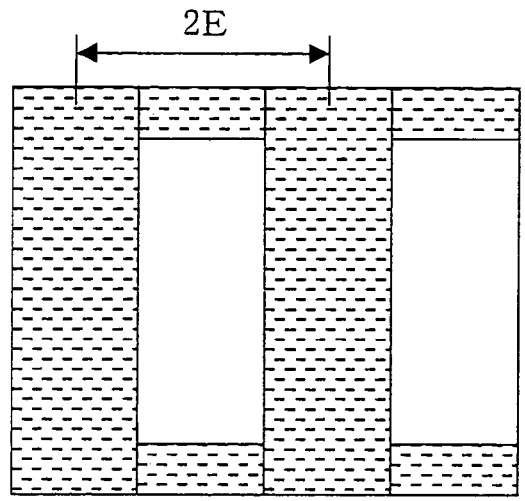
Figure 52C:
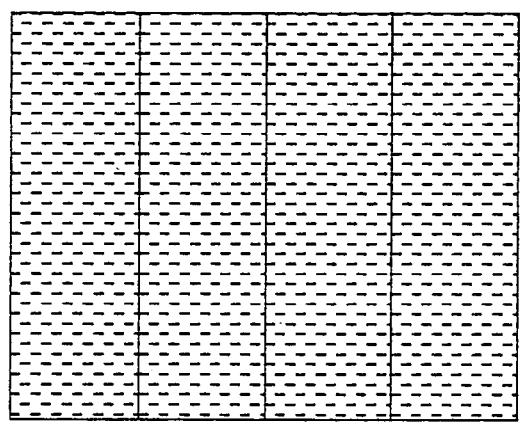

FIGS. 52A to 52C show another example of images for adjustment. The images of FIGS. 52A and 52B consist of same-colored (patterned) strips that arranged in the direction opposite to each other. The positioning is made so that the image become totally even as shown in FIG. 52C. A boundary is drawn in the center of the image. FIGS. 52A and 52B are assumed to be a first image and a second image respectively. As shown in FIG. 52A and FIG. 52B, the arrangement of the strips of each image is reversed with respect to the center of the image. The width of the strip does not have to be equivalent to the distance between eyes (E). At least one of the first and second images should include images enabling the viewer to recognize the state of fringes so as to make the adjustment easier. In the example of FIGS. 52A and 52B, the images are added to both first and second images.

The viewer observes the first image and second image displayed on the liquid crystal display panel at half the optimal viewing distance (D). At the completion of positioning, the viewer observes an even image like FIG. 52C.

Figure 53A:
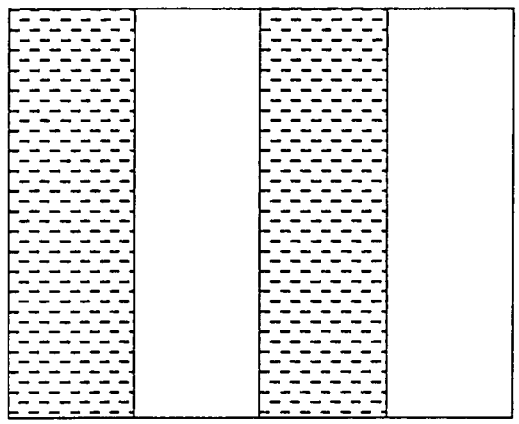
FIGS. 53A to 53C show other example of images for adjustment according to the invention.
Figure 53B:
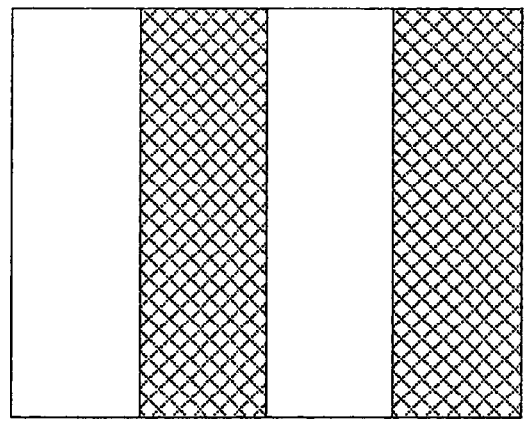
Figure 53C:
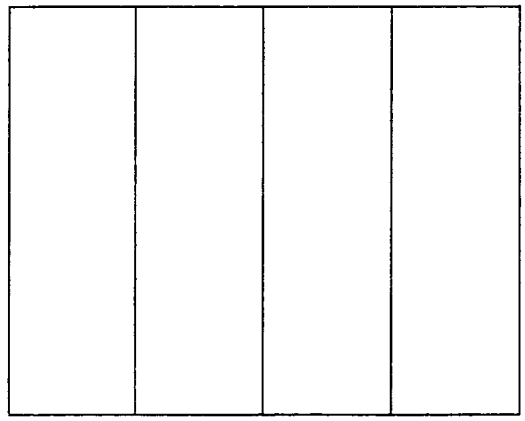

FIGS. 53A to 53C show other example of images for adjustment. FIG. 53A and FIG. 53B are assumed to be a first image and a second image respectively. FIGS. 53A and 53B consist of same-colored (patterned) base and different-colored (patterned) strips. The viewer makes the positioning so as to observe an even image consisting of same colored (patterned) images as shown in FIG. 53C.

It is preferable, not shown in drawings though, that at least one of the first and second images include images enabling the viewer to recognize the state of fringes so as to make the adjustment easier.

The viewer observes the first image and second image displayed on the liquid crystal display panel at half the optimal viewing distance (D). At the completion of the positioning, the viewer observes an even image like FIG. 53C.

Figure 54A:
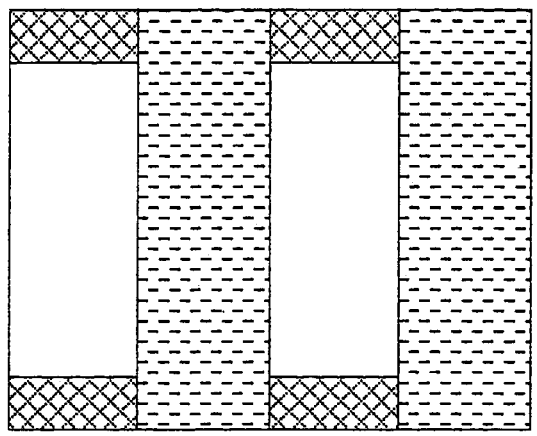
FIGS. 54A to 54C show other additional example of images for adjustment according to the invention.
Figure 54B:
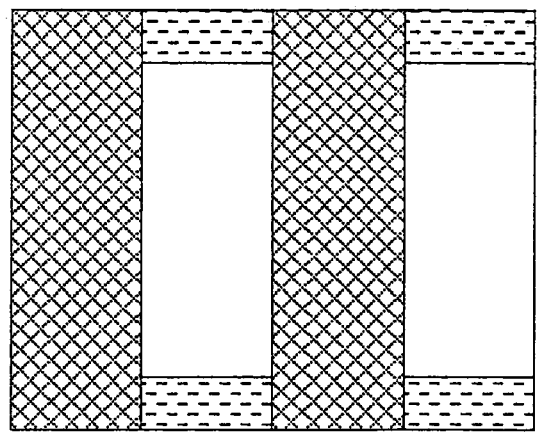
Figure 54C:
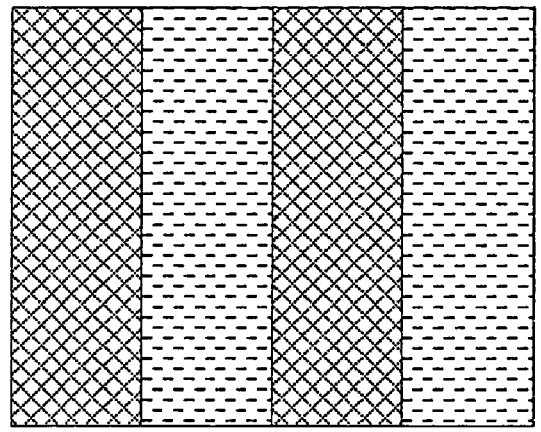

FIGS. 54A to 54C show other additional example of images for adjustment. FIG. 54A and FIG. 54B are assumed to be a first image and a second image respectively. FIGS. 54A and 54B consist of a same-colored (patterned) base and different-colored (patterned) strips. The viewer makes the positioning so as to observe an image consisting of different colored (patterned) strips as shown in FIG. 54C.

It is preferable that at least one of the first and second images includes images enabling the viewer to recognize the state of fringes so as to make the adjustment easier. In this example, the images are added to both first image in FIG. 54A and second image in 54B.

Figure 55A:
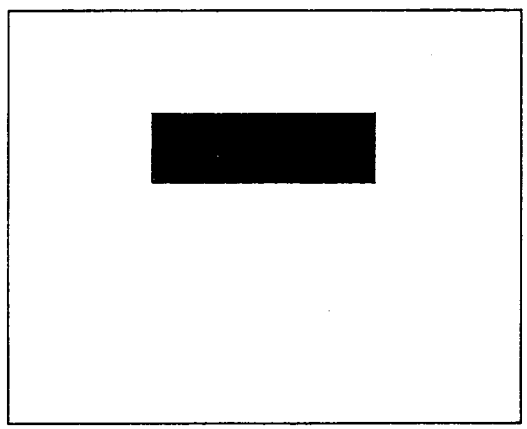
FIGS. 55A to 55C show other additional example of images for adjustment according to the invention.
Figure 55B:
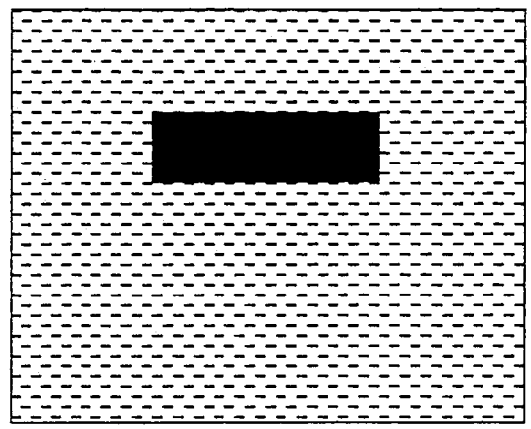
Figure 55C:
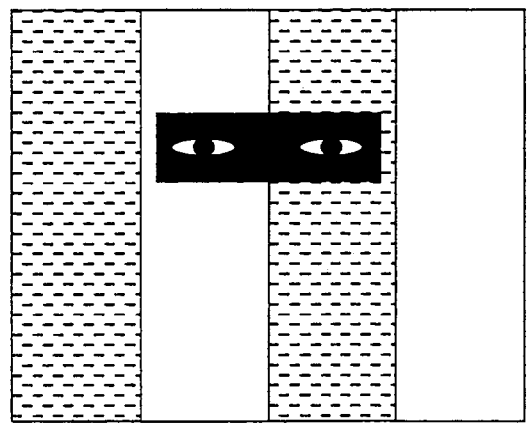

FIGS. 55A to 55C show other additional example of images for adjustment. FIG. 55A and FIG. 55B are assumed to be a first image and a second image respectively. Each FIGS. 55A and 55B includes a region of low brightness which reflects eyes of the viewer so that the viewer can recognize easily where the front position is. At the completion of the positioning, the viewer observes an image like FIG. 55C.

Figure 56:
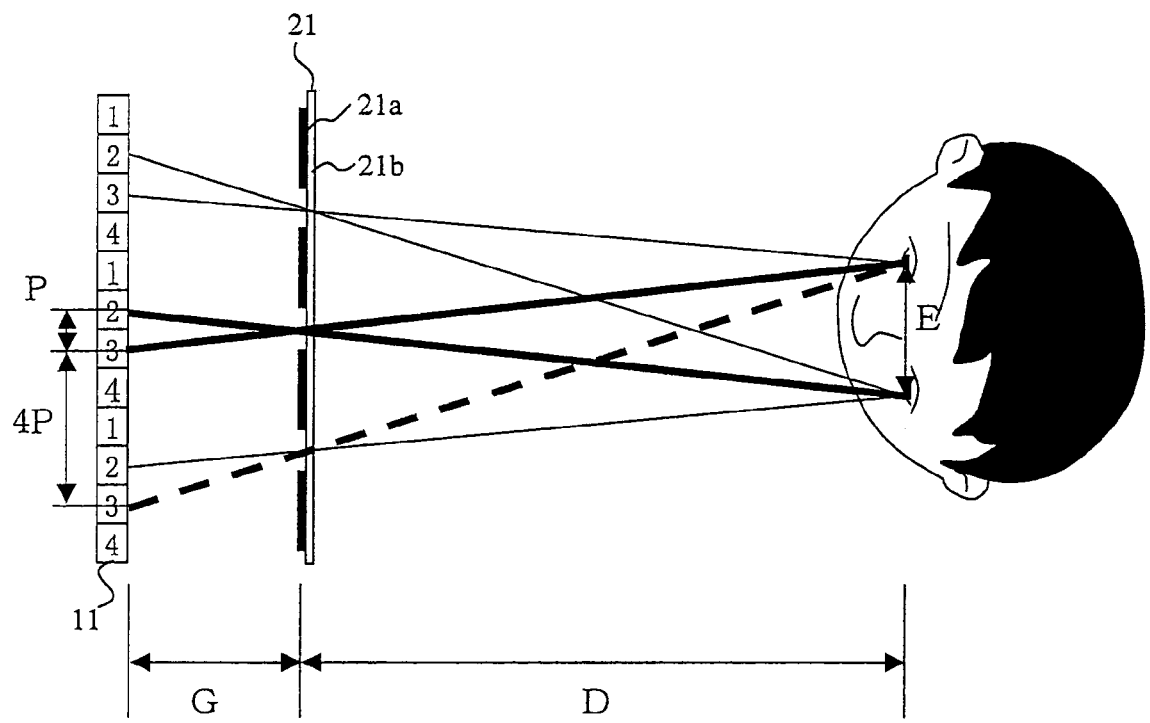
FIG. 56 is a diagram showing a way a viewer sees images at an optimal viewing position with a horizontal four-view stereoscopic image display device.

Next, descriptions will be made about a mechanism for observing images in a multi-view display system. Similarly to the two-view display system, the image splitter is finely adjusted so that any stereo pair of images is positioned on the liquid crystal display panel right in front of the viewer. The proper stereo pair of images can be obtained by changing pixels displaying each image. FIG. 56 shows a way the viewer sees images with a horizontal four-view display system at the optimal viewing distance.

Images taken from viewpoints 1, 2, 3 and 4 are displayed in sequence on the liquid crystal display panel 11. A parallax barrier substrate 21 is placed on the viewer's side of the liquid crystal display panel 11 at a distance G from the panel 11. The parallax barrier substrate 21 comprises shading thin films 21$a$ arranged in a stripe pattern. The viewer observes a pair of image light passed through apertures 21$b$ between the shading thin films 21$a$.

Figure 57:
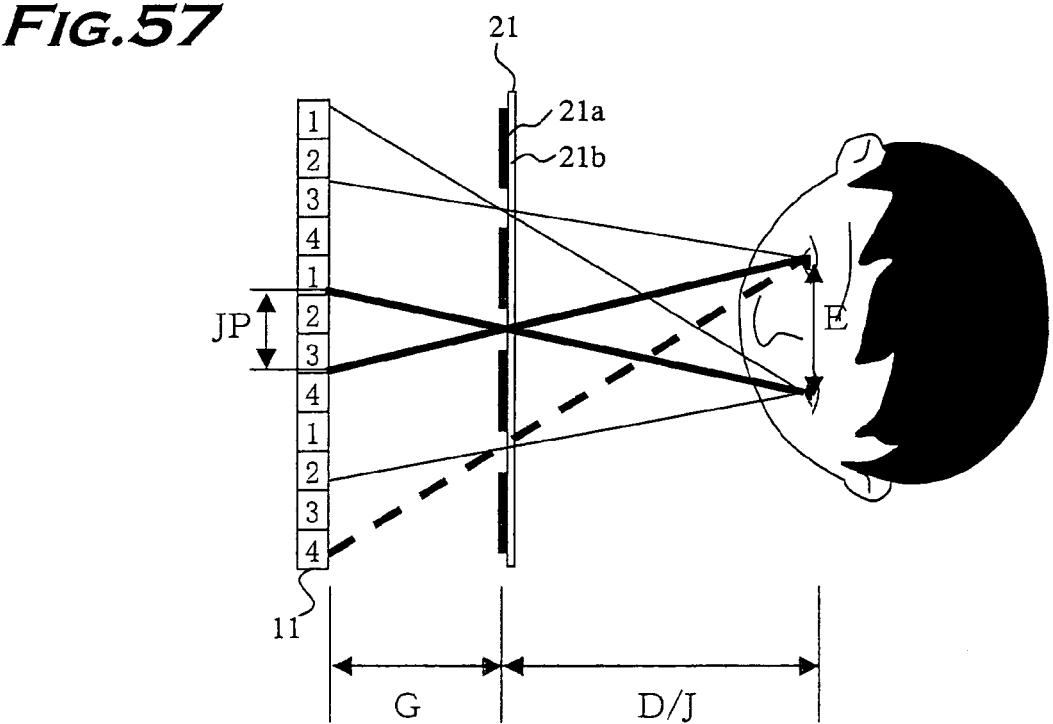
FIG. 57 is a diagram showing a way a viewer sees images at a viewing position during adjustment with the horizontal four-view stereoscopic image display device.
Figure 64A:
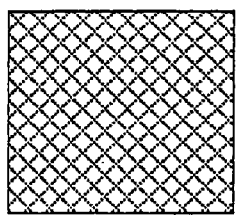
FIGS. 64A to 64D are diagrams showing images for adjustment in a first line used by a stereoscopic image display device even vertically displaying images taken from a plurality of viewpoints.
Figure 64B:
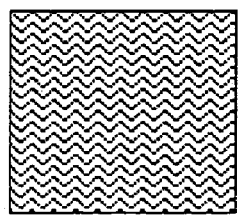
Figure 64C:
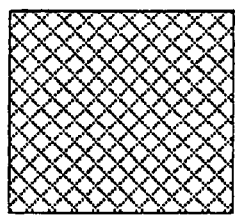
Figure 64D:
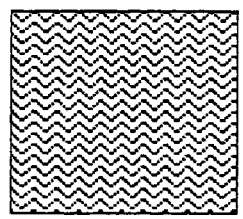
Figure 65A:
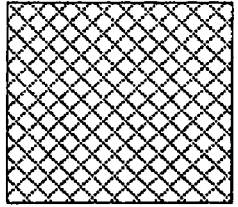
FIGS. 65A to 65D are diagrams showing images for adjustment in a second line used by the stereoscopic image display device even vertically displaying images taken from a plurality of viewpoints.
Figure 65B:
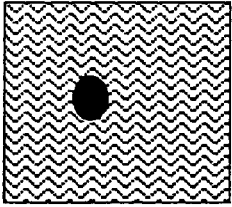
Figure 65C:
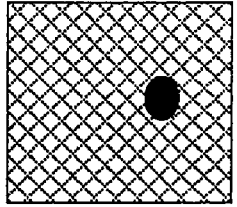
Figure 65D:
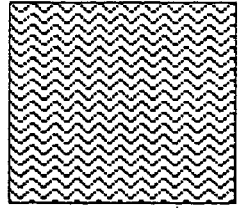
Figure 66A:
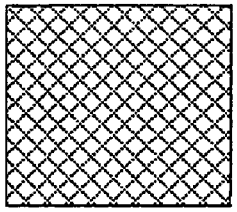
FIGS. 66A to 66D are diagrams showing images for adjustment in a third line used by the stereoscopic image display device even vertically displaying images taken from a plurality of viewpoints.
Figure 66B:
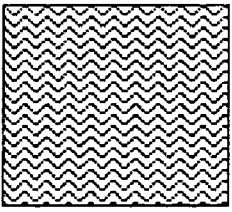
Figure 66C:
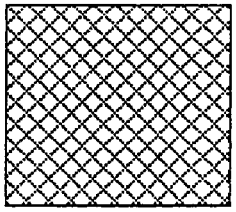
Figure 66D:
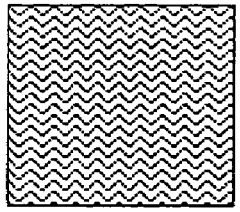

Letting J shown in FIG. 57 be an integer not less than 2, a space between points, which right eye and left eye of the viewer at 1/J of the optimal viewing distance (D/J) observe through the apertures, is an integral multiple of P (JP). Thus the theory of the two-view display system holds true for the multi-view display system and the positions of light and shade of the interference fringes observed by right eye agree with that observed by left eye at the distance D/J. Similarly to the two-view display system described above, the viewer can adjust the image splitter (parallax barrier) 2 as observing images.

The descriptions of an example of images shown in FIGS. 58A to 58D are made on the supposition that a width of a screen of the liquid crystal display panel 11 is four times of a distance between eyes (E) for the sake of clarity. A viewing position is at half an optimal viewing distance (D). These suppositions are applied to the other examples. As shown in FIGS. 58A to 58D, the liquid crystal display panel displays images taken from distinct viewpoints. FIG. 58A, 58B, 58C, and 58D are an image from viewpoint 1, 2, 3, and 4 respectively. However, it is difficult to perform the adjustment because each left eye and right eye observes an image different to each other as shown in FIGS. 58E and 58F at a distance D/2. FIG. 58 is the image which the left eye observes and FIG. 58F is the image which the right eye observes. To solve this problem, the images to be displayed should be easily adjustable images.

FIGS. 59A to 59F show an example of images for adjustment used in the horizontal four-view display system. As shown in FIGS. 59A to 59D only one image taken from one viewpoint positioned in front of the viewer is different from other three images that are all same. Images of FIGS. 59A, 59B, 59C, 59D are taken from the viewpoint 1, 2, 3, 4 respectively.

By displaying such images, it becomes easy to recognize interference fringes at the completion of the adjustment because fringes become clearly distinct or color and pattern are helpful to recognize fringes as shown in FIGS. 59E and 59F. The adjustment can be made with an image for either of eyes. FIG. 59E is the image which the left eye sees and FIG. 59F is the image which the right eye sees.

It is preferable that at least one of the images includes images enabling the viewer to recognize the state of fringes so as to make the adjustment easier. In this example, the images are added to all images in FIGS. 59A to 59D.

FIGS. 60A to 60F show another example of images for adjustment used in the horizontal four-view display system. As shown in FIGS. 60A to 60D only one image taken from one viewpoint positioned in front of the viewer includes a strip-shaped image and the other three images are all same. Images of FIGS. 60A, 60B, 60C, 60D are taken from the viewpoint 1, 2, 3, 4 respectively.

By displaying such images, only one eye sees an image including a strip-shaped image at the completion of the adjustment as shown in FIGS. 60E and 60F. The adjustment may be performed so as to see the image with a strip-shaped image with only one eye. FIG. 60E is the image which the left eye sees and FIG. 60F is the image which the right eye sees.

It is preferable that at least one of the images includes images enabling the viewer to recognize states of fringes so as to make the adjustment easier. In this example, the images are added to all images in FIGS. 60A to 60D.

FIGS. 61A to 61F show other example of images for adjustment used in the horizontal four-view display system. As shown in FIGS. 61A to 61D, images are grouped into images taken from even-numbered viewpoints and images taken from odd-numbered viewpoints. The image taken from the viewpoints 2 and 4 and images taken from the viewpoints 1 and 3 respectively display same images. Images of FIGS. 61A, 61B, 61C, 61D are taken from the viewpoint 1, 2, 3, 4 respectively.

By displaying such images, the left and right eyes of the viewer at a distance D/2 see same images at the completion of the adjustment as shown in FIGS. 61E and 61F. Thus the adjustment with both eyes is possible in this example. FIG. 61E is the image which the left eye sees and FIG. 61F is the image which the right eye sees.

It is preferable that at least one of the images includes images enabling the viewer to recognize the state of fringes so as to make the adjustment easier. In this example, the images are added to all images in FIGS. 61A to 61D.

If a mark (• in FIGS. 61A to 61F) is added to the images positioned right in front of the viewer, the viewpoint can be adjusted to correspond to the image properly.

FIGS. 62A to 62F show other example of images for adjustment used in the horizontal four-view display system. As shown in FIGS. 62A to 62D, images are grouped into images taken from even-numbered viewpoints and images taken from odd-numbered viewpoints and each image includes strip-shaped images. Images of FIGS. 62A, 62B, 62C, 62D are taken from the viewpoint 1, 2, 3, 4 respectively.

By displaying such images, the left and right eyes of the viewer at a distance D/2 see same images at the completion of the adjustment as shown in FIGS. 62E and 62F. Thus the adjustment with both eyes is possible in this example. FIG. 62E is the image which the left eye sees and FIG. 62F is the image which the right eye sees.

It is preferable that at least one of the images includes images enabling the viewer to recognize the state of fringes so as to make the adjustment easier. In this example, the images are added to all images in FIGS. 62A to 62D.

If a mark (• in FIGS. 62A to 62F) is added to the images positioned right in front of the viewer, the viewpoint can be adjusted to correspond to the image properly.

FIGS. 63A to 63F show other additional example of images for adjustment used in the horizontal four-view display system. As shown in FIGS. 63A to 63D, images are grouped into images taken from even-numbered viewpoints and images taken from odd-numbered viewpoints and each image includes strip-shaped images. Images of FIGS. 63A, 63B, 63C, 63D are taken from the viewpoint 1, 2, 3, 4 respectively.

By displaying such images, the left and right eyes of the viewer at a distance D/2 see same images at the completion of the adjustment as shown in FIGS. 63E and 63F. Thus the adjustment with both eyes is possible in this example. FIG. 63E is the image which the left eye sees and FIG. 63F is the image which the right eye sees.

It is preferable that at least one of the images includes images enabling the viewer to recognize the state of fringes so as to make the adjustment easier.

If a mark (• in FIGS. 63A to 63F) is added to the images positioned right in front of the viewer, the viewpoint can be adjusted to correspond to the image properly.

With reference to FIGS. 64 to 67, descriptions will be made on adjustment when a plurality of images taken from distinct viewpoints are disposed not only in a horizontal direction but also in a vertical direction. In this example three images taken from three viewpoints are disposed in the vertical direction. FIGS. 64A, 64B, 64C and 64D constitute a first line and are images taken from viewpoints 1, 2, 3 and 4 respectively. FIGS. 65A, 65B, 65C and 65D constitute a second line and are images taken from viewpoints 1, 2, 3 and 4 respectively. FIGS. 66A, 66B, 66C and 66D constitute a third line and are images taken from viewpoints 1, 2, 3 and 4 respectively.

Regarding adjustment in the horizontal direction, same concept applied to the horizontal multi-view display system which displays images only horizontally can be applied to this multi-view display system. Regarding rotational adjustment, if adjustment is performed by rotating the image splitter along either one of horizontal axis or vertical axis, adjustment is automatically performed along another axis. When adjusting along the horizontal axis, therefore same images may be displayed in the vertical direction.

Figure 67A:
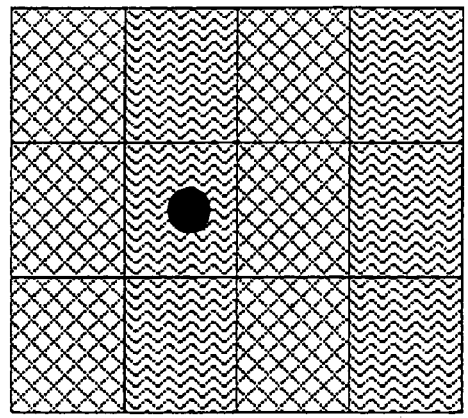
FIGS. 67A and 67B are diagrams each showing an image when a viewer observes images of FIGS. 64A to 66D at a distance D/2.
Figure 67B:
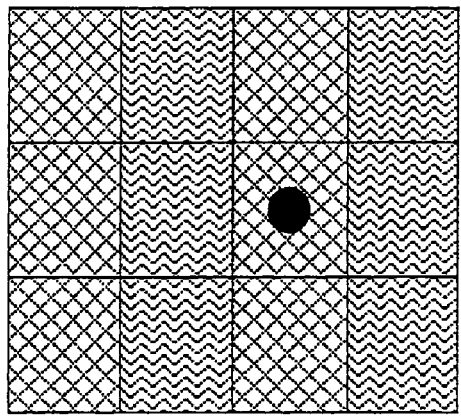

By displaying such images as shown in FIGS. 64A to 66D, the viewer at a distance D/2 sees the image of FIG. 67A with the left eye and the image of FIG. 67B with the right eye.

Images taken from each viewpoint may be square images or images including vertically oriented strip-shaped images. If a mark (• in Figures) is added to the images positioned right in front of the viewer, the viewpoint can be adjusted to correspond to the image properly.

In a case of a horizontal seven-view display system which there are no two images positioned exactly right in front of the viewer, two images taken from the viewpoints 4 and 5, which are positioned in roughly front of the viewer, may be selected.

Although a parallax barrier system is used as an image splitter in the above embodiments, this adjustment method is applicable to any other kinds of systems, which are capable of creating moiré, such as a lenticular lens system, a polarizing glasses system using a micropol. Even if the parallax barrier, lenticular lens, or pinhole is disposed slantwise, the adjustment can be succeeded with the use of images created properly by superimposing appropriate images in consideration of the viewing position during adjustment.

Figures 68, 69:
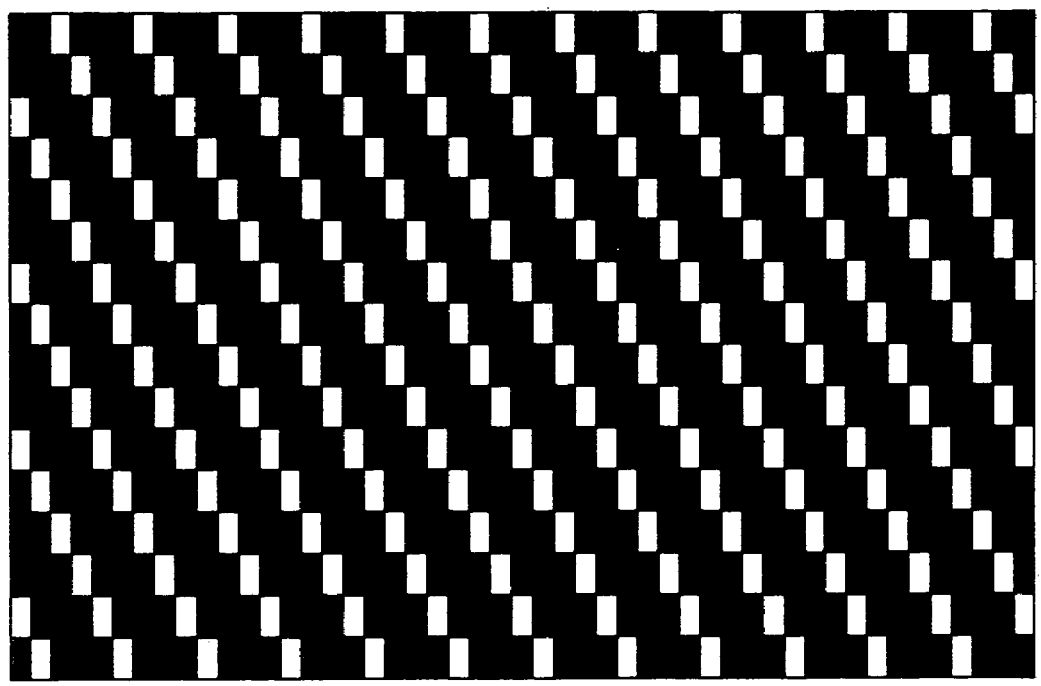
FIG. 68 is a diagram showing a configuration of pixels to be displayed on the liquid crystal display screen when using a slanted barrier.
FIG. 69 is a diagram of a parallax barrier corresponding to the display screen of FIG. 68.

Now descriptions will be made on a case where a parallax barrier with pinholes disposed slantwise is used. With reference to FIGS. 68 to 71 descriptions will be made on a parallax barrier with pinholes disposed slantwise for a stereoscopic image display displaying images taken from four viewpoints. FIG. 68 is a diagram showing a configuration of pixels displayed on the liquid crystal display screen. FIG. 69 is a diagram of the parallax barrier corresponding to the display screen.

Figure 70:
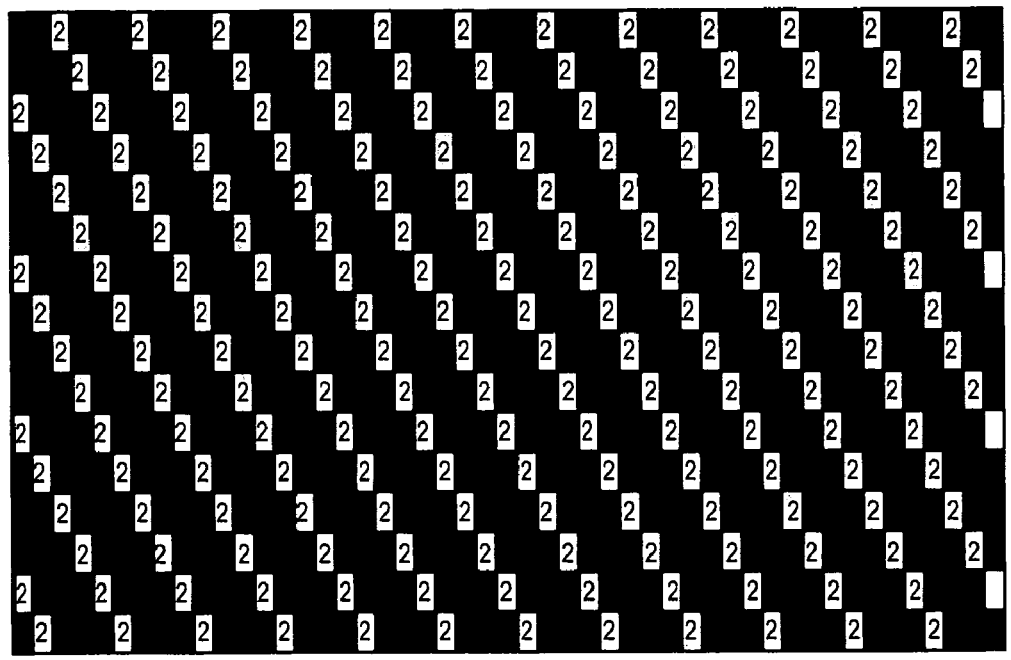
FIG. 70 is a diagrammatic image when a viewer observes the image of FIG. 68 with the left eye at a proper viewing distance.
Figure 71:
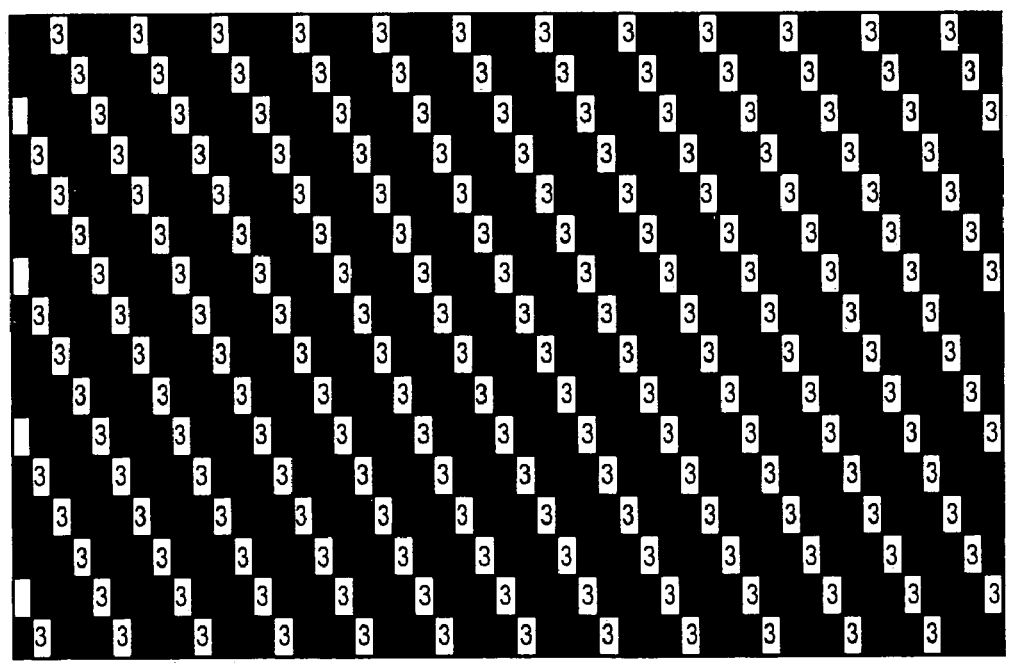
FIG. 71 is a diagrammatic image when the viewer observes the image of FIG. 68 with the right eye at a proper viewing distance.

As shown in FIG. 68, images taken from four viewpoints are combined and repeatedly displayed in order of "4", "3", "2", "1" horizontally and vertically. Corresponding to the display screen, as shown in FIG. 69, barrier sections 21e are formed in a slanted stripe pattern with pinholes 20d formed stepwise on the parallax barrier. This parallax barrier, as shown in FIGS. 68 and 69, splits adjacent images and gives the split images to the right eye and the left eye. FIG. 70 shows an image when a viewer at a proper viewing distance sees the display screen shown in FIG. 68 with viewer's left eye. FIG. 71 shows an image when the viewer at the proper viewing distance sees the display screen shown in FIG. 68 with viewer's right eye.

In this example shown in FIGS. 70 and 71, left and right eyes observe images taken from viewpoints 2 and 3 respectively by adjusting the relative position between the display screen and parallax barrier.

Figure 72:
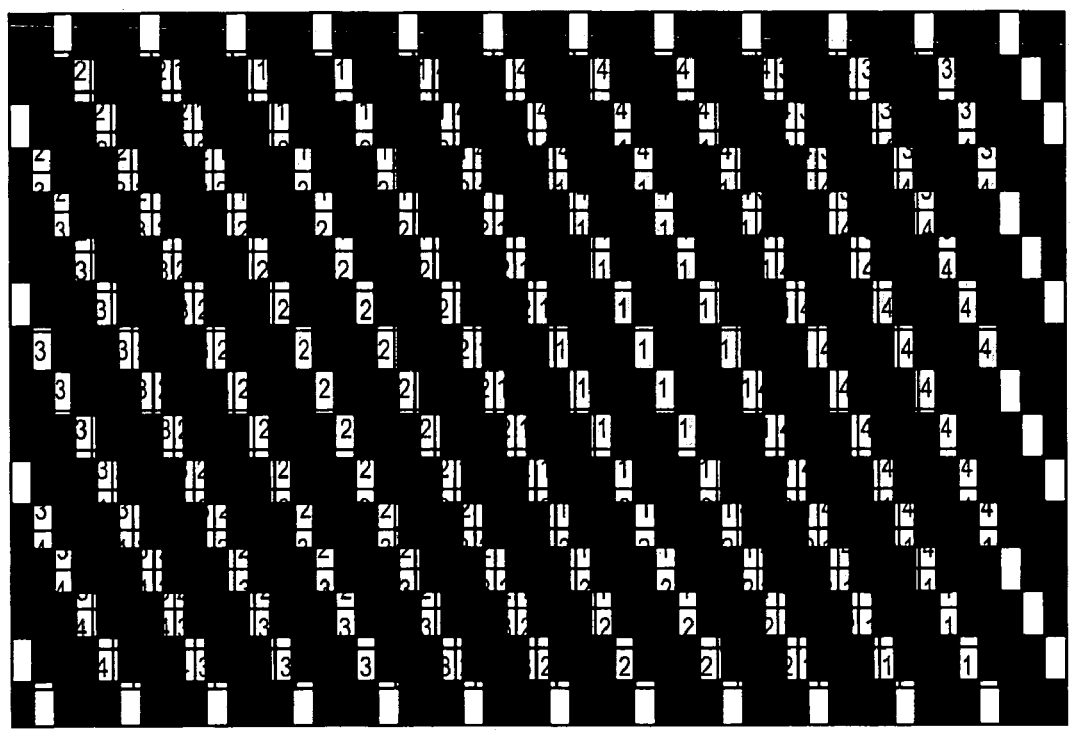
FIG. 72 is a diagrammatic image when the viewer observes the image of FIG. 68 with the left eye at half the proper viewing distance.
Figure 73:
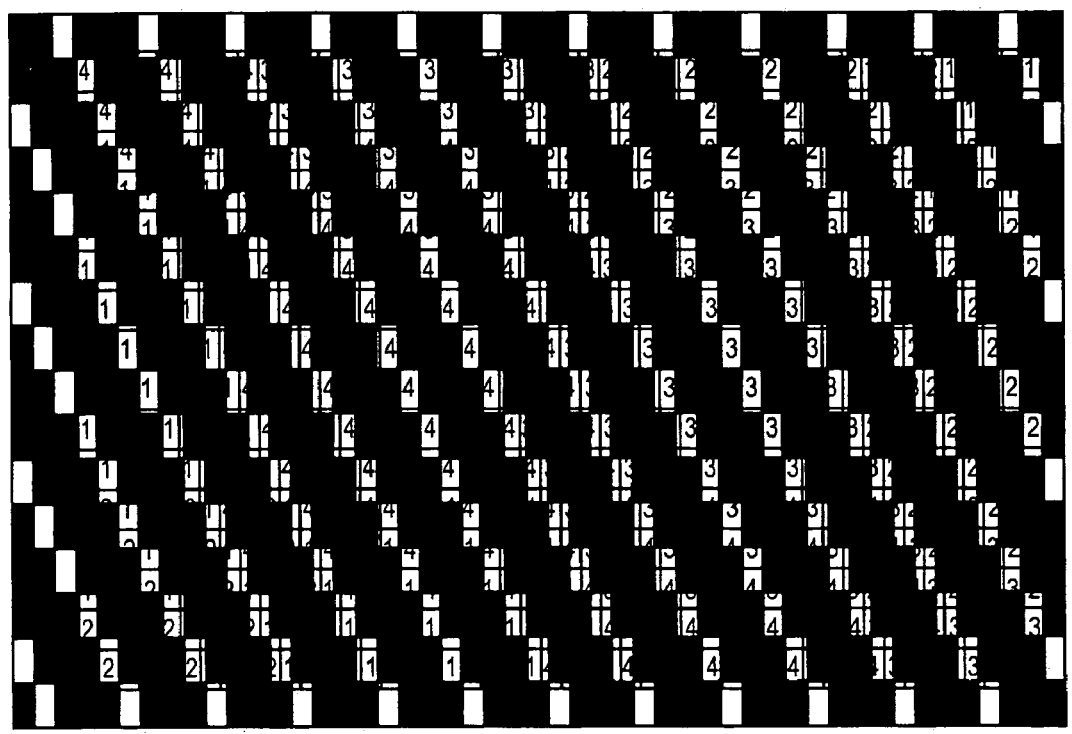
FIG. 73 is a diagrammatic image when the viewer observes the image of FIG. 68 with the right eye at half the proper viewing distance.
Figure 78A:
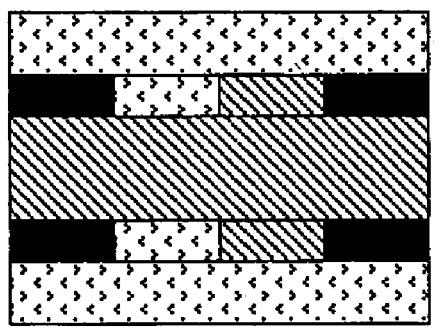
FIGS. 78A to 78D are diagrams showing another example of images for adjustment.
Figure 78B:
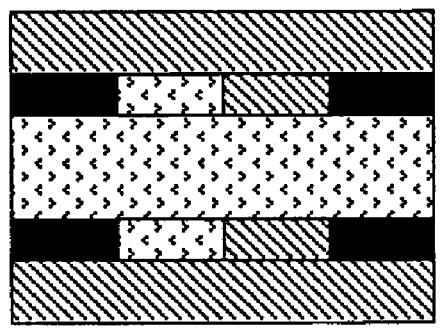
Figure 78C:
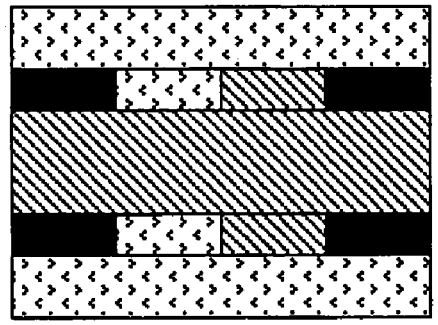
Figure 78D:
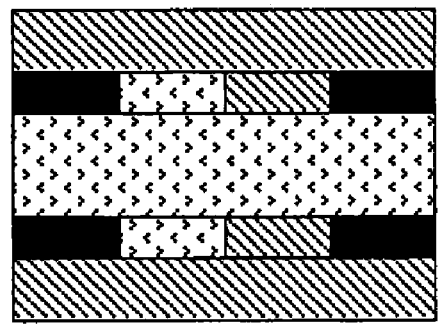

The following are descriptions about an adjustment method when using a parallax barrier with pinholes disposed slantwise as mentioned above. When a viewer is at a proper viewing distance, each left eye and right eye observes an image taken from a viewpoint respectively, in this example, the left eye observes an image taken from the viewpoint 2 while the right eye observes an image taken from the viewpoint 3 as shown in FIGS. 70 and 71. When the viewer is closer than the proper viewing distance, however, the left eye and right eye observe images taken from different viewpoints respectively. Each FIGS. 72 and 73 shows a diagrammatic image when the viewer observes the display screen at half the proper viewing distance after the completion of adjusting the relative position of the parallax barrier and the display panel. FIG. 72 shows a diagrammatic image when the viewer at half the proper viewing distance sees the display screen shown in FIG. 68 with his/her left eye. FIG. 73 shows a diagrammatic image when the viewer at half the proper viewing distance sees the display screen shown in FIG. 68 with his/her right eye.

In the vicinity of images positioned right in front of the left and right eyes, the viewer sees images taken from same viewpoints as those are seen by the viewer at the proper viewing distance because the relative position of the eyes, pinholes and pixels are almost unchanged. However the viewer sees images taken from different viewpoints in the other area because the relative position of the eyes, pinholes and pixels are changed. FIGS. 74A and 74B are diagrams roughly showing which viewpoint the image the left eye and the right eye see is taken from. FIG. 74A is an image which the left eye sees while FIG. 74B is an image which the right eye sees. As apparent from the FIGS. 74A and 74B, each left and right eye sees images taken from a plurality of viewpoints, in this embodiment images taken from four viewpoints are seen. FIGS. 75A to 75D show regions in the images which left and right eyes actually see. FIG. 75A shows regions which the left and right eyes actually see when the viewer sees the image taken from the viewpoint 1. FIG. 75B shows regions which the left and right eyes actually see when the viewer sees the image taken from the viewpoint 2. FIG. 75C shows regions which the left and right eyes actually see when the viewer sees the image taken from the viewpoint 3. FIG. 75D shows regions which the left and right eyes actually see when the viewer sees the image taken from the viewpoint 4.

When preparing images for adjustment, color of each region and letters to be displayed may be determined by referring to FIGS. 74A to 75D, as shown in FIGS. 76A to 76D. FIG. 76A shows regions which the left and right eyes see when the viewer sees the image taken from the viewpoint 1. FIG. 76B shows regions which the left and right eyes see when the viewer sees the image taken from the viewpoint 2. FIG. 76C shows regions which the left and right eyes see when the viewer sees the image taken from the viewpoint 3. FIG. 76D shows regions which the left and right eyes see when the viewer sees the image taken from the viewpoint 4. In this example, the images are created so that the left and right eyes see same colored pattern (the color inside the parentheses in the figures) and letters (L) and (R) in the only region positioned right in front of left and right eyes.

With these images, the left and right eyes see same red and blue stripe images as shown in FIGS. 77A and 77B. FIG. 77A is an image which the left eye sees while FIG. 77B is an image which the right eye sees. Incidentally, any color is available to regions without instructions of color.

The omission of letters eliminates distinctions between images 1 and 3 and images 2 and 4, therefore these images are inadequate to the adjustment. The omission of colors, however, keeps its effect as images for adjustment only with letters. If color is omitted, backgrounds of all images are set white commonly, but light and shade of moiré can be seen slightly. The adjustment is made in a rotational direction as watching the moiré while the adjustment is made in a horizontal direction as watching the way the letter appears.

Figure 79:
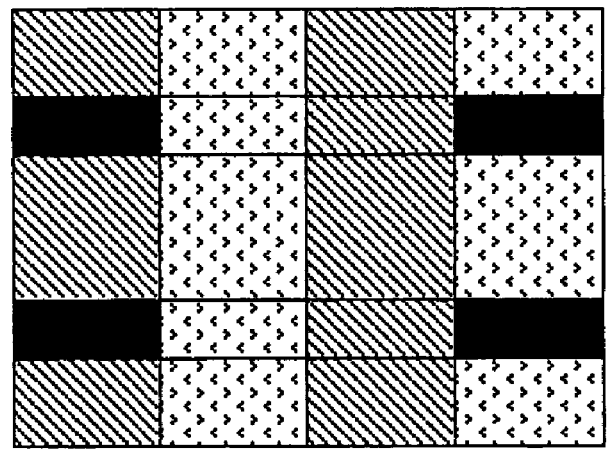
FIG. 79 is a diagrammatic image when the viewer observes images for adjustment shown in FIGS. 78A to 78D.
Figure 80A:
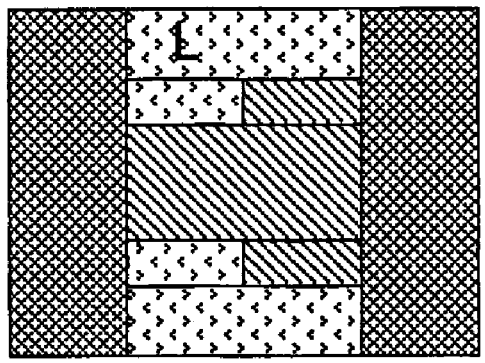
FIGS. 80A to 80D are diagrams showing other example of images for adjustment.
Figure 80B:
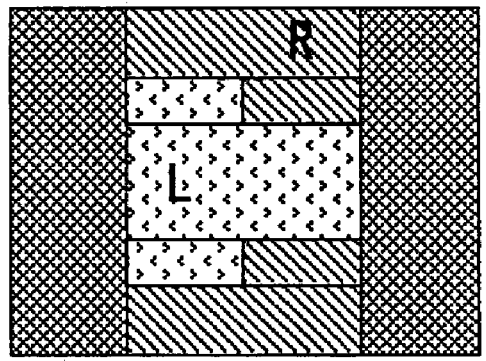
Figure 80C:
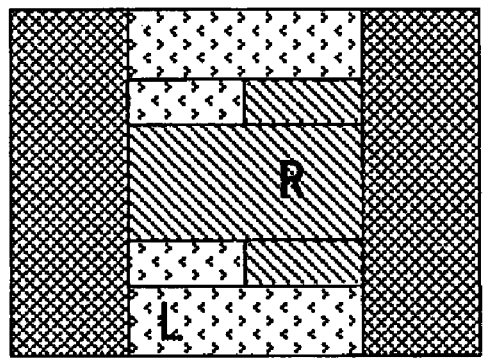
Figure 80D:
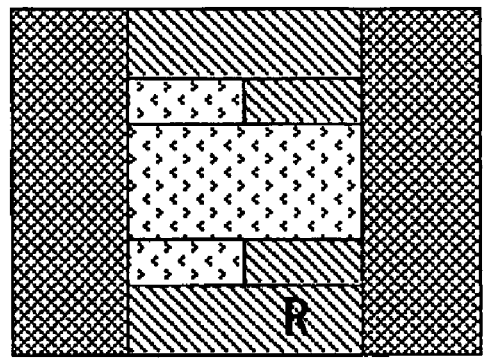

A specific example of images for adjustment will be shown in FIGS. 78A to 78D. FIGS. 78A, 78B, 78C, 78D are images taken from viewpoints 1, 2, 3, 4 respectively. In a state where moiré is seen, images from two viewpoints are combined in a region along the boundary of the images. In this example, black strip images are added to upper regions and lower regions near the boundary of the images in order to recognize the state of fringes. Moiré is adjusted with reference to the images rendered in the black strips in common with all images. On the completion of the adjustment, an image with same colored or same patterned strips are seen vertically as shown in FIG. 79. When a pixel pitch in a vertical direction is n times a pixel pitch in a horizontal direction, a pitch of moiré in a horizontal direction is equivalent to a distance between eyes and a pitch of moiré in a vertical direction is n times a distance between eyes. In a case of color images, for example, the pixel pitch in the vertical direction becomes triple.

Figure 81A:
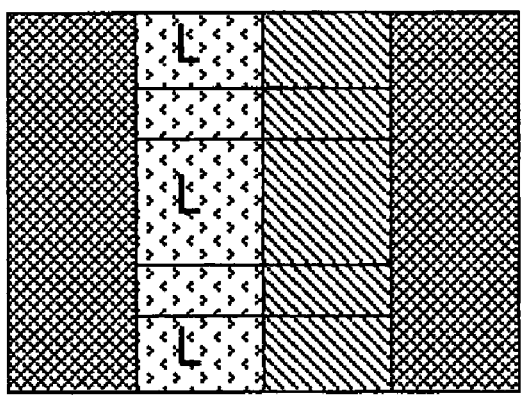
FIGS. 81A and 81B are diagrammatic images when the viewer observes images for adjustment shown in FIGS. 80A to 80D.
Figure 81B:
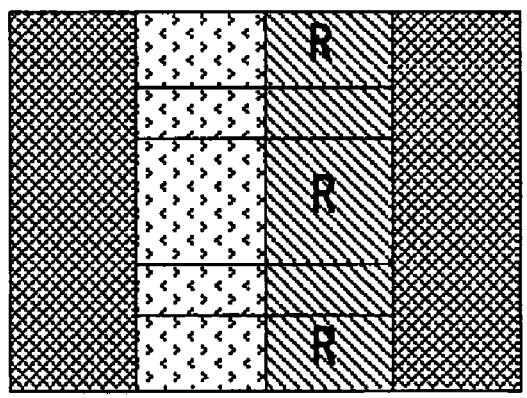
Figure 82A:
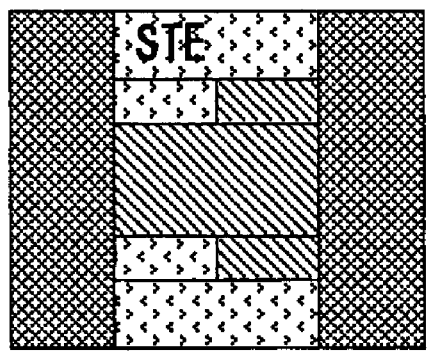
FIGS. 82A to 82D are diagrams showing other additional example of images for adjustment.
Figure 82B:
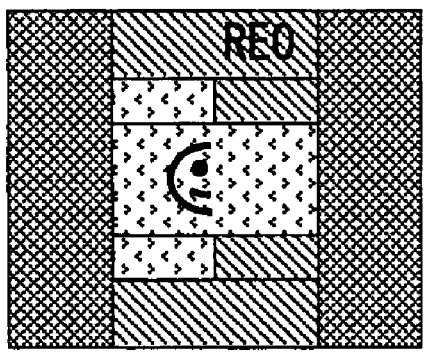
Figure 82C:
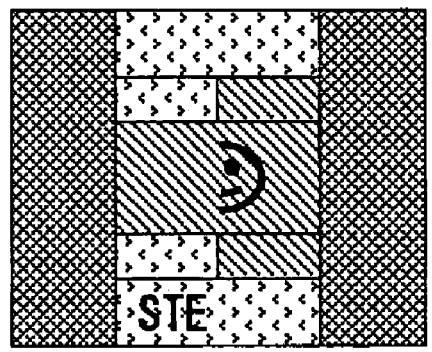
Figure 82D:
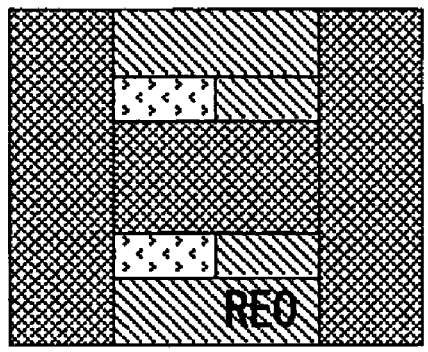
Figure 83A:
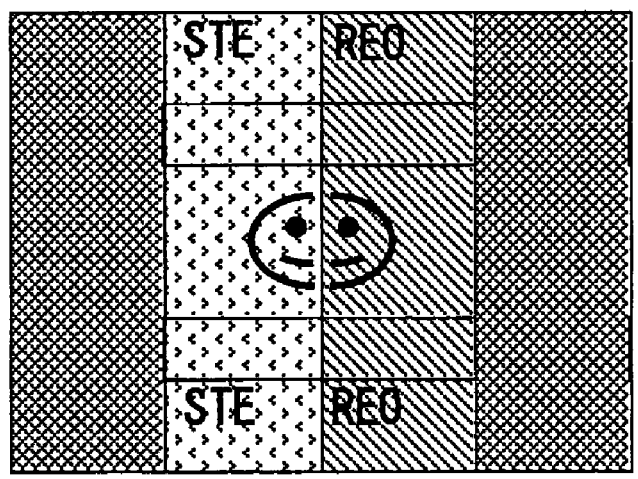
FIG. 83 is a diagrammatic image when the viewer observes images for adjustment shown in FIGS. 82A to 82D.

FIGS. 80A to 80D are another specific example of images for adjustment, adding letters "L" and "R" into images. FIGS. 80A, 80B, 80C, 80D are images taken from the viewpoints 1, 2, 3, 4 respectively. On the completion of the adjustment, the viewer sees images shown in FIGS. 81A and 81B when observing the images for adjustment shown in FIGS. 80A to 80D. FIG. 81A is an image which the left eye sees while FIG. 81B is an image which the right eye sees. The right eye perceives "R" and the left eye perceives "L". Due to only moiré around center is needed to perform the adjustment, in this example, certain color and pattern are given to the other negligible regions FIGS. 82A to 82D are other specific example of images for adjustment. In this example, letters and pictures which seen by the left eye and letters and pictures which seen by the right eye make a word and a finished picture when seeing with both eyes. FIGS. 82A, 82B, 82C, 82D are images taken from the viewpoints 1, 2, 3, 4 respectively. When the viewer sees the images with both eyes, the letters and pictures appear as a meaningful word and a face as shown in FIG. 83.

Although it is not shown in the figures, letters, words and pictures which the viewer will see eventually may be displayed in a fixed pattern in common through all images.

Figures 84, 85A, 85B, 86A, 86B, 87A, 87B:
FIG. 84 is a diagram showing a relation between an aperture of the parallax barrier and pixels corresponding to eight distinct viewpoints.
FIGS. 85A and 85B are diagrams showing images which the viewer sees at a distance which moiré can be seen at the completion of adjustment.
FIGS. 86A and 86B are diagrammatic images which the viewer sees at the distance which moiré can be seen with the barrier misaligned leftward.
FIGS. 87A and 87B are diagrammatic images which the viewer sees at the distance which moiré can be seen with the barrier misaligned rightward.
Figure 88A:
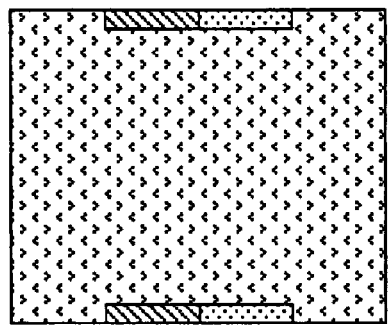
FIGS. 88A to 88H are diagrams showing an example of images for adjustment.
Figure 88B:
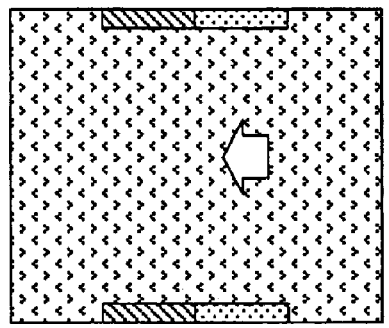
Figure 88C:
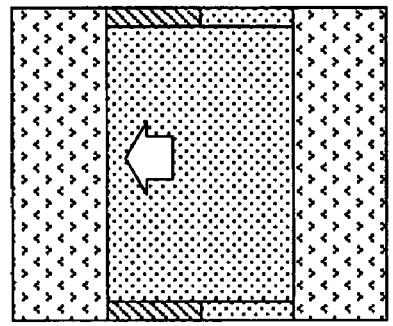
Figure 88D:
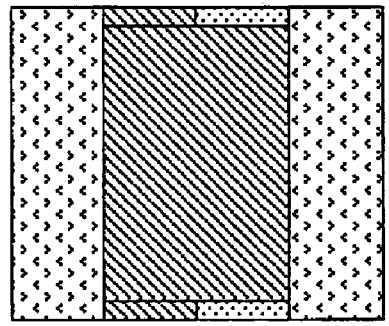
Figure 88E:
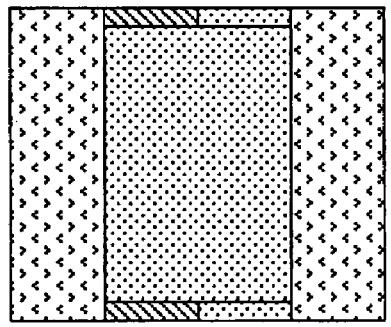
Figure 88F:
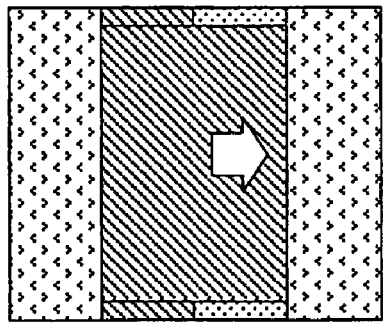
Figure 88G:
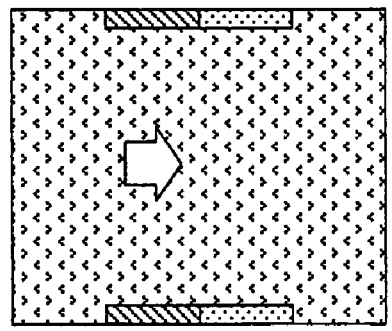
Figure 88H:
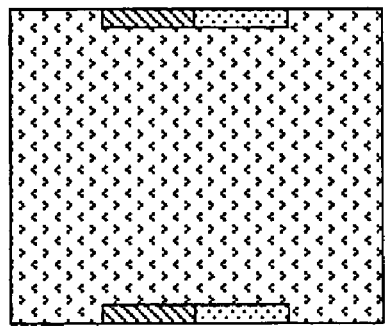

The following are descriptions on an adjustment method of images taken from more viewpoints than that mentioned above. Here, descriptions will be made on moiré in a horizontal direction alone. FIG. 84 is a diagram showing a relation between an aperture of the parallax barrier 21 and pixels corresponding to images taken from eight distinct viewpoints. In an example shown in FIG. 84, the viewer at a proper viewing position sees "5" with the right eye and "4" with the left eye. On the completion of the adjustment, the viewer, who is at a distance from which moiré can be seen, sees images shown in FIGS. 85A and 85B with the left and right eyes respectively. FIG. 85A is an image which the left eye sees while FIG. 85B is an image which the right eye sees. As appreciated from FIGS. 85A and 85B, "5" is positioned right in front of the right eye and "4" is positioned right in front of the left eye. If the barrier shifts leftward from this state, the viewer at the proper viewing distance sees "6" with the right eye and "5" with the left eye, in other words, the viewer sees the images shown in FIGS. 86A and 86B at the distance from which moiré can be seen. FIG. 86A shows an image which the left eye sees, while FIG. 86B shows an image which the right eye sees. Conversely, if the barrier shifts rightward, the viewer at the proper viewing distance sees "4" with the right eye and "3" with the left eye, in other words, the viewer sees the images shown in FIGS. 87A and 87B at the distance from which moiré can be seen. FIG. 87A shows an image which the left eye sees, while FIG. 87B shows an image which the right eye sees.

FIGS. 88A to 88H are an example of images for adjustment for each viewpoint in the above-mentioned case. FIGS. 88A, 88B, 88C, 88D, 88E, 88F, 88G, 88H are images taken from viewpoints 1, 2, 3, 4, 5, 6, 7, 8 respectively.

Figure 89:
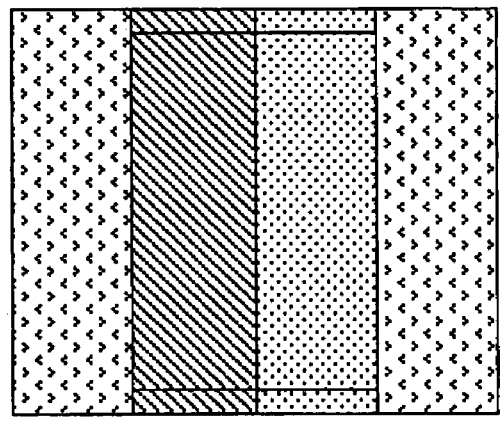
FIG. 89 is a diagrammatic image when the viewer observes images for adjustment shown in FIGS. 88A to 88D.

The viewer does not see any arrows in the image as shown in FIG. 89 on the completion of adjustment, but the viewer sees arrows indicating directions for adjusting the barrier as shown in FIGS. 90A, 90B, 91A, 91B while the barrier is being misaligned leftward or rightward.

Figure 90A:
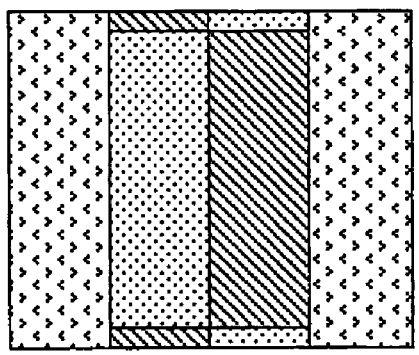
FIGS. 90A and 90B are diagrammatic images when the viewer observes images for adjustment shown in FIGS. 88A to 88H with the barrier misaligned rightward.
Figure 90B:
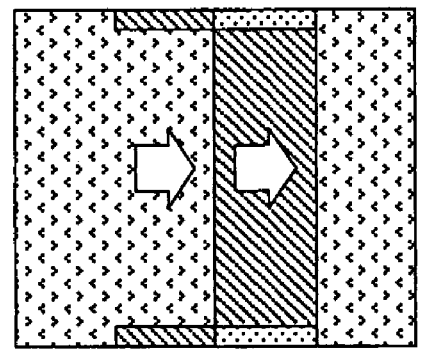
Figure 91A:
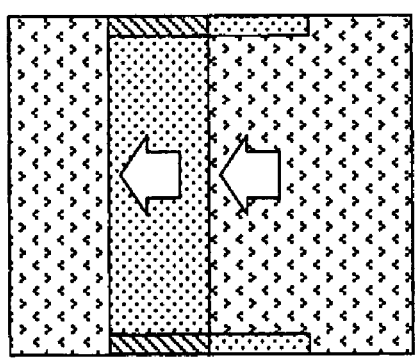
FIGS. 91A and 91B are diagrammatic images when the viewer observes images for adjustment shown in FIGS. 88A to 88H with the barrier misaligned leftward.
Figure 91B:
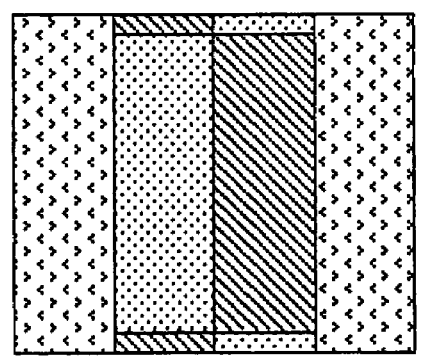
Figure 92A:
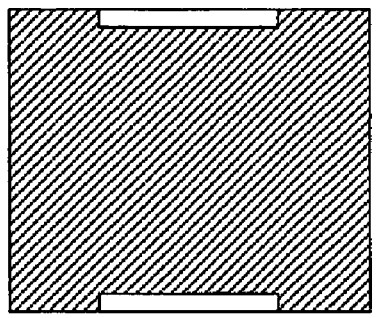
FIGS. 92A to 92H are diagrams showing an example of images for adjustment.
Figure 92B:
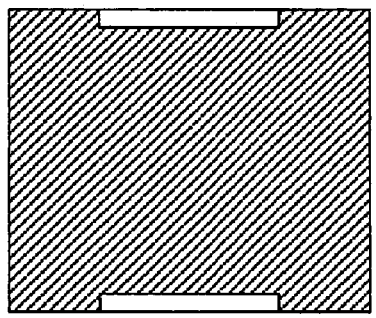
Figure 92C:
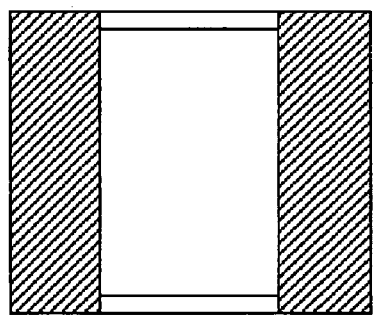
Figure 92D:
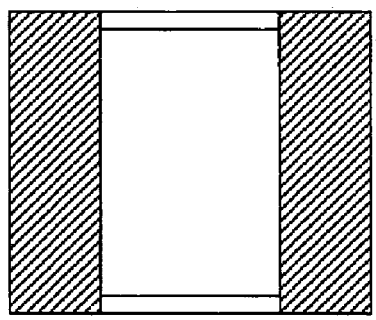
Figure 92E:
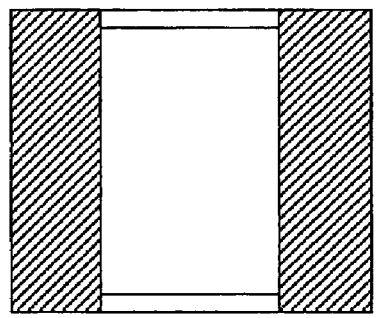
Figure 92F:
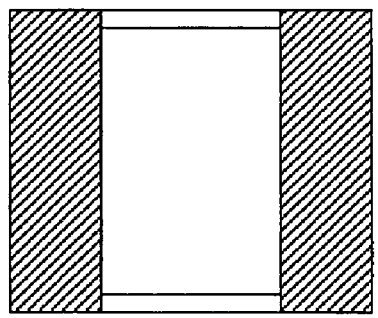
Figure 92G:
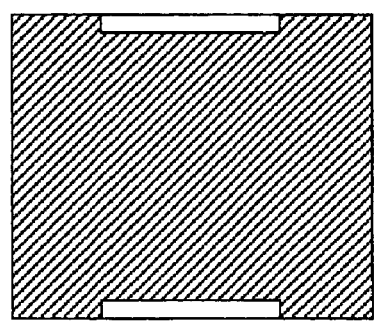
Figure 92H:
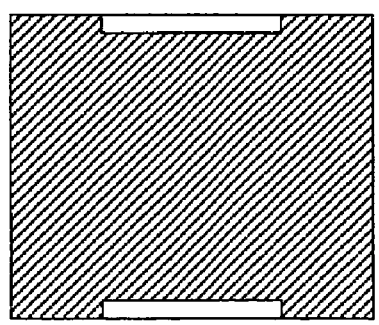

FIGS. 90A and 90B are images when the barrier is misaligned leftward and shows an image which the left eye sees and an image which the right eye sees respectively. FIGS. 91A and 91B are images when the barrier is misaligned rightward and shows an image which the left eye sees and an image which the right eye sees respectively.

Above mentioned methods can indicate that the viewer is getting closer to a correct position even though an adjusting range in a horizontal direction becomes wider with an increase in number of the viewpoints. Although the directions for adjustment indicate directions to which the barrier should move in this example, the directions may indicate which direction moiré should move to. It is found that the barrier shifts in the direction opposite to the image, namely moiré from FIGS. 85A, 85B, 86A, 86B, 87A, 87B.

In a case where the viewer sees images taken from many viewpoints, it is not always necessary that images positioned right in front of the viewer should be strictly limited. The adjustment can be performed by adding different images to the images taken from viewpoints which positioned in the vicinity of center of the all images. In an example shown in FIGS. 92A to 92H, images taken from the viewpoints 3 to 6 include white strips. The viewer in front of the screen performs the adjustment so as to see a white strip around center of the screen.

FIGS. 92A, 92B, 92C, 92D, 92E, 92F, 92G, 92H are images taken from the viewpoints 1, 2, 3, 4, 5, 6, 7, 8 respectively.

If the number of the viewpoints is an odd number in the above example, for example, seven images taken from seven viewpoints, either of first image or eighth image may be omitted from the above example. In the example shown in FIGS. 92A to 92H, one image may be omitted from images taken from the viewpoint 3 to 6, whereby the white strip is displayed on three images.

The arrows can be adopted for adjustment in a vertical direction. With consideration given to the relationship of visible arrows, rotation adjustment can be also performed.

Colors in each region, patterns, letters, pictures, and the position of the arrows are not limited to those in the above mentioned examples.

Figure 93:
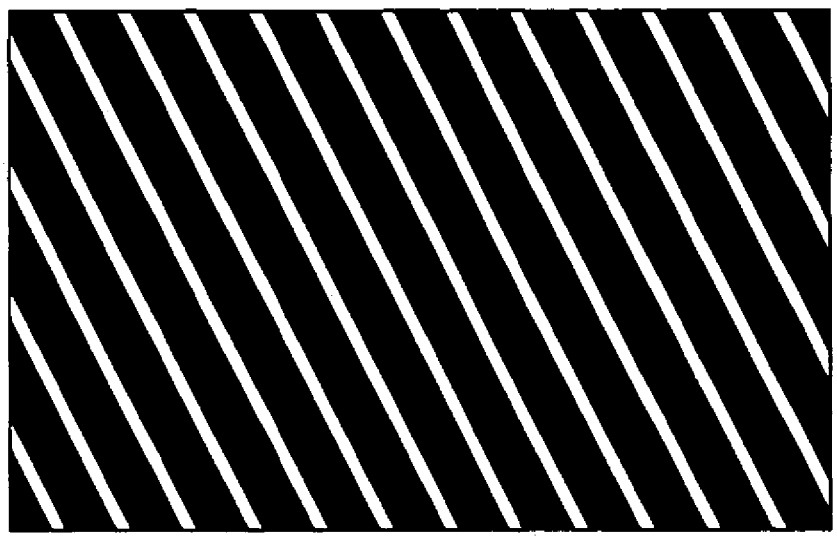
FIG. 93 is a plane view of an example of a parallax barrier.

Also other barrier can be used, for example, the barrier in a shape shown in FIG. 93 may be taken into consideration.

Although descriptions were made with the assumption that the width of the screen is four times, as long as a distance between eyes in above mentioned embodiments, it is not limited to this.

Although descriptions were made with the assumption that the distance which moiré can be seen is half the proper viewing distance, the method in the description can be applied to adjust images even the viewer is at a third of the proper viewing distance.

Figure 94:
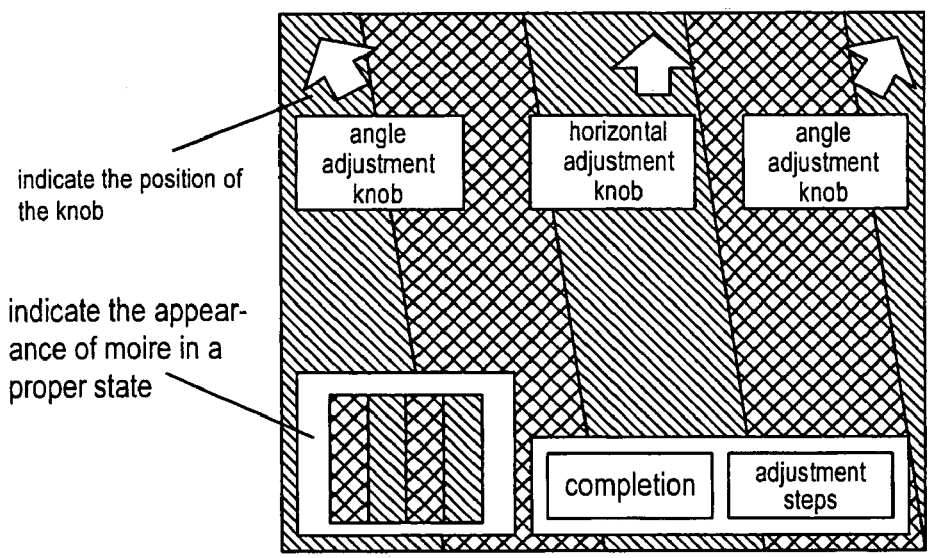
FIG. 94 is a schematic view showing an example of an image displayed on a liquid crystal display device.

The following are descriptions on an example of which above mentioned adjustments are carried out as instructed by software in an interactive manner. FIG. 94 is a diagram showing an example of an image displayed on a liquid crystal display 1. On the image, displayed are arrows indicating the position of the adjustment knobs and a picture indicating the appearance of the image at the completion of the adjustment. Such an image is displayed in every step of adjustment to adjust the barrier.

Figure 95:
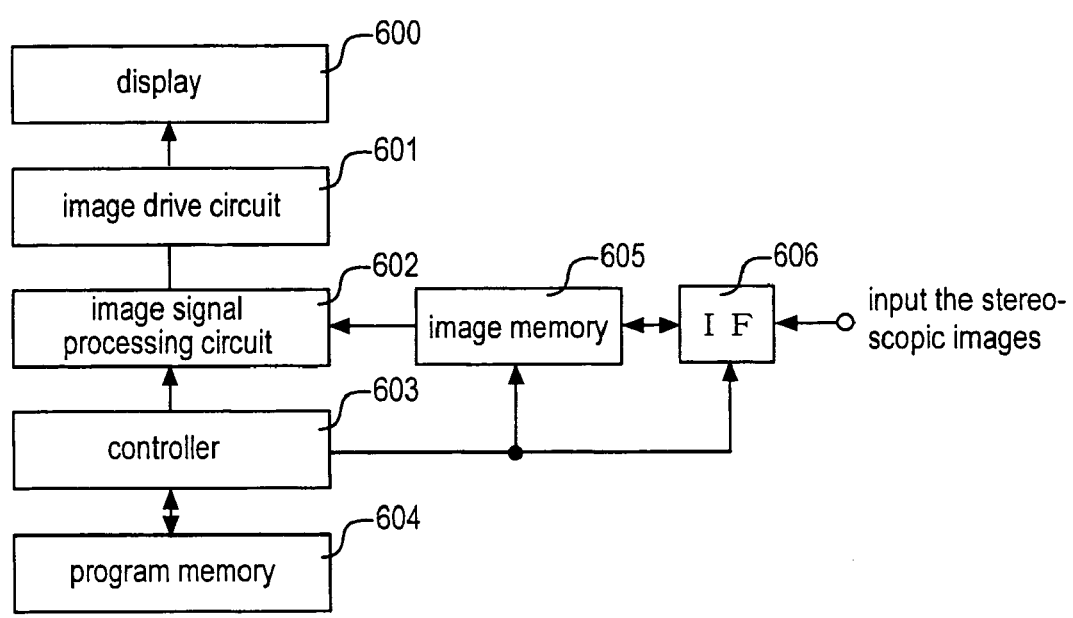
FIG. 95 is a block diagram showing a structure of a stereoscopic image display system of the invention.

FIG. 95 shows a configuration of a stereoscopic image display system to which this adjustment method is applied. FIG. 95 is a block diagram showing a configuration of the stereoscopic image display system whose display 600 is provided with above mentioned image splitter 2. The display 600 includes a liquid crystal panel. Images taken from a plurality of viewpoints are displayed on the liquid crystal panel as shown in FIGS. 77A and 77B. An image signal processing circuit 602 grabs image data taken from a plurality of viewpoints once stored in an image memory 605 and subjects the data to predetermined signal processing to feed it to an image drive circuit 601. The image drive circuit 601 drives its circuit based on the fed image signals and causes the display 600 to display predetermined images. A controller 603 is a microcomputer and controls each block based on programs stored in a program memory 604. The program memory 604 stores not only programs for controlling various operations but also programs for adjusting images in this embodiment as will be described later so as to perform the image adjustment operation in an interactive manner with a user.

The image adjustment program is used after being installed to a system from a CD-ROM etc. which stores the program. The image memory 605 grabs stereoscopic image data through an interface 606.

Figure 96:
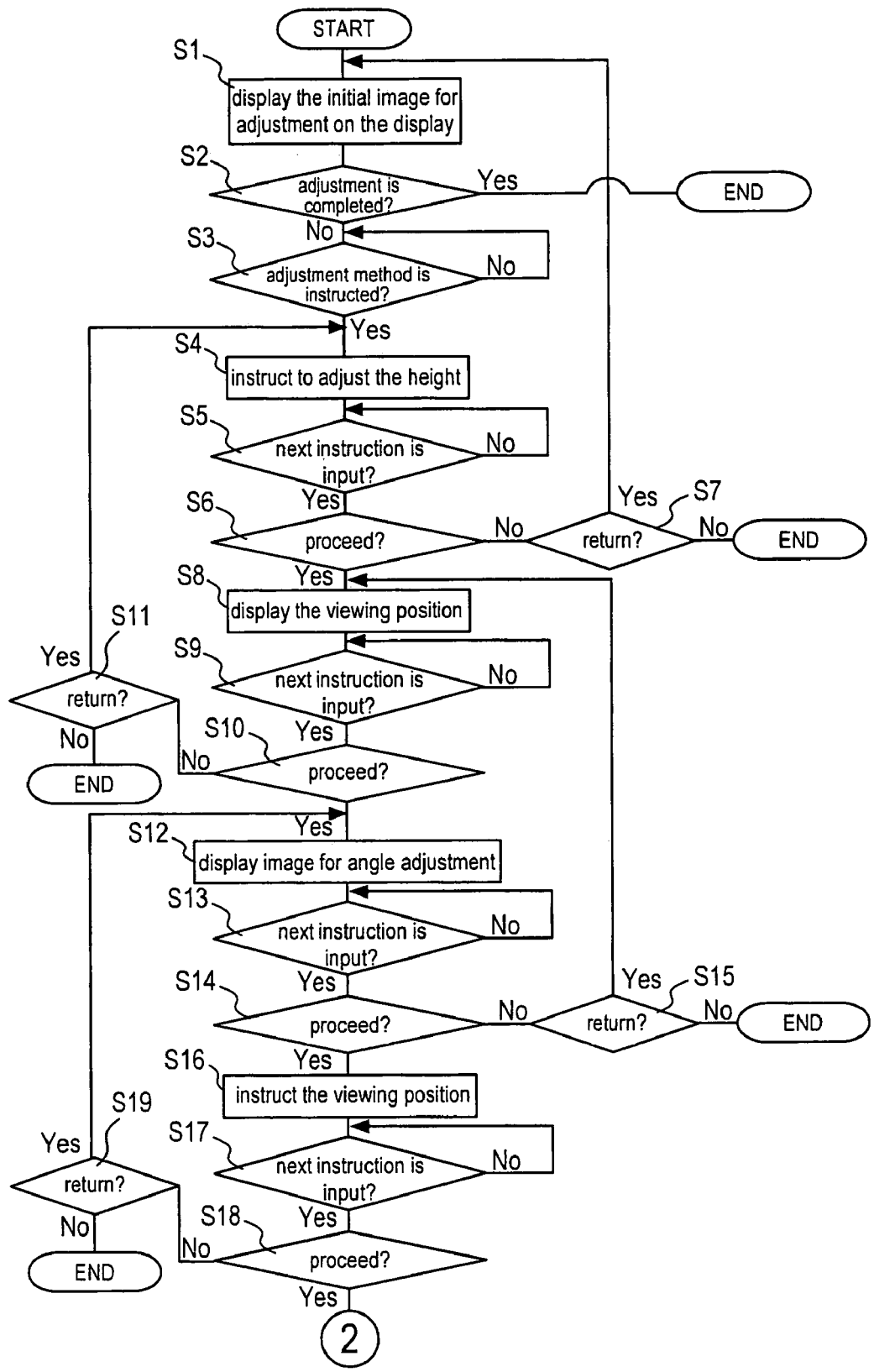
FIG. 96 is a flow chart showing control operations of images for adjustment in the stereoscopic image display system of the invention.
Figure 97:
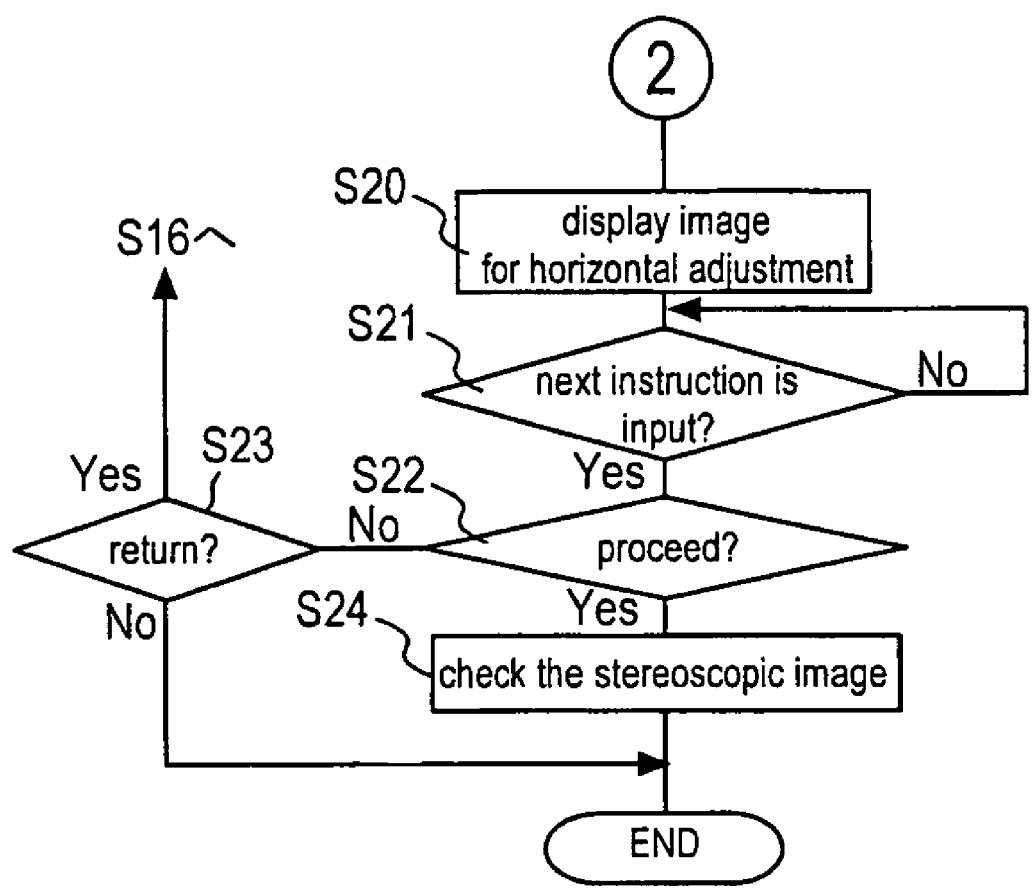
FIG. 97 is a flow chart showing control operations of images for adjustment in the stereoscopic image display system of the invention.

With reference to flowcharts shown in FIGS. 96 and 97 and examples of display screens shown in FIGS. 98 to 104, descriptions will be made on steps of adjustment which are carried out with instructions by software in an interactive manner in the above system configuration.

Figure 98:
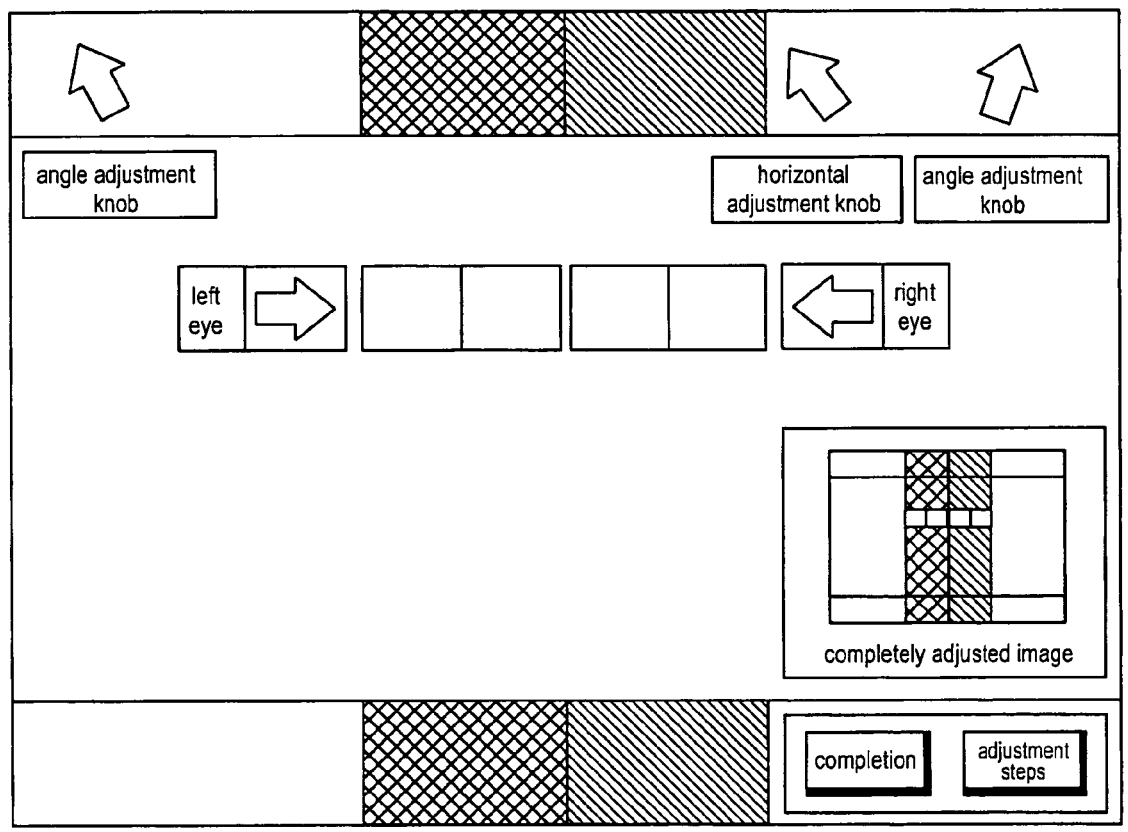
FIG. 98 is a schematic view of an image for adjustment in the stereoscopic image display system of the invention.
Figure 99:
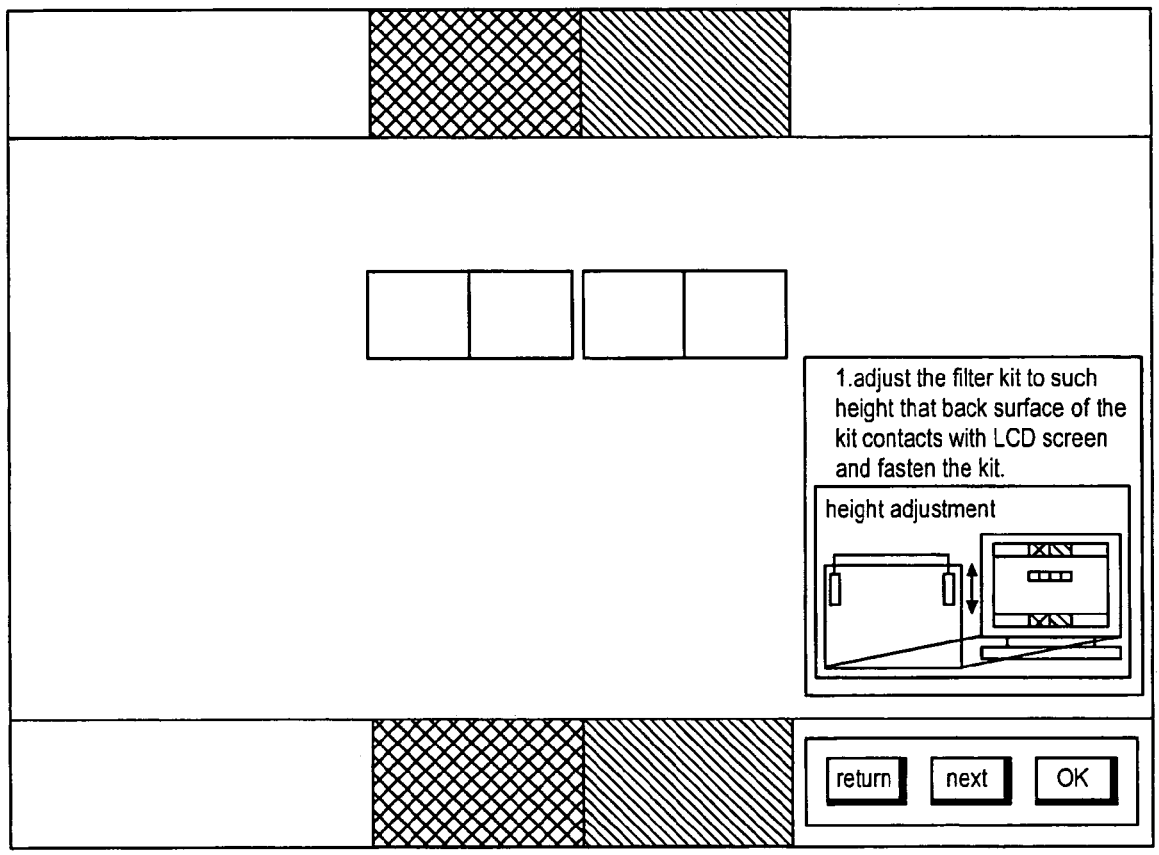
FIG. 99 is a schematic view of an image for adjustment in the stereoscopic image display system of the invention.
Figure 100:
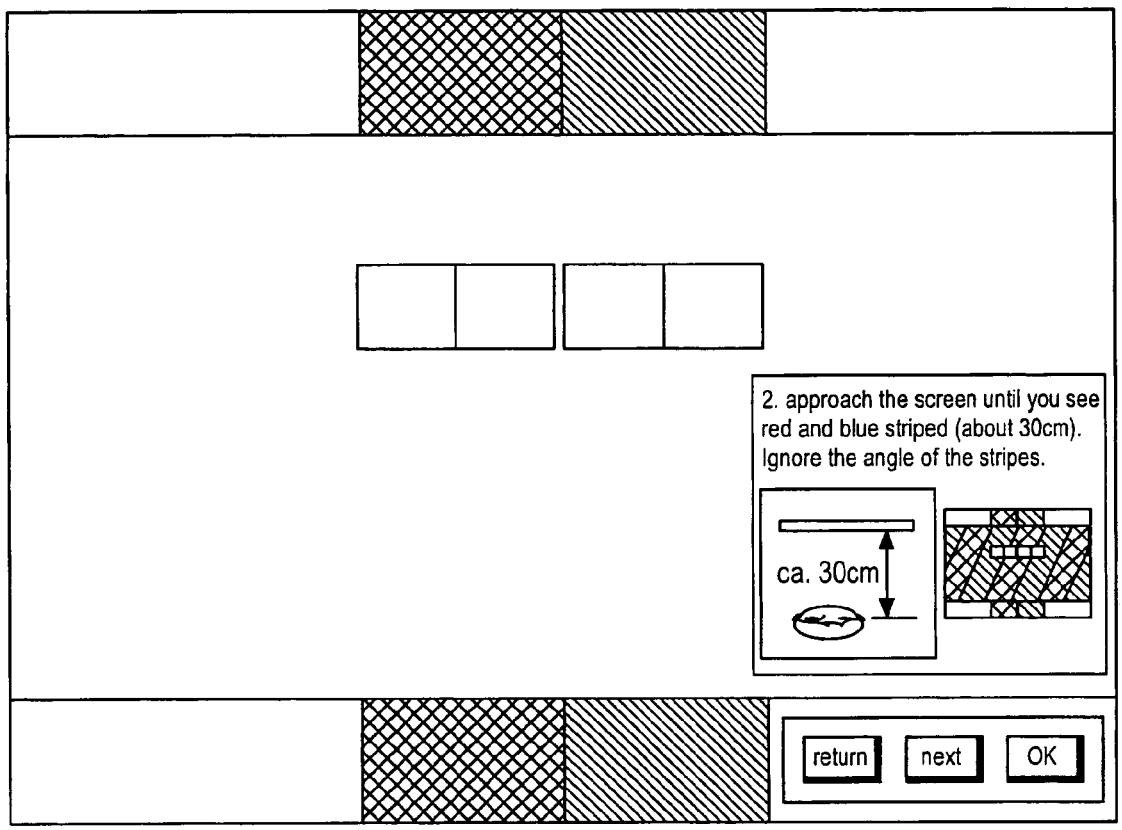
FIG. 100 is a schematic view of an image for adjustment in the stereoscopic image display system of the invention.
Figure 101:
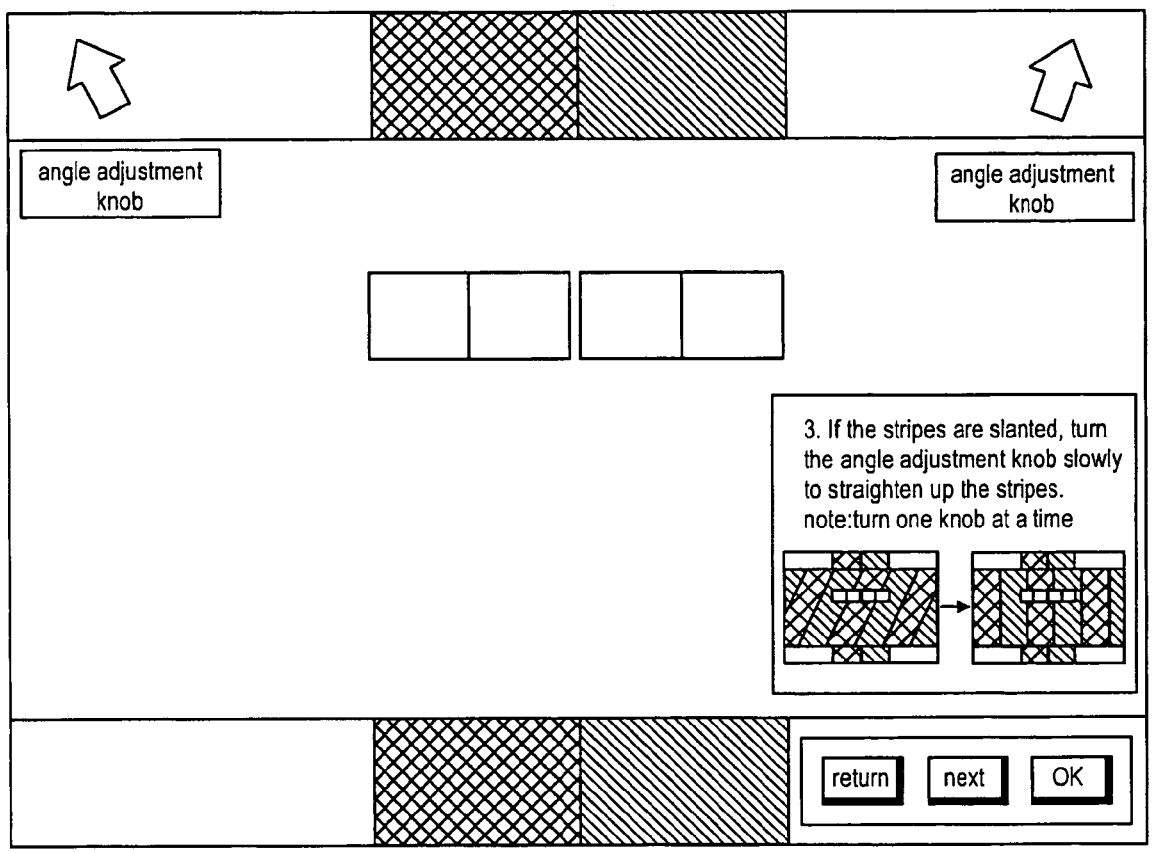
FIG. 101 is a schematic view of an image for adjustment in the stereoscopic image display system of the invention.
Figure 102:
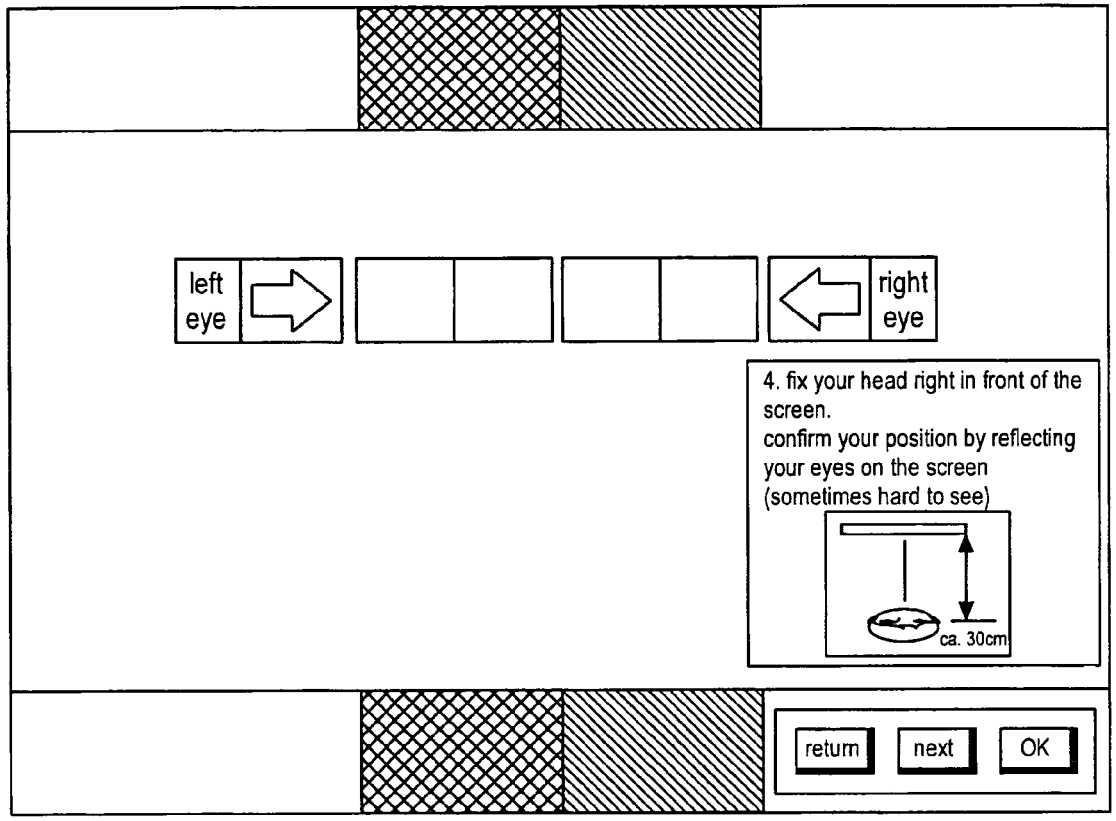
FIG. 102 is a schematic view of an image for adjustment in the stereoscopic image display system of the invention.
Figure 103:
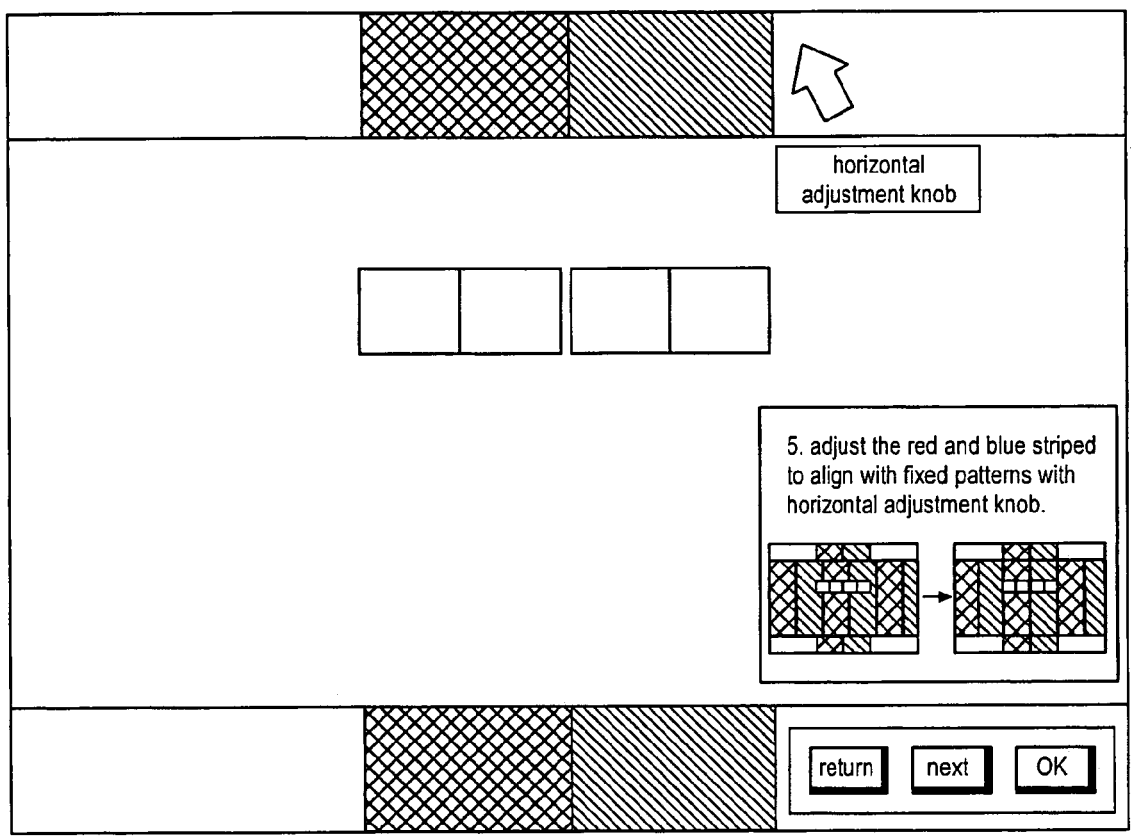
FIG. 103 is a schematic view of an image for adjustment in the stereoscopic image display system of the invention.
Figure 104:
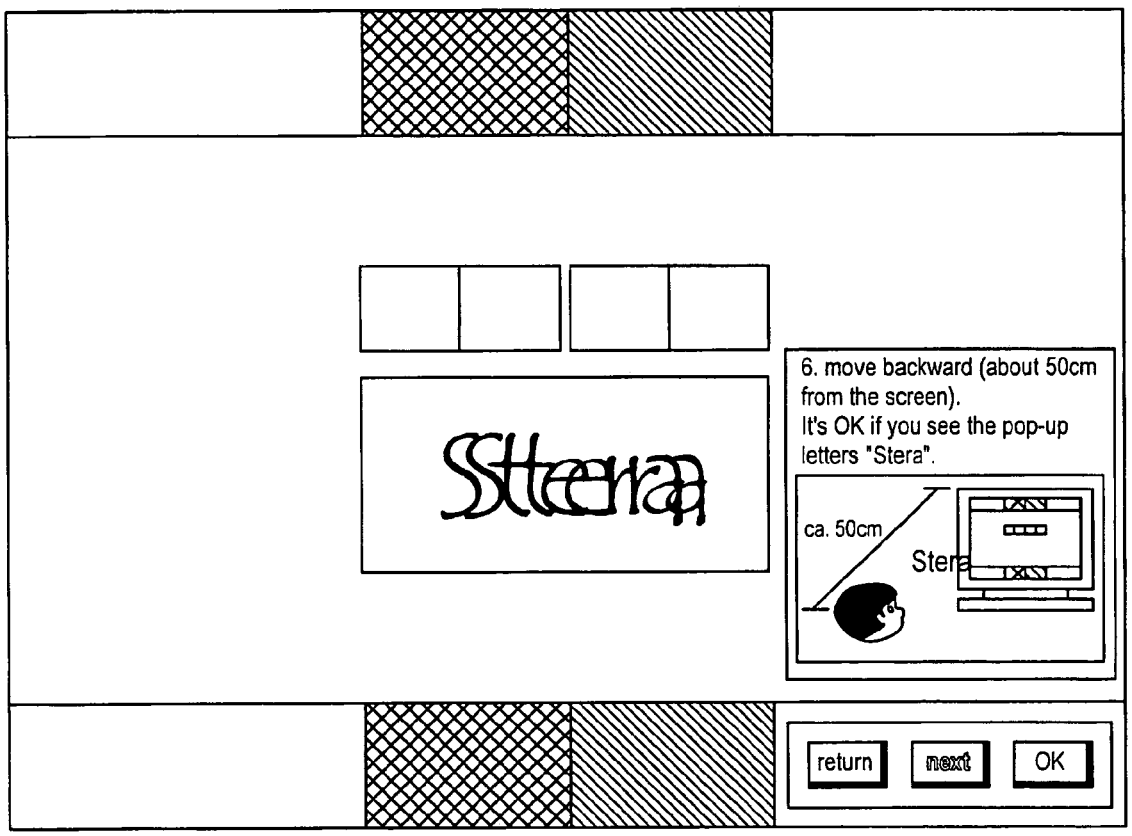
FIG. 104 is a schematic view of an image for adjustment in the stereoscopic image display system of the invention.

At the start of the adjustment operation of positioning, the display 600 displays an initial image for adjustment shown in FIG. 98 (step S1). Arrows, which indicate the position of the knobs necessary for adjustment, and an image, which indicates the appearance at the completion of rotation adjustment, are displayed on the initial image for adjustment. A standby time is made until a user performs an operation to complete the adjustment (step S2). When the adjustment is completed, the user instructs to finish the adjustment operation by pushing an enter key or by clicking the completion button with a pointing device such as a mouse. When the operation to finish the adjustment is not instructed, a standby time is made until the user instructs the adjustment method (step S3). When the adjustment method is instructed, the display 600 displays an image for adjusting the height (step S4). The display 600 displays an image shown in FIG. 99.

Following the instruction displayed on the display 600, the user adjusts the image splitter 2 to the height so that a back surface of a filter kit comprising the image splitter 2 is brought in tight contact to the screen of the liquid crystal display, and installs it. Subsequently a standby time is made until next instruction is input (step S5). When next instruction is provided, the instruction is found whether it indicates to go next or not (step S6). If the instruction does not indicate to go next, the process goes to step S7. If the instruction indicates to go next, the process goes to step S8. In the step S7, the instruction is found whether it indicates to go back. If the instruction indicates to go back, the process goes back to step S1, namely the initial image. If the instruction does not indicate to go back, the software judges the process is completed (OK) in this embodiment, and the process finishes.

In step S8, next image for adjustment, which instructs the viewer of viewing position, is displayed on the display 600. The display 600 displays an image shown in FIG. 100. After the user adjusts the viewing position following the instruction shown in FIG. 100, a standby time is made until next instruction is input (step S9). When the next instruction is provided, the instruction is judged whether it indicates to go next (step S10). If the instruction does not indicate to go next, the process goes to step S11. If the instruction indicates to go next, the process goes to step S12. In the step S11, the instruction is judged whether it indicates to go back. If the instruction indicates to go back, the process goes back to step S4 to adjust the height. If the instruction does not indicate to go back, the software judges the process is completed (OK) in this embodiment, and the process finishes.

In the step S12, next image for adjustment, which instructs the viewer of adjusting the angle of the image splitter, is displayed on the display 600. The display 600 displays an image shown in FIG. 101. After the user adjusts the image splitter in the slanting direction by turning the angle adjustment knob following the instruction shown in FIG. 101, a standby time is made until next instruction is input (step S13). When the next instruction is provided, the instruction is judged whether it indicates to go next (step S14). If the instruction does not indicate to go next, the process goes to step S15. If the instruction indicates to go next, the process goes to step S16. In the step S15, the instruction is judged whether it indicates to go back. If the instruction indicates to go back, the process goes back to step S8 to adjust the viewing position. If the instruction does not indicate to go back, the software judges the process is completed (OK) in this embodiment, and the process finishes.

In the step S16, next image for adjustment, which instructs the viewer of the viewing position, is displayed on the display 600. The display 600 displays an image shown in FIG. 102. After the user adjusts the viewing position so that the viewer is positioned right in front of the screen following the instruction shown in FIG. 102, a standby time is made until next instruction is input (step S17). When the next instruction is provided, the instruction is judged whether it indicates to go next (step S18). If the instruction does not indicate to go next, the process goes to step S19. If the instruction indicates to go next, the process goes to step S20. In the step S19, the instruction is judged whether it indicates to go back. If the instruction indicates to go back, the process goes back to step 12 to adjust the angle of the image splitter. If the instruction does not indicate to go back, the software judges the process is completed (OK) in this embodiment, and the process finishes.

In the step S20, next image for adjustment, which instructs the viewer of adjusting the image splitter in a horizontal direction, is displayed on the display 600. The display 600 displays an image shown in FIG. 103. After the user adjusts the image splitter in the horizontal direction by turning the horizontal adjustment knob following the instruction shown in FIG. 103, a standby time is made until next instruction is input (step S21). When the next instruction is provided, the instruction is judged whether it indicates to go next (step S22). If the instruction does not indicate to go next, the process goes to step S23. If the instruction indicates to go next, the process goes to step S24. In the step S23, the instruction is judged whether it indicates to go back. If the instruction indicates to go back, the process goes back to step S16 to adjust the viewing position. If the instruction does not indicate to go back, the software judges the process is completed (OK) in this embodiment, and the process finishes. In the step S24, the display 600 displays an image indicating the completion of the adjustment to urge the user to recognize it. The display 600 displays an image shown in FIG. 104. On the completion of the adjustment, the user presses the enter key or OK button (not shown). According to these process, the adjustment is carried out easily.

Although the above embodiment is about the adjustment method applied to the removable image splitter, the post-adjustment and image adjustment in this present invention is applicable to a stereoscopic image display device which the image splitter is fixed to the display panel after adjustment.

Although a liquid crystal display device is used as an image display device in the embodiments, the other display devices are also applicable such as a plasma display device, a rear projection display device, a display device using organic EL light-emitting elements.

Although the present invention has been described and illustrated in detail, it should be clearly understood that the description discloses examples of different embodiments of the invention and is not intended to be limited to the examples or illustrations provided. Any changes or modifications within the spirit and scope of the present invention are intended to be included, the invention being limited only by the terms of the appended claims.

We claim:

1. A stereoscopic image display system comprising:
   an image display means for displaying images taken from a plurality of viewpoints;
   an optical splitting means for splitting image light from said image display means into stereo pairs of images corresponding to viewer's eyes;
   a control means for controlling said image display means to display predetermined images; and
   a means for judging instructions from a viewer, wherein the control means controls the image display means to display the predetermined images including (1) a first image for a right eye and a second image for a left eye for generating interference fringes and (2) an image including additional images for checking a state of the interference fringes, in order to help the viewer who is at an integral submultiple of an optimal viewing distance recognize a condition of the optical splitting means from the relationship between the additional images and the interference fringes generated by said image display means and the optical splitting means, and adjust a position of the optical splitting means.

2. The stereoscopic image display system of claim 1, wherein the predetermined images include arrows indicating positions of knobs for adjustment.

3. The stereoscopic image display system of claim 1, wherein the predetermined images include images indicating an appearance at the completion of adjustment.

4. The stereoscopic image display system of claim 1, wherein the additional images for checking the state of the interference fringes is displayed on one of the first image and the second image.

5. The stereoscopic image display system of claim 4, wherein the additional images are respectively added to upper ends of the first image at a distance between viewer's eyes from each other, and to lower ends of the first image at the distance between the viewer's eyes from each other.

6. The stereoscopic image display system of claim 1, wherein the additional images each include a region so that the viewer can observe a fixed pattern which is not affected by a relative position between the image display means and the optical splitting means.

7. An adjustment method of a stereoscopic image display device which comprises an image display means for displaying images taken from a plurality of image viewpoints and an optical splitting means for splitting image light from said image display means into stereo pairs of images corresponding to viewer's eyes, comprising:

displaying (1) at least a first image for a right eye and a second image for a left eye for generating interference fringes and (2) additional images for checking a state of the interference fringes on said image display means wherein a viewer is at an integral submultiple of an optimal viewing distance;

recognizing a condition of said optical splitting means by which the viewer who is at an integral submultiple of the optimal viewing distance sees a relationship between the additional images and the interference fringes generated by said image display means and said optical splitting means; and adjusting the condition of said optical splitting means.

8. The adjustment method of the stereoscopic image display device of claim 7, wherein the viewer is positioned in front of the stereoscopic image display device.

9. The adjustment method of the stereoscopic image display device of claim 8, wherein the viewer is positioned in front of the stereoscopic image display device and at half the optimal viewing distance.

10. The adjustment method of the stereoscopic image display device of claim 9, wherein one of the first and second images is a stripe patterned image.

11. The adjustment method of the stereoscopic image display device of claim 10, wherein a width of each stripe in the stripe patterned image is an integral multiple of that of each interference fringe generated in front of the viewer.

12. The adjustment method of the stereoscopic image display device of claim 10, wherein a width of each stripe in the stripe patterned image is equivalent to that of each interference fringe generated in front of the viewer.

13. The adjustment method of the stereoscopic image display device of claim 12, wherein each of the additional images for checking the state of the interference fringes is an image for indicating an appearance of the interference fringe at the completion of adjustment.

14. The adjustment method of the stereoscopic image display device of claim 12, wherein the additional images for checking the state of the interference fringes are added to a region where images taken from a plurality of viewpoints are seen at the completion of adjustment.

15. The adjustment method of the stereoscopic image display device of claim 9, wherein one of the first and second images for generating the interference fringes comprises an even patterned image or an even colored image.

16. The adjustment method of the stereoscopic image display device of claim 7, wherein said first and second images respectively include low brightness regions through which the viewer can recognize the viewer's position reflected on the stereoscopic image display device.

17. The adjustment method of the stereoscopic image display device of claim 7, wherein the additional images include letters, arrows or figures, or combinations of them.

18. The adjustment method of the stereoscopic image display device of claim 17, wherein the letters, arrows or figures, or combinations of them indicate directions for adjusting the optical splitting means, but are invisible at the completion of adjustment.

19. The adjustment method of the stereoscopic image display device of claim 17, wherein the arrows indicate directions for adjusting the interference fringes, but are invisible at the completion of adjustment.

20. The adjustment method of the stereoscopic image display device of claim 17, wherein the letters and figures will be meaningful letters or words, or understandable figures when seen with left and right eyes at the completion of adjustment.

21. The adjustment method of the stereoscopic image display device of claim 17, wherein third images indicating an appearance of the letters, words, arrows or figures at the completion of adjustment are displayed together with the first images generating the interference fringes.

22. The adjustment method of the stereoscopic image display device of claim 7, wherein the additional images for checking the state of the interference fringes is displayed on one of the first image and the second image.

23. The adjustment method of the stereoscopic image display device of claim 22, wherein the additional images are respectively added to upper ends of the first image at a distance between viewer's eyes from each other, and lower ends of the first image at the distance between the viewer's eyes from each other.

24. The adjustment method of the stereoscopic image display device of claim 7, wherein the additional images each include a region so that the viewer can observe a fixed pattern which is not affected by a relative position between the image display means and the optical splitting means.

* * * * *